United States Patent [19]

Hof et al.

[11] 4,232,552

[45] Nov. 11, 1980

[54] TEMPERATURE INDICATING COMPOSITIONS OF MATTER

[75] Inventors: Craig R. Hof, Hopatcong; Roy A. Ulin, Wyckoff, both of N.J.

[73] Assignee: Akzona Incorporated, Asheville, N.C.

[21] Appl. No.: 946,935

[22] Filed: Sep. 28, 1978

Related U.S. Application Data

[63] Continuation-in-part of Ser. No. 895,422, Apr. 13, 1978, abandoned, which is a continuation-in-part of Ser. No. 844,334, Oct. 21, 1977, abandoned, which is a continuation-in-part of Ser. No. 796,492, May 12, 1977, abandoned.

[51] Int. Cl.³ .................... G01K 11/06; G01K 11/08; G01K 11/12; G01K 11/16; G09K 3/00
[52] U.S. Cl. .................... 73/356; 23/230 R; 73/358; 116/201; 116/206; 116/207; 116/216; 116/217; 252/408; 422/55; 422/56; 422/57; 422/58
[58] Field of Search .................. 73/356, 358; 252/408; 23/230 R; 116/201, 206, 207, 216, 217, 219; 422/55, 56, 57, 58, 119

[56] References Cited

U.S. PATENT DOCUMENTS

| | | | |
|---|---|---|---|
| 1,951,650 | 3/1934 | Diack | 73/356 |
| 2,193,439 | 3/1940 | Van Doren | 73/356 |
| 2,261,473 | 11/1941 | Jennings | 252/408 |
| 2,379,459 | 7/1945 | Schreiber et al. | 73/358 |
| 2,490,933 | 12/1949 | Tornquist et al. | 73/356 |
| 2,560,537 | 7/1951 | Andersen | 73/358 |
| 2,710,274 | 6/1955 | Kuehl | 73/356 |
| 2,799,167 | 7/1957 | Loconti | 73/356 |
| 2,809,116 | 10/1957 | Laskowski | 73/356 |
| 2,846,829 | 8/1958 | Eskin | 73/356 |
| 2,850,393 | 9/1958 | Romito | 73/356 |
| 2,932,971 | 4/1960 | Moore et al. | 73/356 |
| 3,038,812 | 6/1962 | Berman | 116/206 |
| 3,175,401 | 3/1965 | Celdmacher | 73/356 |
| 3,465,590 | 9/1969 | Kluth et al. | 73/358 |
| 3,576,604 | 4/1971 | Hammond | 73/356 |
| 3,597,976 | 8/1971 | Fryar | 73/358 |
| 3,631,720 | 1/1972 | Weinstein | 73/356 |
| 3,665,770 | 5/1972 | Sagi et al. | 73/358 |
| 3,688,582 | 9/1972 | Gradisher | 73/358 |
| 3,700,603 | 10/1972 | Rembaum | 73/356 |
| 3,704,985 | 12/1972 | Pickett et al. | 73/358 |
| 3,828,612 | 8/1974 | Eriksson et al. | 73/358 |
| 3,929,021 | 12/1975 | Pecorella | 73/358 |
| 3,946,612 | 3/1976 | Sagi et al. | 73/358 |
| 3,956,153 | 5/1976 | Chadha | 116/207 |
| 3,960,753 | 6/1976 | Cerrabee | 73/356 |
| 3,980,581 | 9/1976 | Godsey et al. | 252/408 |
| 4,042,336 | 8/1977 | Larsson | 73/356 |
| 4,128,007 | 12/1978 | Uun | 73/356 |
| 4,138,357 | 2/1979 | Icaraski | 73/356 |
| 4,149,852 | 4/1979 | Tiru et al. | 23/230 R |
| 4,150,572 | 4/1979 | Lindquist | 116/217 |
| 4,151,748 | 5/1979 | Baum | 73/356 |
| 4,154,106 | 5/1979 | Inoue et al. | 73/356 |
| 4,154,107 | 5/1979 | Giezen et al. | 73/356 |
| 4,163,427 | 8/1979 | Cooperman et al. | 73/358 |
| 4,189,942 | 2/1980 | Giezen et al. | 73/356 |

FOREIGN PATENT DOCUMENTS

| | | | |
|---|---|---|---|
| 2403951 | 4/1975 | Fed. Rep. of Germany | 73/356 |
| 2715752 | 10/1977 | Fed. Rep. of Germany | 73/356 |
| 3640 | of 1898 | United Kingdom | 73/358 |
| 551783 | 3/1943 | United Kingdom | 116/207 |
| 904846 | 8/1962 | United Kingdom | 116/217 |
| 1367703 | 9/1974 | United Kingdom | 73/356 |

OTHER PUBLICATIONS

Larsson, R., BMS Interoffice Memorandum, dated Jun. 27, 1975, (unpublished).

*Primary Examiner*—Teddy S. Gron
*Attorney, Agent, or Firm*—Robert H. Falk; Charles A. Wendel; Francis W. Young

[57] ABSTRACT

Novel and stable compositions of matter are disclosed which change color sharply upon a transition from a liquid state to a solid state or from a solid state to a liquid state, which change of state is at substantially a predetermined temperature corresponding to a temperature to be measured.

The constituents of the novel compositions of matter comprise:

1. a solvent (I) consisting of a single substance or a mixture of substances and adapted to change from a solid state at substantially a predetermined temperature to a liquid state and 2. an indicator system (II) consisting of one or more substances different from (I), characterized in that
   (a) (II) is soluble in (I) when the latter is in the liquid phase, and
   (b) (II) changes color visible to the naked eye when (I) passes from the solid to the liquid phase or from the liquid to the solid phase.

Thermometers containing said stable compositions of matter are also disclosed.

89 Claims, 18 Drawing Figures

WEIGH % ORTHO-BROMONITROBENZENE IN THE SOLID SOLUTION

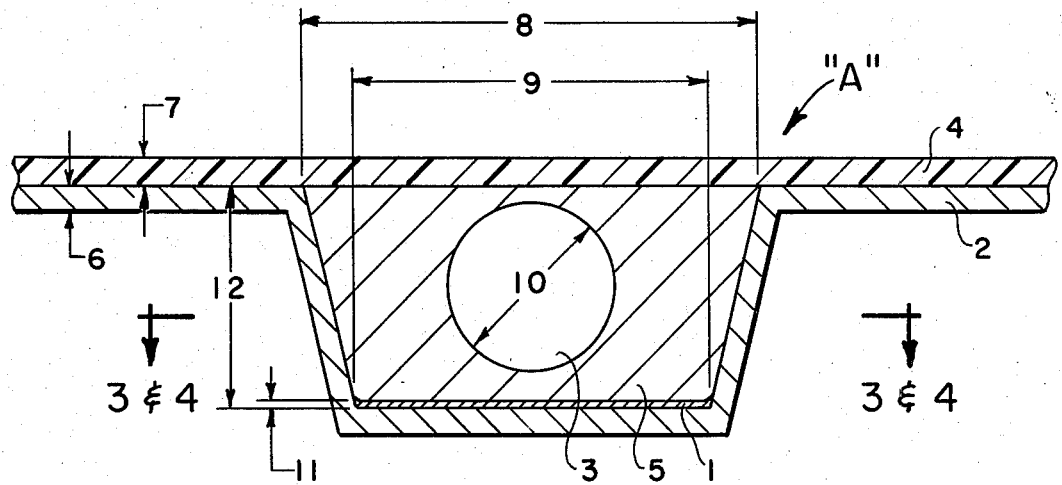
FIG. 2
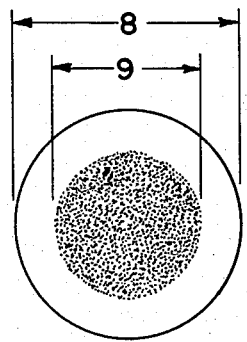  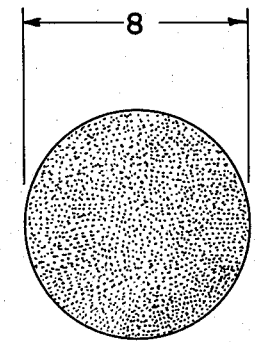
FIG. 3     FIG. 4
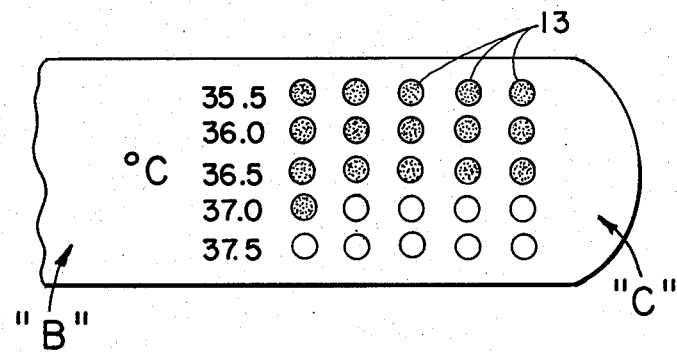
FIG. 5

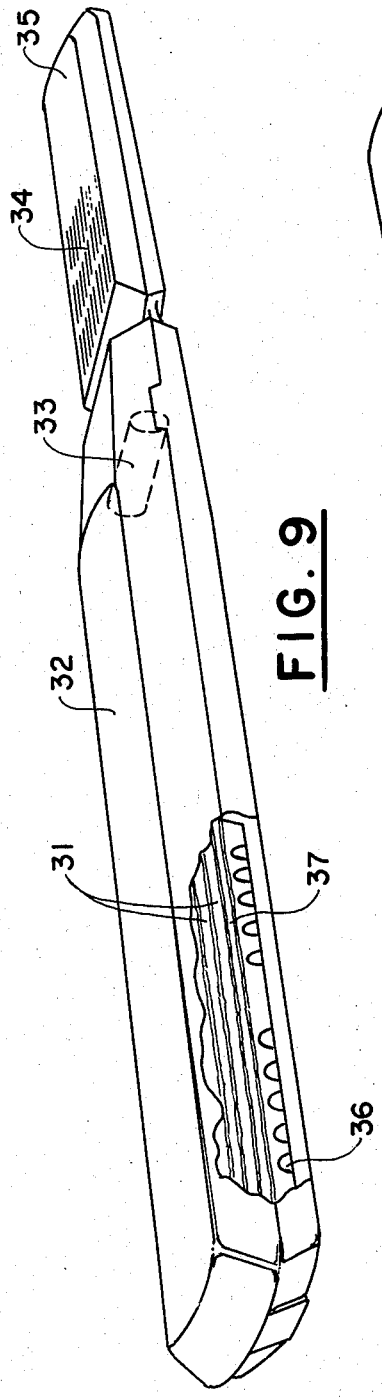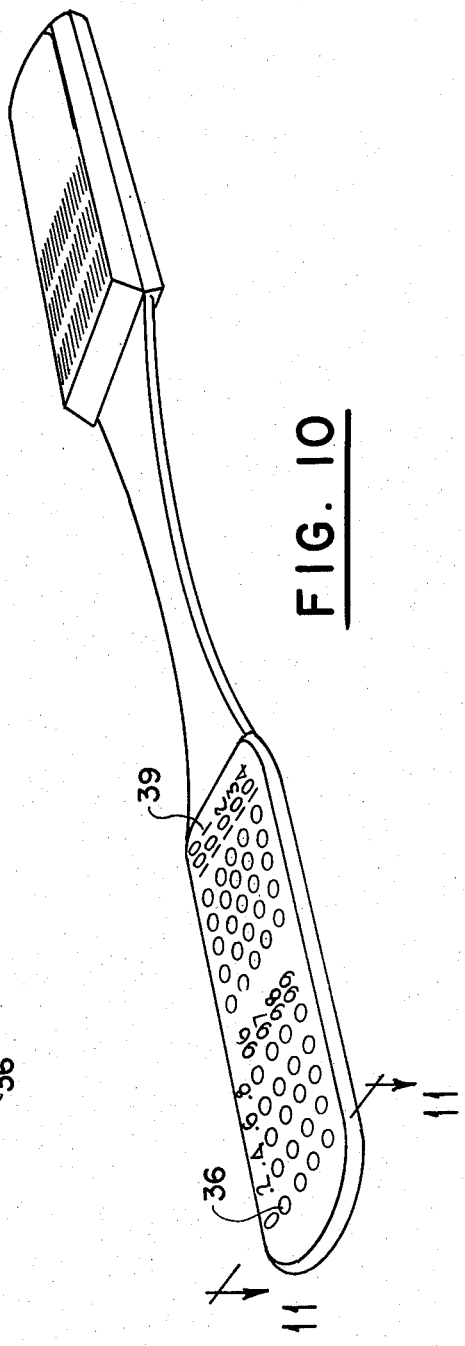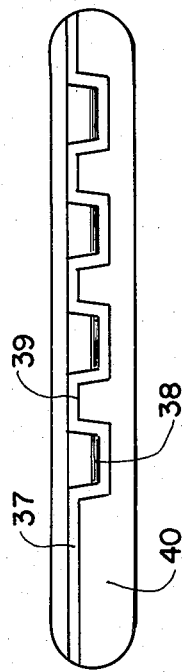

TEMPERATURE INDICATING COMPOSITIONS OF MATTER

RELATED APPLICATIONS

This application is a continuation-in-part of U.S. Ser. No. 895,422, filed Apr. 13, 1978, abandoned in favor of this appication, which is a continuation-in-part of U.S. Ser. No. 844,334, filed Oct. 21, 1977, abandoned in favor of Ser. No. 895,422, which is a continuation-in-part of U.S. Ser. No. 796,492, filed May 12, 1977, abandoned in favor of Ser. No. 844,334, all entitled "TEMPERATURE INDICATING COMPOSITIONS OF MATTER," for which benefit is claimed under 35 USC § 120. This application is also related by subject matter to (1) U.S. Ser. No. 869,406 (Ulin), filed Jan. 16, 1978, now U.S. Pat. No. 4,128,007, entitled "SUPPORT MEMBER FOR A DISPOSABLE THERMOMETER", dislcosing a rectal adapter similar to that described in the DESCRIPTION OF THE PREFERRED EMBODIMENTS below and FIGS. 14-16 herein, and (2) an application entitled "TEMPERATURE INDICATING DEVICE USING A PRESSURE SENSITIVE ADHESIVE SEAL", Ser. No. 896,114 by E. A. Giezen, G. D. B. van Houwelingen and M. Cramer, filed on Apr. 13, 1978, now U.S. Pat. No. 4,189,942, and based upon Netherlands Application No. 7,704,765 filed May 2, 1977in the Netherlands, both (1) and (2) incorporated herein.

BACKGROUND OF THE INVENTION

1. Field of the Invention

The invention relates to the field of temperature-indicating compositions and devices therefor, and in particular, the sub-fields of disposable thermometers and compositions of matter which change characteristics with change in phases for use in disposable thermometers.

2. Description of the Prior Art

For many years the conventional mercury thermometer has been the primary temperature-indicating device which has been used in clinical applications for the measurement of temperature in the human body and other animal bodies, and for the measurement of temperature of gases, liquids, and even solids in commercial and industrial applications. However, as will be readily discerned by the observer, this type of thermometer has numerous disadvantages inherent in the nature of mercury, a poisonous substance to humans and other animals, and construction of the mercury thermometer with the placement of mercury within fragile glass. First, in clinical applications involving humans and other animals, several minutes, usually at least three, are required to obtain a meaningful temperature reading. Second, once used, the conventional mercury thermometer because of its extraordinary expense must be sterilized before the next clinical application. Such sterilization and resterilization often involve substantial labor costs, whether in hospitals, physicians' offices, homes, or in the field. Third, in hospital use, inevitable human error in the sterilization of thermometers presents the ever-occurring substantial probabilities of outbreaks of contagious diseases such as hepatitis. Fourth, the breakable nature of the mercury thermometer is an ever-present danger when considering the poisonous nature of mercury, especially in the presence of children. Fifth, in industrial applications, especially involving the determination of relatively high temperatures in vessels located in plants and refineries, the user must ordinarily reach into inexcessible places to locate the thermometer, and because of the extreme difference between said relatively high temperatures and the outside ambient temperature, readings from conventional thermometers are often in extreme error seconds after the withdrawal of the mercury thermometer.

Accordingly, for many years persons have attempted to construct an inexpensive device of mixtures or materials of any kind which would change in some characteristic visible to the naked eye at substantially the temperature to be measured so that the inconveniences of the conventional mercury thermometer could be avoided. For instance, Ramsden in British Pat. No. 3640 (1897) provided a piece of paper, celluloid, metal or other suitable material which would be (1) coated with, or (2) formed with a hollow or recess containing a substance, mixture of material which would change in opacity at the temperature for the indication of which the appliance is intended to be used (see page 1, lines 24-38; page 5, lines 23-45 of British Pat. No. 3640). Ramsden desired a substance or material (see page 2, lines 9-23) that would change in color at the predetermined temperature, but did not indicate any in his specification; he only indicated several substances, generally fatty acids, which would change in opacity or change from being opaque to transparent upon change in phases from solid to liquid or vice versa (see page 3, lines 11-18), so that indicator layers, dyes, etc., would have to be employed in the device.

After Ramsden, the art primarily pursued only those heat-sensitive substances which would change from being opaque to transparent at the phase interface in devices (hereinafter described as "opaque thermometers") that would employ indicator layers having dyes that would only be apparent when the heat-sensitive substance had changed from opaque to transparent and would mix with the heat-sensitive compounds upon a change in phases. For example, U.S. Pat. No. 3,175,401 issued to Geldmacher (1965) describes a thermometer with several cavities, each containing a different thermally-indicating composition melting at a different temperature range. Each of the thermally-indicating compositions employed by Geldmacher is normally opaque below a certain temperature and transparent above a certain temperature, similar to Ramsden's compositions of matter. The temperature indication is obtained by a complete change of state of the thermally responsive material in each cavity. Furthermore, as many as forty to fifty different chemical compounds would be necessary to cover the desired human clinical temperature range of 96° F. to 105° F., so that Geldmacher's device was prohibitively expensive to manufacture for mass consumer use; likewise, the availability of these compounds at 0.2° F. or 0.1° C. increments was not disclosed.

Another type of temperature indicating device was disclosed in U.S. Pat. No. 3,465,590 (1969) to Kluth, et al. The teaching describes a thermometer which is disposable after a single application and does not employ mercury as the thermally responsive substance. Rather, Kluth, et al, employed mixtures of certain of the even series of saturated fatty acids, [perhaps] suggested by the Ramsden materials on page 3, lines 11-18 of British Pat. No. 3640), to wit, myristic acid, palmitic acid and lauric acid for indication of temperature of the human body within plus or minus ½° F. Again, as in Geldmacher, the device of Kluth measured and indicated temperature by a complete change of state of the thermally-responsive material in each cavity. Although the use of Kluth's thermometer obviated some of the deficiencies of the conventional mercury thermometer, its application was limited to temperature measurements in the range of about 96° F. to about 101° F., and the accuracy was restricted explicitly in Kluth to plus or minus ½° F., thus precluding Kluth from use for more precise temperature measurements and replacement of the conventional mercury thermometer. As a practical matter, such Kluth instruments did not provide accurate clinical information regarding the temperature of the human or animal body during a period of fever when the temperature was frequently above 101° F., as the human body is often (102° F.–105° F.) during high fevers. Another difficulty with the Kluth thermometer was that an accurate temperature determination really depended on a complete change of state of the solid solution employed as the thermally-responsive material. While Kluth intended for each cavity in his thermometer to have three stages of melting (each stage represented an indication of plus or minus ½° F.), some experience by the user was necessary in order to determine which stage a cavity were in if it was melting. More probably, if the cavity responding to the closest temperature of the human or animal body to be measured did not completely change state, certain nucleation sites remained in the cavity so that the cavity rapidly solidified, causing an inaccurate measurement as withdrawal of the thermometer was followed by quick solidification of the cavities only partly liquified or containing appreciable nucleation sites because of impurities, etc. The complete change of state necessary, i.e., from opaque solid to translucent liquid, in addition to the inherent ½° F. inaccuracy and the 101° F. limitation of the device made the Kluth thermometer inadequate to replace the conventional mercury thermometer (admitted by Kluth in Column 2, lines 70–73 and Column 3, lines 1–8 of U.S. Pat. No. 3,465,590).

Still another type of thermometer was described by Finklestein in U.S. Pat. No. 3,521,489 (1970). The temperature indication in this type of thermometer is based upon the flow of a melted material from so-called "holding compartment" into a so-called "flow-inducing receiving element" such as the absorbent material, by a capillary action (see Column 1, lines 61–72 of U.S. Pat. No. 3,521,489). As in the Geldmacher patent, however, temperature indication was realized by the use of numerous different thermally responsive chemical compounds, each undergoing a complete change of state at a different predetermined temperature with a corresponding change from opaque to transparency. It was obvious once again that with the employment of any "classical" material changing from opaque to transluscent at the phase change, some indicator dye or material at the bottom of a cavity would have to be placed in order to indicate readily to the observer the change in state of the composition of matter indicating the temperature to be determined. See also Crites U.S. Pat. No. 3,580,079 (1971) which required the transparent state of the temperature responsive material to be of the same index of refraction of a roughened window in order to optically smooth the window.

As the search continued for a disposable clinical thermometer to replace the conventional mercury thermometer, Weinstein and Sagi in U.S. Pat. No. 3,631,720 disclosed a specific device employing a carrier sheet (11 in U.S. Pat. No. 3,631,720) with a plurality of individual temperature-indicating elements distributed over at least one surface of the carrier sheet in the form of a grid with the elements buried in a corresponding number of cavities (located between the sheet 11 and surfaces 20A and 10A), each element 12 having an opaque layer covering an indicator element 20. Upon melting of the coatings 22 in U.S. Pat. No. 3,631,720, the indicator material 20 would be exposed to the observer. The drawback of U.S. Pat. No. 3,631,720 was that the manufacturer of a multilayered device as shown in FIG. 4 of U.S. Pat. No. 3,631,720 with a "sandwich" indicator means 20 in temperature-indicating elements 12 became expensive.

In U.S. Pat. No. 3,946,612 (1976) to Sagi and Weinstein, the specification disclosed the use of a heat conducting carrier having a plurality of spaced cavities with a corresponding plurality of solid solutions each comprising an organic layer of at least two different organic chemicals (ortho-chloronitrobromobenzene and ortho-bromonitrobromobenzene) in varied composition ratios deposited in said cavities that would turn from opaque to clear upon a change in phase from solid to liquid. This organic layer (9 in U.S. Pat. No. 3,946,612) formed a sandwich for an indicator layer (13 in U.S. Pat. No. 3,946,612) between it and a masking or opaque layer (15 in a multilayered device similar to U.S. Pat. No. 3,665,770). When the cavity of FIG. 2 of U.S. Pat. No. 3,946,612 was heated to a predetermined temperature, the composition of matter would change from a solid to a liquid state, permeating the indicator 13 and forcing a dye into the opaque layer to change the color of said opaque layer to the color of the dye. Several problems were presented in the construction of the U.S. Pat. No. 3,946,612 multilayered device: first, such a device with three internal layers in the cavity and two transparent external layers was hard to manufacture and very expensive. Second, sometimes the organic composition would not totally change from liquid to solid, so that nucleation sites remained in the organic layer 9; hence, resolidification quickly occurred upon withdrawal of the thermometer, and not all the dye was forced into the upper or opaque layer 15. Third, because of the size of the layers, it was sometimes hard to visualize the change in color when only some of the dye was transferred into the previously opaque layer. For other examples of "opaque" thermometers, see Keele, U.S. Pat. No. 3,859,856 (with "supercoolable" inorganic compounds, column 4, lines 50–54); Loconti, U.S. Pat. No. 2,928,791 (dyes employed with solvents of Table I); Gignilliat III, U.S. Pat. No. 3,430,491 (physical movement of heat-sensitive solvent upon melting into "absorbent backing" layer with different color, column 7, lines 54–59); Roszkowski, U.S. Pat. No. 3,785,336 (methyl sterate); Godsey, Jr., U.S. Pat. No. 3,980,581 ("nucleating" agents to limit or reduce undercooling); Wahl, et al, U.S. Pat. No. 3,002,385; Fryar U.S. Pat. No. 3,597,976; Lang, U.S. Pat. No. 3,677,088 ("spacer layer" between indicator layer and heat-sensitive material); Pickett, U.S. Pat. No. 3,704,985 (ortho-chloronitrobenzene: ortho-bromonitrobenzene heat-sensitive material, but no "space layer"); Chadha, U.S. Pat. No. 3,712,141 ("space layer"); Pickett, U.S. pat. No. 3,765,243 ("self-firing thermometer" with exothermic reaction between heat-sensitive material and dye); Godsey, U.S. Pat. No. 3,774,450 ("frangible" spacer layer to be crushed before application); Pickett, U.S. Pat. No. 3,826,141; Ayres, U.S. Pat. No. 3,922,917 (avoids "cover" layer by means of crushable dome); Pecorella, U.S. Pat. No. 3,929,021; Chadha, U.S. Pat. No. 3,956,153; Sagi, U.S. Pat. No. 3,835,990, Keele, U.S. Pat. No. 3,859,856; Sagi et al, U.S. Pat. No. Des. 238,661 (1976); Nollen, U.S. Pat. No. 3,895,523; Chilton, U.S. Pat. No. 3,998,098; and Pickett, U.S. Pat. No. 3,871,232.

The phenomena of undercooling encountered with various heat responsive materials in passing from liquid to solid is taught in Chadha, U.S. Pat. No. 3,956,153 to be minimized by incorporation of predetermined amounts of a regenerative nucleating agent particularly or wholly soluble in some degree in the heat responsive materials.

Another form of device in another art and not to be confused with the "pure" thermometer (this is used only for measurement of temperature) is the "time-temperature" thermometer or "time-temperature" watch which indicates by integration of time and temperature a property of a substance (such as deterioration of meat due to elevated temperature). For example, Chapman in U.S. Pat. No. 2,195,395 teaches the measurement of the thermal abuse of frozen food by indicating whether or not a chemical reaction has proceeded past a certain point through a measurement of the change in pH, using a dye in water. A major advance in such an art was Larsson, U.S. Pat. No. 3,946,611, wherein paraformaldehyde 19 in FIG. 2 decomposes at a rate which is a function of temperature to produce formaldehyde gas that permeats through membrane 22 to contact a wick means 18 which contains hydroxyamine hydrochloride and a dye and low volatile acid. After an accumulation of time the HCl lowers the pH of wick means 18 so that the dye and wick change color (see Example 3). The color change does not indicate a change in color upon change in phases of a solvent. See also Gessler, U.S. Pat. No. 3,065,083 describing a time-temperature indicator to indicate the presence of fatty acids for frozen food packages; U.S. Pat. No. 3,437,070 to Campbell; and U.S. Pat. No. 3,479,877 to Allen.

Still another type of device in still another art and not to be confused with the "pure" thermometer is a device employing "liquid crystals"—a "liquid" which, although turning color in a specific range of temperatures (usually in a range of 1½° F.–2° F. and no better than ½° F.) because of a change in orientation of the liquid, is not suitable for thermometry because the "liquid" is incapable of supercooling, therefore resolution at better than ½° F. is difficult and the device must be read immediately upon withdrawing the "liquid crystal" device from the subject. Examples of "liquid crystal" devices and sprays and related technology are Sanford, U.S. Pat. No. 3,633,425; Flam, U.S. Pat. No. 3,661,142 (accuracy only within 2° C.); Parker, U.S. Pat. No. 3,898,354; Suzuki, U.S. Pat. No. 3,974,317; and Davis, U.S. Pat. No. 3,619,254.

A state of the art method for depositing precisely metered quantities of liquid on a small surface is revealed in Pickett et al, U.S. Pat. No. 3,810,779.

Japanese Patent Applications No. 47-34735 and 50-105555 show, respectively, compositions (1) comprising a dye and an acid with a polymeric material, and (2) a dye, an acidic compound, and a solvent which change colors although not at the melting point of the solvent.

Some abbreviated attempts have been made to find substances that would change color upon change in phases for use in thermometers, but none have been able to overcome the combined problems of employing many different unrelated compounds, accidental overheating, etc. For example, Jennings in U.S. Pat. No. 2,261,473 combines certain cognizable, organic dyes (page 2, column 2, lines 13-28) with certain solvents (page 2, column 1, lines 56-60) wherein the change in pH changes the color of the dyes, but needs, like Kluth, 45 or 50 different compositions over a range such as the human clinical range. A major advance in the art is Renbaum, U.S. Pat. No. 3,700,603 wherein no solvent system is employed, but the organic moieties ("electron donors" and "electron acceptors") do change color upon change in phases (see Table I, columns 5 and 6). However, because Renbaum apparently did not attempt to find a suitable solvent system for his electron donor-acceptor pairs, a number of different parts would be needed for almost any temperature range to be determined, e.g., the same problems as Kluth appeared. See also Hammond, U.S. Pat. No. 3,576,604, who also does not use a solvent over a range of temperatures.

An inexpensive disposable thermometer was needed and intensely desired in the thermometer industry which would be easily constructed and have materials which would change some characteristics visible to the naked eye but not readily susceptible to quick reversibility upon withdrawal from the source whose temperature was to be measured. If one could provide a chemical substance that would change in color in and of itself upon change in phases, the use of dyes in indicator layers would be eliminated. Likewise, a disposable thermometer was needed to magnify the presence of an indicator layer in cases involving "classical" substances that changed only from opaque to transparent upon change in phase from solid to liquid.

3. Miscellaneous

In an unpublished and short memorandum of June, 1975 by a scientist not associated with the present inventors working in the field of disposable thermometry (who was attempting to develop a reversible thermometer through a color change of a dye by use of molten thermometer chemicals instead of solid thermometer chemicals) a curious phenomenom was revealed. By mixing ethyl red and bromothymol blue together in a "thermometer chemical", he found out that a "very obvious color change" took place when melting and freezing of the mixture occurred. When the chemical solidified, the color changed to yellow-orange. The reaction appeared to him to be completely reversible. Screening tests with available dyes and indicators apparently showed the scientist that bromophenol blue and bromocresol purple could be substituted for bromothymol blue. Similar structures without the bromine atoms did not work; e.g., thymol blue, cresol phthalein, thymol phthalein. The scientist also apparently found that suitable structures for replacement of ethyl red included crystal violet, para rosaniline base, para rosaniline acetate, new fuchsin, basic fuchsin and 8-hydroxyquinoline. The memo stated that the 8-hydroxyquinoline, although not a dye or indicator, served as a substitute by allowing the bromo compound to change from yellow to blue-green from solid to liquid form. The scientist reported that the indicating compounds were then tried in various solid solvent systems, and that the color change only took place in aromatic systems such as naphthalene, 2-ethoxybenzyamide, thymol and 2-naphthyl. Aliphatic compounds such as 2-chloroacetamide and sorbitol did not exhibit color changes. The report concluded with a statement that imidazole was too strongly basic to exhibit any change since the indicators went to the basic state and remained there.

An intercompany sale of thermometers with pinacyanol iodide/OCNB-OBNB within claim 1 of this invention was made on Sept. 30, 1977, for purposes of research by an unincorporated division of assignee of Applicants to Organon Tecknika B.V., a related company to said assignee. Sales by the assignee in the U.S. to the public commenced shortly after January 1, 1978.

4. An Invention

The present inventors learned of this abandoned attempt about eighteen months later than the date of the memorandum through a technology-transfer agreement and amongst other attempts by different methods (use of metal complexes, different solutions of cations, etc.) to obtain an inexpensive disposable (and possibly reversible) thermometer, performed the identical experiments as perceived by reading the short memorandum. The color change did not work for the desired disposable thermometer applications in these experiments because (1) a broad melting point was experienced and, as the memorandum did not indicate in what proportion the components were to be be mixed, (2) much experimentation had to be performed to adjust the ratios of the first and second types of compounds mentioned above for any color change to occur. Even after the present inventors found the correct ratios of "Group I" to "Group II" type materials relative to each other, the broad melting range still presented a seemingly unsurmountable problem. The unpublished memo above did not mention any phenomena of the "Group III" compounds listed below.

Surprisingly, when the Group I and Group II components were mixed in a certain ratio found by the inventors and were added to the composition (at a total weight of about 0.05%), and when the solvent (ortho-chloronitrobenzene and ortho-bromonitrobenzene) was employed in a composition almost entirely free of nucleating agents (impurities, especially less than 0.1 weight percent), a sharp and narrow melting range (or "point") with a sharp color change was discovered for the composition, which at the same time exhibited the desired color change with change in phases and a remarkable color stability in the liquid upon heating, presumably due to some type of undercooling effect, i.e., upon withdrawal from the source of the temperature to be measured, the materials were not readily susceptible to refreezing and color reversibility. The exact mechanism for this sharp color change phenomena is unknown and only theories have been postulated.

5. The Present Art

German Patent Application No. 27,15,752 (published Oct. 27, 1977) discloses, inter alia, the use of an ionic reaction between the solvent mixture (for example, n-octadecane/n-eicosane) upon melting to ionize a pair of color producing reagents (for example methyl red and acid clay). More specifically, the color signal in German Patent Application No. 27,15,752 is developed by physically separating two reactive components which are later united at a visually accessible site by the action of the flow of the liquid phase of the temperature sensitive composition. The authors describe that this may be accomplished by applying each reagent on separate sides of a bibulum or by dissolving one reagent in the melting substance and applying each reagent in the melting substance and applying the other to the bibulum. The German reference is seen as no more pertinent than U.S. Pat. No. 3,712,141 (Chadha).

Suzuki et al in U.S. Pat. No. 4,015,591 teaches the manufacture of a composition of matter having thermal color responsive characteristics (adapted for effecting vanapuncture in the human body) and comprising an entantiotropic cholesteric liquid crystalline phase material, and at least two oil-soluble dyes dissolved in the material in a total dye concentration of 0.01–1.0 weight percent of the composition and with the dyes together absorbing light of substantially all wave lengths within the range.

An application, filed on or about Apr. 13, 1978, Ser. No. 896,116, entitled "DYE IN CHEMICAL TEMPERATURE INDICATING DEVICE", and assigned to assignee of the present invention, describes an invention wherein a cavity is filled with a solid mixture (preferably ortho-chloronitrobenzene/orthobromonitrobenzene (hereinafter OCNB/OBNB), including a dye which, although not changing color with change in phase, upon melting turns the color of a bibulum layer to the color of the dye.

Another application, filed on or about Apr. 13, 1978, Ser. No. 896,114, now U.S. Pat. No. 4,189,942 entitled "TEMPERATURE INDICATING DEVICE USING A PRESSURE-SENSITIVE ADHESIVE SEAL", also assigned to the assignee of the present invention, discloses the use of polyisobutylene (PIB) or a similar material having higher surface tension with respect to certain solvents (OCNB/OBNB, for example) than conventional materials of the art, such as SURLYN®1652 (E.I. duPont deNemours & Company). This invention can be employed in any system wherein the dye is in a mixture with the solvent.

SUMMARY OF THE INVENTION

Novel and stable temperature indicating compositions are provided for use in a number of different types of disposable thermometers for measuring the temperature of human and other animal bodies, and for other temperature measurement applications in industry as well. Furthermore, the application of these novel chemical compositions are not limited to use in clinical or industrial application induced by temperature changes, but may be extended to other indications or measuring systems in which the color change described can be used to indicate a liquid to solid or solid to liquid phase change in a non-polar solvent or weakly polar solvent induced by pressure, radiation, electromotive forces or other kinetic energy sources.

The constituents of the novel compositions of matter comprise:

1. a solvent (I) consisting of a single substance or a mixture of substances and adapted to change from a solid state at substantially a predetermined temperature to a liquid state and 2. an indicator system (II) consisting of one or more substances different from (I), characterized in that:

(a) (II) is soluble in (I) when the latter is in the liquid phase, and (b) (II) changes color visible to the naked eye when (I) passes from the solid to the liquid phase or from the liquid to the solid phase.

The constituents of the novel compositions of matter substantially free of impurities most preferably comprise (a) a suitable inert solvent (i.e., stable and in which Group I–III moieties are soluble, and generally aromatic hydrocarbons) adapted to change from a solid state at substantially a predetermined temperature to a liquid state, and (b) an effective amount (generally about 0.005 to about 0.5 percent preferably about 0.025 to about 0.05 percent by weight) of (1) one or more Group III compounds (pinacyanol iodide, quinaldine red, 1,1'-diethyl-2,2'-cyanine iodide, pinacyanol chloride, thionin, methylene blue, cresol red, chlorophenol red, neutral red iodide, neutral red chloride, crystal violet, acridin orange, toluidine blue O, Orasol Orange RLN TM, Orasol Navy Blue TM, Irgalith Red PR TM, Fat Red BS TM, Xylene Cyanol FF TM, Rhodamine 6G TM, Irgalith Magenta TCB TM, Irgalith Pink TYNC TM, Toluidin blue O TM, Savinyl Green B TM, Savinyl Blue RS TM, purpurin, 3,3'-diethylthiadicarbocyanine iodide, cryptocyanine, Dicyanine A TM, Merocyanine 540 TM, 4-(p-ethoxyphenylazo)-m-phenylene diamine monohydrochloride, Yellow Orange S TM, Chrysoidin G TM, fuchsin, aurintricarboxylic acid (ammonium salt), Victoria Blue R TM, Pyronin G TM, gallein, Erythrosin Yellowish Blend TM, chlorophenol blue, bromophenol blue, bromocresol purple, Coriphosphine O TM, acriflavine, acridine orange, rhoduline violet, Alizarin cyanin 2R TM, Alizarin Red S TM, alcannin, Aurantia TM, Direct Green G TM, Fast Red Salt 3GL TM, Fast Blue Salt BB TM, Fast Garnet Salt GBC TM, Carta Yellow G 180 o/o, muroxide Savinyl Blue GLS TM, Irgalith Blue GLXM TM, phthalocyanine, Di Amingreen B TM, Alizarin Blue S TM, Celliton Blue Extra TM, Janus Green, dimethyl yellow, Fast Yellow, Methyl red sodium salt, Alizarin yellow R TM, Eriochrome black T TM, Chromotrope 2R TM, Ponceau 6R TM, Brilliant Ponceau G/R/2R TM, chromolan yellow, Sudan Red B TM, Bismark brown G TM, Fat Black TM, Resorcin Brown TM, Benzofast pink 2BL TM, Oil Red EGN TM, Euroglaucine, Fuchsin NB TM, parafuchsin, Patent Blue TM, Irgalith Blue TNC TM, Phloxin B TM, fluorescein sodium salt, Rhodamine B base TM, Eosinscarlet, Eosin Yellowish TM, Erythrosin extrabluish, 4,5-dibromo fluorescin, ethyleosin, Phloxine, Cyanovin B TM, chlorocresol green, pinacyanol bromide, 2-(p-dimethylaminostyryl)-1-1-ethyl pyridinium iodide, ethyl red, nigrosine, savinyl blue B TM, Orasol Blue BLN TM, Safranin O TM, Azocarnun G TM, Phenosafranine, Azocarmine BX TM, Solophenyl Brilliant Blue BL TM, Nile Blue A TM, gallocyanine, gallanine blue, celestine blue, methylene green, Azure A/B/C TM, Blue VIF Organol TM, Alizarin, Nitrofast Green GSB TM, quinalizarine, Oil Blue N TM, Solvay purple, Ciba Blue TM, Indigo synthetic TM, Chromophtal Bordeaux RS TM, acid Alizarin Red B TM, 5-Aminofluorescein, Rose Bengal TM, Martius Yellow TM, Chicago Blue 6B TM, Alcian Blue 8GX TM, cresyl violet, 4,4'-Bis(dimethylamino)benzylhdrol, Zinc Pthalocyanine, Sudan III TM, Pyronin Y TM, Toluylene Blue TM, Cresyl Violet perchlorate, Mehdola's Blue TM, 3,3'-diethylthiadicarbocyanine iodide, Phosphine Dye TM, Nitron TM, Cresyl violet acetate, Ceres Orange R TM, 4-phenylazo-1-naphthyl-amine, 4-(4-Di-methylamino-1-naphthylazo-3-methoxybenzene sulfonic acid, Bindschedler's Green TM, and p-(p-dimethylamino phenylazo) benzoic acid and neocyanine) or in the alternative, (2) a similarly small amount of one or more of a Group I body of compounds consisting of the halogenated sulfonphthaleins and organic acids having a pK of less than about four, together with one or more of a Group II body of compounds consisting of the aminotriphenylmethanes and their soluble salts, 8-hydroxyquinoline, and the cyanines (with the proviso that if the Group II compounds consist solely of one or more aminotriphenylmethanes or their soluble salts, then Group I must be selected from one or more of the group consisting of oxalic acid, suitable soluble sulfonic acids, the tetrahalogenated sulfonphthaleins and the other known soluble organic acids having a $pk_1$ of about 2 or less dissolved in the above-mentioned suitable solvents. Examples of Group I compounds suitable for use in this invention are one or more of the group consisting of oxalic acid, maleic acid, dichloroacetic acid, trichloroacetic acid, naphthalene sulfonic acid, benzenesulfonic acid, chloroanilic acid, bromophenol blue, bromothymol blue, chlorophenol red, bromochlorophenol blue, bromocresol green, 3,4,5,6-tetrabromophenolsulfonphthalein, bromophenol red, chlorophenol blue, bromocresol purple, 2,4-dinitrobenzenesulphonic acid, and chlorocresol green. Examples of Group II compounds suitable for use in this invention are ethyl red, crystal violet, pararosaniline, pararosaniline acetate, basic fuchsin, 8-hydroxyquinoline, ethyl violet, brilliant green, pinacyanol chloride, and 3,3'-diethylthiodicarbocyanine. Preferable combinations of Group I and Group II compounds when Group III compounds are not employed are: (1) bromophenol blue: basic fuchsin; (2) chlorophenol blue: ethyl red; (3) chlorophenol red: ethyl red; (4) bromophenol red: ethyl red; and (5) bromochlorophenol blue: brilliant green. If a Group III compound is not employed, the weight ratio of the Group I to Group II compound is more than or about 3 to 1. A Group III compound in an effective amount may be used alone or together with any small amount (preferably less than about 0.5 percent) of Group I and/or Group II compound.

A most preferable solvent system for use in measuring temperatures in the human clinical temperature range is that of ortho-bromonitrobenzene and ortho-chloronitrobenzene (OBNB:OCNB) wherein the ratio of ortho-bromonitrobenzene to ortho-chloronitrobenzene varies from about 56.2:43.8 to about 96.0:4.0, which, when in use with approximately 0.05 percent by weight of Group I-III compounds yields an accurate system for measurement of temperatures from 96.0° F. to 105° F. The OBNB:OCNB solvent system also allows the temperature to be measured within the range of 96° F. to 105° F. within 0.2° F. or 0.1° C.

The invention also contemplates a novel temperature-indicating device comprising (a) a flat or gradually curved heat-conducting carrier having one or more regions defined therein, preferable cavities, to determine a like number of predetermined temperatures at temperatures separated by a constant increment in a predetermined temperature range by means of a like number of different thermally-responsive compositions of matter, each cavity associated with one of the predetermined temperatures and each substantially without impurities, (b) if the novel compositions of our invention are not employed, an indicator means located at the bottom of each said cavities, (c) a transparent means in sealing engagement with a carrier means above each cavity and overlying each of said cavities to form an enclosure for each cavity between the walls of the cavity and the transparent means, and (d) one of said compositions of matter adapted to change from a solid to a liquid at substantially the predetemined temperature associated with said cavity, and in addition, substantially filling the cavity except for a substantially spherical void within said cavity and composition of matter. The novel temperature indicator device does not contemplate the necessity of employing the novel temperature-indicating compositions of matter, but can, in the alternative, employ the "classical" compositions of matter (compositions other than our novel compositions which generally change from opaque to transparent with a corresponding change in phase at a predetermined temperature). On the other hand, if the novel compositions of matter are employed, the indicator means in the novel temperature-indicating device may be eliminated. The invention contemplates use of the novel device for ordinary opaque thermometers where the entire backing material is colored, or when a cover layer of bibulum paper is employed, or when numerals are employed at the bottom of void spaces.

In one aspect, this invention contemplates providing thermally-sensitive compositions which undergo a change of state, i.e., from solid to liquid, at precisely predetermined temperatures with a corresponding change of color visible to the naked eye; such temperature-sensitive compositions being solid solutions of certain organic compounds to be hereinafter described.

In another aspect, the present invention is concerned with providing solid solutions which undergo a change of state rapidly over a very narrow temperature range, e.g., within an accuracy of 1/10° C., or in the alternative, within an accuracy of 2/10° F., so that the solid solutions may be employed for a measurement of temperature within a predetermined temperature range, for example, the clinical range of 96° F. to 105° F. or 35.5° C. to 40.4° C. An example of a device is a disk with three void spaces containing three novel compositions melting at different temperatures which might (a) be placed on a baby's abdomen to detect fever or (b) be placed on a person's forehead to detect a like fever. Such an example has obvious advantages in the detection of malignant hyperthermia; see Nerida M. Dilworth, "THE IMPORTANCE OF CHANGES IN BODY TEMPERATURE IN PAEDIATRIC SURGERY AND ANAESTHESIA", Anaesthesia and Intensive Care, Vol. 1, No. 6 (November 1973) 480 et seq.

Another aspect of this invention is directed to the use of an indicating system associated with the novel compositions of matter so as to obtain a rapid visual indication of the change of state of such material, and hence, the temperature of the test subject.

Furthermore, another aspect of this invention is directed toward the provision of novel compositions of matter which may be applied to other indication or measuring systems other than temperature measuring systems such as those suggested or taught by our invention in which the color change described can be used to indicate a liquid-to-solid or solid-to-liquid change, preferably in a nonpolar solvent or weakly polar solvent induced by pressure, radiation, electromotive forces, or other kinetic energy sources.

In yet another aspect, the invention is directed toward the provision of a novel temperature-indicating device suitable as a disposable thermometer, in which each temperature-sensitive composition of matter used is substantially free of impurities so that said composition of matter upon complete melting has few nucleation sites and is not conducive to resolidification, i.e., the temperature-sensitive composition of matter has the property of stable undercooling and will remain liquid for at least several minutes up to several hours when subjected to a surrounding temperature that is somewhat below the freezing point of the composition.

In yet still another aspect, the present invention is directed toward the provision of a novel temperature-indicating device (comprising a flat or gradually curved heat conducting carrier means with one or more cavities therein and a transparent means in sealing engagement with said carrier means above the cavity) for use of so-called "classical" temperature-sensitive materials, e.g., compositions of matter commonly employed in disposable thermometers which change from opaque to become transparent upon a change in phase from solid to liquid, through the use of a substantially spherical void within said cavity containing the composition of matter determining the temperature to be indicated to magnify the presence of an indicator layer at the bottom of said cavity.

Finally, while other aspects of our invention will become apparent from the detailed description thereof, infra, the overall object of our invention is to provide generally useful improvements in change-of-state thermometers.

The details of the invention pertaining to the novel temperature-indicating device will become more evident from the detailed description to follow with reference to the appended drawings:

FIG. 1 depicts a liquidous curve of a solid solution of ortho-chloronitrobenzene and ortho-bromonitrobenzene for the human clinical range of temperatures. The bands defined by the dash lines in this diagram, greatly exaggerated, represent the limit of accuracy of temperature measurements of this invention, i.e., plus or minus 1/10° C. or approximately plus or minus 2/10° F. The band is shown in substantially exaggerated width (forty or fifty magnitude) in order to facilitate this illustration;

FIG. 2 is a partial plan view from the horizontal of a flat or graduated curved novel heat-conducting carrier having a cavity defined therein, which cavity forms an enclosure for a temperature-sensitive "classical" composition of matter therein when such cavity is covered by a transparent cover sheet means in sealing engagement with the carrier means overlying the heat-conducting carrier means and above the cavity; the figure also depicts a substantially spherical cavity inside the temperature-sensitive composition of matter;

FIG. 3 is a vertical section taken along line 3—3 of FIG. 2; it is the partial plan view of the cavity when taken from the overhead of the cavity of FIG. 2 when a painted material is at the bottom of said cavity in an indictor means;

FIG. 4 is a vertical section taken along line 4—4 of FIG. 2; it is a partial plan view taken from the overhead of the cavity of FIG. 2 when a painted material is magnified due to a spherical cavity in the "classical" composition, when said composition of matter has melted;

FIG. 5 is a partial overhead plan view of a thermometer over part of the human clinical range of temperatures embodying the principles of this invention in degrees Celsius;

FIG. 9 is a cut-away three-dimensional view from a skewed angle of a thermometer comprising a heat-conducting carrier means with a grid of cavities thereon, enclosed in a case so that only a handle of the heat-conducting carrier means protrudes;

FIG. 10 is another three-dimensional view from the same skewed angle as FIG. 9 of the thermometer when removed from the case of FIG. 9, except that it reveals a clinical temperature scale from 96.0° F. to 104.8° F. in the form of a grid of cavities in the heat-conducting carrier means;

FIG. 11 is a partial plan horizontal view taken along line 11—11 in FIG. 10, revealing several cavities in the heat-conducting carrier means, each surrounded by a transparent cover sheet means and a bottom transparent bottom plate means;

Figure 1:
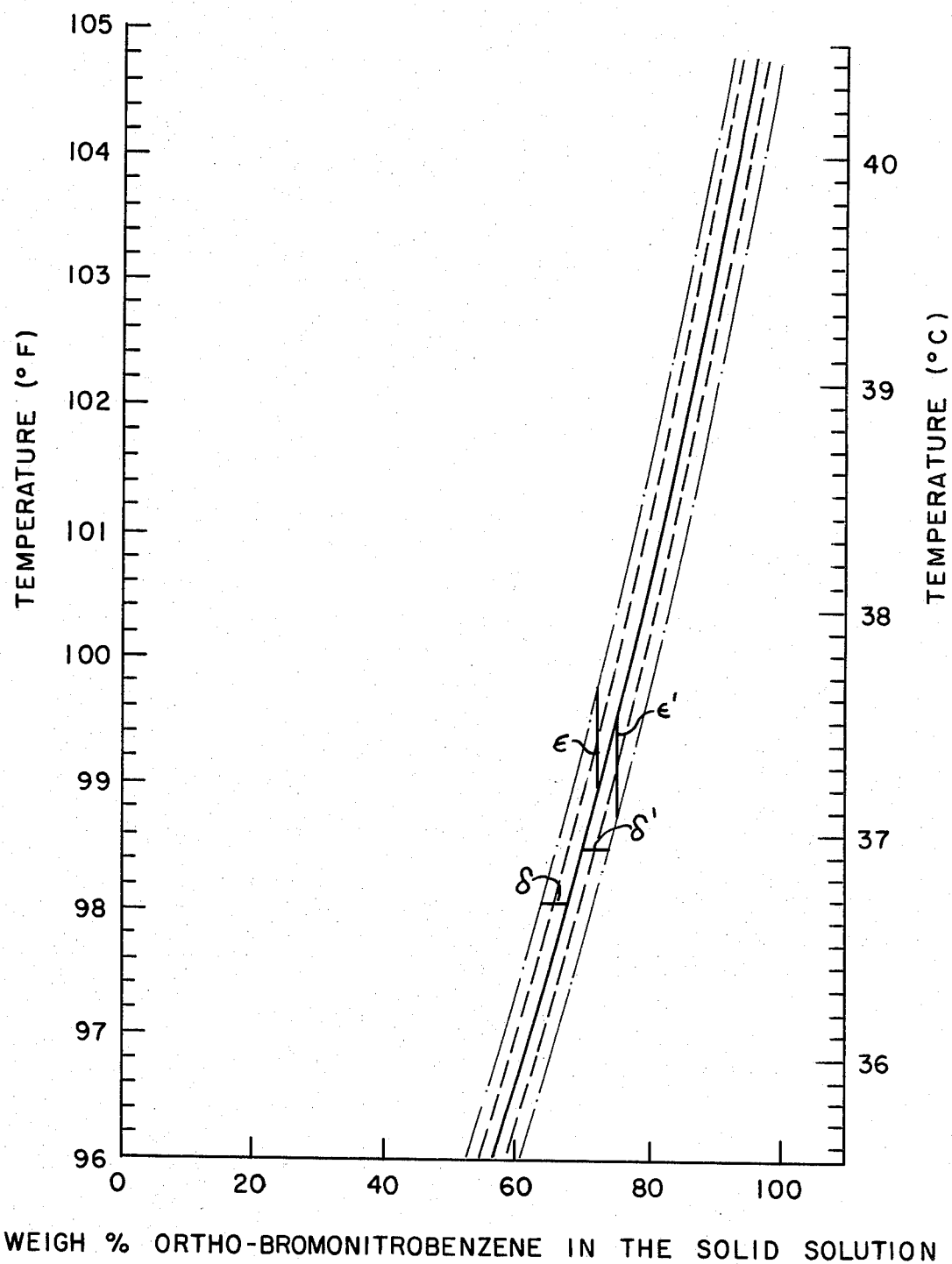

Throughout the Detailed Description below, the terms "novel thermally-responsive substance", "novel thermally-responsive material", "novel temperature-indicating compositions of matter", "novel temperature-sensitive solid solutions", "novel temperature-indicating solid solutions", and "novel solid solutions", or variations thereof, are used interchangeably to denote the same novel materials of our invention. Otherwise, the term "compositions of matter" or "classical compositions of matter" are used interchangeably to denote compounds which change only from being opaque to transparent with a corresponding change from the solid to liquid state, or vice versa.

DETAILED DESCRIPTION OF THE PREFERRED EMBODIMENT

1. Novel Compositions of Matter

It has now been discovered unexpectedly that certain organic compounds (to be described hereinafter) form novel solid solutions which undergo a change in state from solid to liquid at precise and predetermined temperatures with a corresponding change in color visible to the naked eye, and likewise, from liquid solutions which undergo a change in state from liquid to solid at precise and predetermined temperatures with a corresponding change in color visible to the naked eye. The term "solid solution" is well known and usually refers to a homogenous solution of one solid in another. The novel solid solutions contemplated in the present invention are composed of two or more, preferably three or four, different organic compounds with varying proportions of at least two compounds which form a solvent for the solution. Each novel solid solution undergoes a rapid change of state at a precise and predetermined temperature or substantially thereabouts. By a "change in color visible to the naked eye" of a source we mean a change in the wavelength of luminous flux of light (from the source distributing or reflecting such energy in the region of the Electromagnetic Spectrum from about 3900 Angstrom units to about 7600 Angstrom units before or after the change, or preferably both) visible to a person of normal vision and eyesight wherein the intensity of the luminous flux surrounding the source is more than or about 5 lumens per square foot (ft-c). in most instances, this change in the wavelength of luminous flux to the eye will be at least about 175 Angstroms, and preferably at least about 500 Angstroms.

Preferably, when a small but effective amount (generally a weight fraction from about 0.005 to 0.2 weight percentum, and generally about 0.05 weight percentum of the entire composition, but the optimum may be more or less upon experimentation, depending on the Group I-III compounds selected and the solvent selected, up until both phases appear dark, appear the same color, or the melting point becomes too broad for the use desired—some latitude for experimentation is present here) of one or more of Group III compounds: pinacyanol iodide, 1,1'-diethyl-2,2'-cyanine iodide, quinaldine red, pinacyanol chloride, thionin, methylene blue, cresol red, chlorophenol red, neutral red iodide, neutral red chloride, crystal violet, acridin orange, Orasol Orange RLN TM, Orasol Navy Blue TM, Irgalith Red PR TM, Fat Red BS TM, Xylene Cyanol FF TM, Rhodamine B, Rhodamine 6G TM, Irgalith Magenta TCB TM, Irgalith Pink TYNC TM, Toluidin Blue O TM, Savinyl Green B, Savinyl Blue RS TM, purpurin, 3,3'-diethyl-thiadicarbocyanine iodide, cryptocyanine, Dicyanine A TM, Merocyanine 540 TM, 4-(p-ethoxyphenylazo)-m-phenylene diamine monohydrochloride, Yellow Orange S TM, Chrysoidin G TM, fuchsin, aurintricarboxylic acid (ammonium salt), Victoria Blue R TM, Pyronin G TM, gallein, Erythrosin Yellowish Blend TM, chlorophenol blue, bromophenol blue, bromocresol purple, Coriphosphine O TM, acriflavin, acridine orange, rhoduline violet, Alizarin cyanin 2, R TM, Alizarin Red S TM, alcannin Aurantia TM, Direct Green G TM, Fast Red Salt 3GL TM, Fast Blue Salt BB TM, Fast Garnet Salt GBC TM, Carta Yellow G 180 o/o Murexide, Savinyl Blue GLS TM, Irgalith Blue GLSM TM, phthalocyanine, Di Amingreen B TM, Alizarin Blue S, Celliton Blue Extra TM, neocyanine, Janus Green TM, dimethyl yellow, Fast Yellow, Methyl red sodium salt, Alizarin yellow R TM, Eriochrome black T TM, Chromotrope 2R TM, Ponceau 6R TM, Brilliant Ponceau G/R/2R TM, chromolan yellow, Sudan red B TM, Bismarck brown G TM, Fat Black TM, Resorcin Brown TM, Benzofast pink 2BL TM, Oil Red EGN TM, Euroglaucine, Fuchsin NB TM, parafuchsin, Patent Blue TM, Irgalith Blue TNC TM, Phloxin B TM, fluorescein sodium salt, Rhodamine B base TM, Eosinscarlet, Eosin Yellowish TM, Erythrosin extrabluish, 4,5-dibromofluorescein, ethyleosin, Phloxine TM, Cyanosin B TM, chlorocresol green, pinacyanol bromide, 2-(p-dimethylaminostyryl)-1-ethyl pyridinium iodide, ethyl red, nigrosine, savinyl blue B TM, Orasol Blue BLN TM, Safranin O TM, Azocarnun G TM, Phenosafranine, Azocarmine BX TM, Solophenyl Brilliant Blue BL TM, Nile Blue A TM, gallocyanine, gallamine blue, celestine blue, methylene green, Azure A/B/C TM, Blue VIF TM Organol TM, Alizarin, Nitrofast Green GSB TM, quinalizarine, Oil Blue N TM, Solvay purple, Ciba Blue TM, Indigo synthetic TM, Chromophtal Bordeaux RS TM, Acid Alizarin Red B TM, 5-Aminofluorescein, Rose Bengal TM, Martius Yellow TM, Chicago Blue 6B TM, Alcian blue 8GX TM, cresyl violet, 4,4'-Bis(dimethylamino)benzylhdrol, Zinc Pthalocyanine, Sudan III TM, Pyronin Y TM, Toluylene Blue TM, Cresyl Violet perchlorate, Mendola's Blue TM, 3,3'-diethylthiadicarbocyanine iodide, Phosphine Dye TM, Nitron TM, cresyl violet acetate, Ceres Orange R TM, 4-phenylazo-1-naphtyl-amine, 4-(4-Dimethylamino-1-naphtylazo-3-methoxybenzene sulfonic acid, Bindschedler's Green TM, and p-(p-dimethylaminophenylazo)benzoic acid, or one of the other organic moieties to be described (one or more Group I compounds with one or more Group II compounds) is combined with a suitable solvent, for example, a pure mixture of ortho-chloronitrobenzene and ortho-bromonitrobenzene for use in clinical applications, the temperature of the change of state of a number of solid solutions with a corresponding change in color may be accomplished at approximately 1/10° C. or 2/10° F. intervals, i.e., a change of state of one novel temperature-sensitive composition of matter at a temperature 1/10° C. or 1/5° F. different from the temperature of chance in state of another novel composition of matter in an adjacent region containing another proportion of the same organic moieties in ortho-chloronitrobenzene and ortho-bromonitrobenzene. Thus, for example, in human clinical applications where temperature measurements in the range of 96° F. to 105° F. (or from 35.5° C. to 40.5° C.) are usually desired, 45 to 50 different solid solutions differing in their percentage compositions but otherwise made from the same two components) will provide all of the necessary temperature gradations at increments of 2/10° F., i.e., 96.0°, 96.2°, 96.4°, etc., up and including 104.8° F., or in the alternative 35.5°, 35.6°, 35.7°, up and including 40.4° C. The solution of ortho-chloronitrobenzene and ortho-bromonitrobenzene, when the ortho-bromonitrobenzene varies from 56.2 weight percent to 96.0 weight percent, provides an excellent starting mixture for determination of temperatures in the human clinical temperature range. Usually the addition of the Group I-III organic moieties (hereinafter sometimes "organic moieties") consisting of a small but effective percentage of one or more of the aforesaid Group III compounds, or a combination of one or more Group I compounds with one or more Group II compounds affects the temperature curve in FIG. 1 by only a small increment e or e', which is substantially constant along the entire curve. Regardless of the solvent system selected for a given predetermined temperature range, it is necessary that the organic moieties selected for the color change constitute a small but effective amount of moieties, e.g., at least that amount sufficient to provoke a color change visible to the naked eye, and preferably up to a saturated solution of Group I-III organic moieties, and most preferably about 0.005 to about 0.2 weight percent of an inert, preferably aromatic solvent constituents, constituting the remaining balance of the mixture. The Group I-Group III moieties may in some instance exceed 0.2 weight percentum as long as the melting point remains sharp and both phases are not so dark as to eliminate a color change visible to the naked eye. If too small an amount of organic moieties is employed, the colors and the color change are too faint under weak light; if too large an amount is employed, the colors are too dark and the color change is harder to visualize and there is a possibility that the sharpness of the melting point will affected. It is also noted that the organic moieties and suitable solvent to be described should be substantially free of impurities, generally, such impurities should be kept less than three tenths of one percent of the entire composition. Supersaturated solutions are not preferred for reasons to be enumerated below.

It must be emphasized from the outset that once a proposed solvent system has been selected (consisting of one or more compounds) for the temperature(s) to be determined, the compound(s) of the system must be tested for the Group I-III moieties for stability (i.e., inertness) and Group I-III moieties are soluble in the compound(s) of the solvent. This must be done by routine testing, within the skill of those in the art. Only after the solvent system compound(s) are shown to dissolve the Group I-III moieties and be inert towards them, can such a solvent system be suitable for our invention.

While sometimes under fortuitous circumstances the solvent system may consist of only one compound, in most instances (as those skilled in the art will appreciate) the temperature to be determined will not readily be obtainable without mixing two or more organic compounds for the solvent system. Hence, for a temperature-indicating device, two or more related organic compound constituents in the solvent are especially helpful for measuring forty or more temperatures located at regular increments.

It is apparent from the foregoing description that the selection of one or more inert solvents towards the organic moieties for use in the novel composition of matter requires judicious and careful scrutiny, since not all organic compounds are useful for this purpose and many may fall outside a desired temperature range. A suitable solvent may be any solvent which is inert towards the organic moieties and in which the organic moieties are soluble while the solvent is in the liquid phase. In some instances, simple alcohols and other organic substances may be suitable (see Table 3) rather than aromatic compounds. The organic compounds which are particularly adapted for the formations of solid solutions which can serve a novel temperature-indicating composition in accordance with the present invention are generally those which are aromatic weakly polar (e.g., compounds which are immiscible in water and have a dielectric constant less than about 35) or moderately polar aromatic organic compounds, as well as the requirements of organic moiety solubility and inertness towards the organic moieties. Thus, it has been discovered that weakly polar or moderately polar aromatic organic compounds, which have analogous chemical structures (e.g., analogs, homologs and optical isomers), have substantially the same molecular volume or have similar crystalline structures (e.g., isomorphous) and which form the novel solid solutions useful for the purpose of this invention, are especially useful for solvent system constituents in preparing a grid of novel composition of matter to be used in predetermined temperature range for the determination of a temperature falling within said range. In addition, it is preferable that the solvent solutions have a linear or a substantially linear temperature composition liquidous curve, particularly over the desired temperature range such as, for example, over the human clinical temperature range. Exemplary weakly polar or nonpolar aromatic solvents are orthochloronitrobenzene, ortho-bromonitrobenzene, naphthalene, 2-ethoxybenzamide, 1-thymol, 2-naphthol, ortho-iodonitrobenzene, meta-iodonitrobenzene, para-iodonitrobenzene, para-chloronitrobenzene, meta-bromonitrobenzene; para-dibiomonitrobenzene and para-toluic acid. It must be emphasized, of course, that a suitable solvent useful for one selection of organic moieties may not be useful for another, and that an operable solvent at one temperature range may not work at a different range. It is recommended that for a given temperature to be measured, one may start his investigation for the appropriate temperature(s) to be determined a suitable solvent system selected from compounds from the following:

(1) moderately polar or weakly polar aromatic compounds, i.e., compounds having a dielectric constant of less than about 35;

(2) water; or (3) aromatic and aliphatic compounds other than (1)-(2) which are germane to the temperatures to be determined, and which are "inert" to the Group I-III dyes.

The constituents of the novel compositions of matter comprise:

(1) a solvent (I) consisting of a single substance or a mixture of substances and adapted to change from a solid state at substantially a predetermined temperature to a liquid state and (2) an indicator system (II) consisting of one or more substances different from (I), characterized in that (a) (II) is soluble in (I) when the latter is in the liquid phase, and (b) (II) changes color visible to the naked eye when (I) passes from the solid to the liquid phase or from the liquid to the solid phase.

It is well within the range of knowledge of those skilled in the art to find for a given temperature range to be measured, and for color change desired (choosing from the various Group I-III compounds) a suitable solvent, i.e., one which is in toward the Group I-III compounds and for which the latter a soluble in the liquid phase to said solvent.

The solid solutions made from ortho-chloronitrobenzene and ortho-bromonitrobenzene have been found to be most preferable for use in temperature measurements in the clincal range within the aforesaid accuracy. Of course, as it will be readily understood by those skilled in the art, any two or more aromatic solvents as defined above in which the organic moieties to be described below are soluble, stable and inert, may be employed for thermometers if adaptable to the temperature range to be tested, and if capable together of forming a homogenous solid solution.

Preferably the novel composition of matter consists essentially of:

(A) a suitable solvent adapted to change from a solid state at a predetemined temperature to a liquid state, and (B) an effective amount of one or more suitable organic moieties soluble in said solvent in the liquid state and adapted to change the color of the composition visible to the naked eye upon the change of state of the solvent at substantially the predetermined temperature and selected from one or more of the group consisting of (1) a group III body of single compounds consisting of the cyanine class of dyes, suitable dyes from the following classes: monoazo, diazo, triarylmethane, xanthene, sulphonephthalein, acridul, guinoline, azine, oxazine, thiazine, anthraquinone, indigold, and the following individual compounds: Aurantia TM, Orasol orange RLN TM, Diamin green B TM, Direct green G TM, Fast Red salt 3 GL TM, Fast blue salt BB TM, Fast Garnet salt GBC TM, Carta Yellow G 180 o/o TM, Murexide, Savinyl blue GLS, Irgalith blue GLSMυ, Phthalocyanine and Alcannin, (2) mixtures of:

(a) one or more organic acid compounds, having a pk of less than about four, and (3) mixtures of (a) one or more organic acids having a pK of less than about 2 and (b) one or more acid dyes or acid indicators (4) mixtures of (a) one or more organic acid compounds having a pk of less than about 4 and (b) one or more members of the group I body of compounds, (5) mixtures of (a) one or more basic dyes or basic indicators and (b) one or more members of the group I body of compounds, (6) mixtures of (a) one or more dyes having a molecular structure containing a lactone group, and (b) one or more acids having a pk of about 8 to about 12.

The compounds mentioned in group III are classified according to the Colour Index, 3rd Edition (1971), published by the Society of Dyers and Colourists, Great Britain and Conn's Biological Stains (9th ed 1977).

Suitable monoazo dyes are: 4-(p-Ethoxyphenylazo)-m-phenylene-diamine monohydrochloride, Orasol Navy Blue TM, Organol Orange, Janus Green TM, Irgalith red P4R, Dimethyl yellow, Fast Yellow, Methyl red sodium salt, Alizarin Yellow R TM, Eriochrome Black T, Chromotrope 2R, Ponceau 6R, Yellow Orange S TM, Brilliant Ponceau 5R TM, Chrysolidin G TM, Eriochrome black A, Benzyl orange, Brilliant Ponceau G/R/2R TM and chromolan yellow.

Suitable disazo dyes are: Fat red BS TM, Sudan Red B TM, Bismarck Brown G TM, Fat Black TM, Resorcin Brown TM, Benzofast Pink 2 BL TM and Oil Red EGN TM.

Suitable triarylmethane dyes are: Methyl violet, Xylene cyanol FF TM, Erioglaucine TM, Fuchsin NB TM, Fuchsin, Parafuchsin, Aurintricarboxylic acid ammonium salt, Patent Blue, Victoria blue R TM, Crystal violet and Irgalith Blue TNC TM.

Suitable xanthene dyes are: Phloxin B, Fluorescein sodium salt, Rhodamine B TM, Rhodamine B Base, Rhodamine 6G TM, Pyronin G, Irgalith Magenta TCB TM, Irgalith Pink TYNC TM, Eosin Scarlet TM, Eosin Yellowish, Erythrosin extra bluish TM, 4'5'-Dibromofluorescein, Ethyl eosin, Gallein, Phloxine TM, Erythrosin yellowish Blend TM and Cyanosin B TM.

The suitable sulphonephthaleins are: cresol red, chorophenol red, chlorophenol blue, bromophenol blue, bromocresol purple and chlorocresol green.

The suitable acridine dyes are: Corisphosphine O TM, Acriflavine and acridine orange.

The most suitable quinoline dyes are: pinacyanol chloride, pinacyanol bromide, pinacyanol iodide, quinaldine red, cryptocyanine, 1,1'-Diethyl-2,2'-cyanine iodide, 2-(p-Dimethylaminostyryl)-1-ethyl-pyridinium iodide, 3,3'-Diethylthiadicarbocyanine iodide, ethyl red, Dicyanine A, Merocyanine 540 TM and Neocyanine TM.

The suitable azine dyes are: Neutral red chloride, Neutral red iodide, Nigrosine TM, Savinyl blue B TM, Orasol blue BLn TM, Safranin O TM, Azocarmin G TM, Phenosafranine TM, Azocarmine BX TM and Rhoduline violet.

The suitable oxazine dyes are: Solophenyl Brilliant Blue BL TM, Nile blue A TM, Gallocyanine TM, Gallamine Blue TM and Celestine blue.

The suitable dyes are: Methylene blue, Thionin, Toluidine Blue O, Methylene Green and Azure A/B/C TM.

The suitable anthraquinone dyes are: Savinyl Green B TM, Savinyl Blue RS, D+C Green 6 TM, Blue VIF Organol TM, Alizarin, Alizarin Cyanine 2R TM, Celliton Blue Extra TM, Alizarin Blue S TM, Nitro Fast Green GSB, Alizarin red S, Chinalizarin, Oil blue N, Solvay purple TM and Purpurin TM.

The suitable indigold dyes are: Ciba Blue TM, Indigo Synthetic TM, Chromophtal Bordeaux RS TM and Thioindigo red.

Instead of one or more group I compounds, to be used in the novel composition of matter, mixtures can be employed.

The group of organic acidic compounds with a pk less than about four generally consists of organic acids and/or the halogenated sulfonphthaleins, which are soluble in the selected solvent, when the latter is in the liquid state. Examples of these acids include oxalic acid, maleic acid, dichloroacetic acid, trichloroacetic acid, 2-naphthalene-sulphonic acid, chloroanilic acid, bromophenol blue, bromothymol blue, chlorophenol red, bromochlorophenol blue, bromocresol green, 3,4,5,6-tetrabromophenol-sulfonphthalein, bromophenol red, chlorocresol green, chlorophenol blue, bromocresol purple and 2,4-dinitrobenzenesulphonic acid.

The group of basic dyes or basic indicators are generally the aminotriphenyl methanes, also known as the triaryl methanes, or their soluble salts, 8-hydroxyquinoline and the quinoline dyes, preferably the cyanines. Examples are: basic fuchsin, pinacyanol iodide, pinacyanol chloride, pinacyanol bromide, 2-p-(dimethylaminostyryl)-1-ethyl-pyridinium iodide, crystal violet, cryptocyanine, dicyanine A, 3,3'-diethylthiacarbocyanine iodide, 1,1'-diethyl-2,2'-cyanine iodide, ethyl red, quinaldine red, ethyl violet, brilliant green, pararosaniline, pararosaniline acetate, 8-hydroxy-quinoline, 1-ethylpyridinium iodide and 5-(p-dimethylaminobenzilidine) rhodanine.

Preferably the weight of the acid compounds is about three or more times the weight of the basic compounds.

The above-mentioned pk values refer to the pk values as measured in water. Generally it is preferred that the pk of the acidic compound is lower than the corresponding pk value of the basic compound. Preferably the acid compounds have a pk value less than about four and the basic compounds have a pk value less than about 5.

It should be noted that when the basic compound consists solely of one or more aminotriphenylmethanes or their soluble salts, the acid compound must be selected from the group consisting of tetrahalogenated sulphonphthaleins and the other organic acids having a pk of less than about 2.

Preferred combinations of acidic compounds having a pk less than about 4 and basic dyes or basic indicators are bromophenol blue/basic fuchsin, chlorophenol blue/ethyl red and trichloroacetic acid/3,3'-diethylthiadicarbocyanine iodide.

Mixtures of one or more organic acids having a pk less than about 2 and one or more acid dyes or acid indicators, used in the novel composition of matter, changes color when the solvent passes from the solid into the liquid phase or reversed. In this combination the acid dyes used are preferably halogenated sulfonphthaleins.

Mixtures of one or more organic dyes, having a molecular structure containing a lactone group and one or more acids having a pk of about 8 to about 12, used in a solvent also change color when the solvent passes from the solid phase into the liquid phase or reversed. In that combination the preferred compounds are crystal violet lactone and one or more of acids such as phenol, bisphenol A, pyrocathechol or 3 nitrophenol.

The novel compositions of matter most preferably comprise (a) a suitable inert solvent as described above adapted to change from a solid state to a liquid state at substantially the predetermined temperature and (b) one or more organic moieties soluble in said solvent and adapted to change color upon the change in state of the solvent at substantially the predetermined temperature when so dissolved, and selected from:

(1) one or more Group III compounds consisting of: pinacyanol iodide, quinalidine red, 1,1'-diethyl-2,2'cyanine iodide, pinacyanol chloride, thionin, methylene blue, cresol red, chlorophenol red, neutral red, iodide, neutral red chloride, crystal violet, acridin orange, toluidin blue O, Orasol Orange RLN TM, Orasol Navy Blue TM, Irgalith Red PR TM, Fat Red BS TM, methyl violet, Xylene Cyanol FF TM, Rhodamine B TM, Rhodamine 6G TM, Irgalith Magenta TCB TM, Irgalith Pink TYNC TM, Toluidin Blue O TM, Savinyl Green B TM, Savinyl Blue RS TM, purpurin, 3,3'-diethylthiadicarbocyanine iodide, cryptocyanine, Dicyanine A, merocyanine 540, 4-(p-ethoxyphenylazo)-m-phenylene diamine monohydrochloride, Yellow Orange S TM, Chrysidan G TM, fuchsin, Aurintricarboxylic acid (ammonium salt), Victoria Blue R TM, Pyronin G TM, gallein phloxine, Erythrosin Yellow Blend TM, chlorophenol blue, bromophenol blue, bromocresol purple, Coriphosphine O TM, acriflavine, acridine orange, rhoduline violet, Alizarin cyanin 2R TM, Alizarin Red S TM, alcannin, Aurantia, Direct Green G TM, Fast Red Salt 3GL TM, Fast Blue Salt BB TM, Fast Garnet Salt GBC TM, Carta Yellow G 180 o/o TM, murexide, Savinyl Blue GLS TM, Irgalith Blue GLSM TM, phthalocyanine, Di Amingreen B TM, Alizarin Blue S TM, Celliton Blue Extra, neocyanine, Janus Green TM, dimethyl yellow, Fast Yellow TM, methyl red sodium salt, Alizarin yellow R TM, Eriochrome black T TM, Chromotrope 2R TM, Ponceau 6R TM, Brilliant Ponceau G/R/2R TM, Chromolan yellow, Sudan Red B TM, Bismarck Brown G TM, Fat Black TM, Resorcin Brown TM, Benzofast pink 2BL TM, Oil Red EGN TM, Euroglaucine, Fuchsin NB TM, parafuchsin, Patent Blue TM, Irgalith Blue TNC TM, Phloxin B TM, fluorescein sodium salt, Rhodamine B base TM, Eosinscarlet, Eosin Yellowish TM, Erythrosin extra bluish, 4'5-dibromo fluorescein, ethyleosin, Phloxine TM, Cyanovin B TM, chlorocresol green, pinacyanol bromide, 2-(p-dimethylaminostyryl)-1-1-ethyl pyridinium iodide, ethyl red, neutral red, iodide, nigrosine, Savinyl Blue B TM, Orasol Blue BLN TM, Safranin O TM, Azocarnum G TM, Phenosafranine, Azocarmine BX TM, Solophenyl Brilliant Blue BL TM, Nile Blue A TM, gallocyanine, gallamine blue, celestine blue, methylene green, Azure A/B/C TM, Blue VIF Organol TM, Alizarin, Nitrofast Green GSB TM, quinalizarine, Oil Blue N TM, Solvay Purple TM, Ciba Blue TM, Indigo synthetic TM, Chromophtal Bordeaux RS TM, Thiorifolex TM, Acid Alizarin Red B TM, 5-aminoflourescein, Rose Bengal TM, Martius Yellow TM, Chicago Blue 6B TM, Alcian Blue 86X TM, cresyl violet, 4,4'Bis(dimethylamino) benzylhydrol, Zinc Pthalocyanine, Sudan III TM, Pyronin Y TM, Toluylene Blue TM, cresyl violet perchlorate, Mendola's Blue TM, 3,3'-diethylthiadicarbocyanine iodide, Phosphine Dye TM, Nitron TM, cresyl violet acetate, ceres orange R TM, 4-phenylazo-1-naphtyl-amine, 4-(4-Dimethylamino-1-naptylazo)-3-methoxybenzene sulfonic acid, Bindschedler's Green TM, and p-(p-dimethylaminophenylazo)benzoic acid (hereinafterwards referred to as the Group III compounds or or Group III organic moieties), or (2) a binary mixture of:

(A) one or more of a Group I body of compounds (hereinafterwards referred to as the Group I compounds) consisting of (a) the organic acids, which when inserted in the solvent system at conditions other than supersaturation will yield a color change visible to the naked eye, and also have a pK of less than about four and (b) the halogenated sulfonphthaleins; and (B) one or more of a Group II body of compounds (hereinafterwards referred to as the Group II compounds) consisting of the aminotriphenylmethanes and their soluble salts, 8-hydroxyquinoline, and the cyanines, with the proviso that if no Group III compound is present and if the Group II compounds consist solely of one or more aminotriphenylmethanes or their soluble salts, then the Group I compound must be selected from one or more of the group consisting of oxalic acid, suitable sulfonic acids and the tetrahalogenated sulfonphthaleins, and other organic acids having a $pK_1$ of about or less than 2.

Of course, the primary application of the instant invention is where the change in state of the novel composition of matter is induced by temperature forces for use in a temperature-indicating device. By "suitable sulfonic acids" we mean sulfonic acids soluble in the selected solvent; these may be, for example, benzene sulfonic acid, naphthalene sulfonic acid, toluene sulfonic acid, anthracene sulfonic acid, etc., depending on the solvent.

One of the requisites of our invention is that each novel composition have the property of supercooling. We require that if and only if a given composition reaches one hundred percent liquid after melting, will that liquid remain liquid for more than several seconds when withdrawn from the source whose temperature is to be measured; less than one hundred percent melting will cause the composition to return instantaneously to its solid state when the composition is withdrawn from the above-mentioned source. It is only by these means that a commercially useful composition for disposable thermometry can measurably advance the state of the art. We have found, surprisingly, that the best method of obtaining the "undercooling property" in each of our novel compositions of matter is to render them substantially free of impurities to the extent stated below, although doubtlessly the undercooling effect can be made through different alternative mechanisms—for example, several organic solvents exist for the Group I-III compounds (high molecular weight aliphatic alcohols) which become suddenly very viscous in their liquid state close to solidification, so that they possess the undercooling property despite the presence of some impurities, i.e., these compounds form glasses. Hence, this limited number of solvents are equivalent to the general solvents used in our invention which are substantially free from impurities.

The novel composition should therefore be substantially free from impurities, i.e., they should have few impurities that are soluble in the novel compositions of matter (generally which may not exceed about 0.3 percent), and have few solid foreign substances that react with the novel composition or that might induce instantaneous resolidification after melting (i.e. immediate reversibility). Impurities are defined as any substance other than the Group I-III moieties and the suitable solvents and may be soluble or insoluble, but exclude suitable nucleating agents used in an effective amount. Generally, if these soluble substances are less than about 0.3 weight percent of the entire composition, the desired undercooling effect will not be altered. Too great an amount of soluble impurity results in a broad melting point for a given composition or separation of the Group I-Group III moiety(s) from the suitable solvent. On the other hand, a very small amount of a soluble impurity inert to the composition (generally less than about 0.3 percent) may act in the same desirous manner as the recited insoluble suitable nucleating agents. If the weight percentum of these soluble substances is less than about 0.1 weight percent, the desired undercooling effect will almost always be observed. It must be noted that any insoluble foreign substance chemically inert to the combination of the Group I-Group III moieties and the suitable solvent may be utilized as a suitable nucleating agent so long as the foreign substance does not induce instantaneous resolidification at temperatures just below the melting point. Examples of suitable insoluble nucleating agents are given below (most preferably talc) and are employed in an effective amount to promote resolidification of the novel composition at a predetermined gradient below the melting point so long as absorption of the Group I-Group III moieties by the nucleating agent is within an acceptable range. Too great an amount of nucleating agent results in unacceptable absorption of the Group I-III moieties by the nucleating agent, and removal of the otherwise occurring change in color visible to the naked eye. Generally, the upper limit of suitable insoluble nucleating agent varies from 0.1 to 10 weight percent of the composition, depending upon the suitable nucleating agent, suitable solvent, and Group I-III moiety(s) selected. For example, in an OCNB-OBNB system with 0.05 weight percent pinacyanol iodide, an effective amount of talc (as a suitable nucleating agent) is preferably from about 0.01 to about 1.5 weight percent of the entire composition (and even up to in some circumstances ten percent and higher), depending on the gradient between melting point and recrystallization temperature selected. We have found 0.1 percent to be most preferable and that high concentrations may affect the color change for a particular system. If too great an amount of talc is used (over about two percent), in a pinacyanol iodide/OCNB-OBNB system, the composition is always blue whether in a liquid or solid state. Hence, as will be recognized by one skilled in the art, a suitable nucleating agent may consist of (1) any insoluble foreign substance inert to the Group I–III moieties and the suitable solvents, so long as the foreign substance does not induce instantaneous solidification, or (2)' a substance soluble in and inert to the composition, but limited to less than about 0.3 weight percent of the composition.

An interesting phenomena exhibited by the novel compositions is illustrated by the example of a composition essentially consisting of pinacyanol iodide (at 0.035 weight percent) in ortho-bromonitrobenzene:ortho-chloronitrobenzene (75:25) solvent. In the liquid phase this composition is blue, and in the solid phase appears rose/tan. However, if the composition is chilled to a very low temperature at a very high rate of cooling initially, the color of the solid appears purple. As the composition is allowed to warm to room temperature, the color changes from purple to rose/tan, requiring about 3–5 minutes for the color to become rose/tan. (Similar phenomena have been observed with other novel compositions containing other Group III moieties or other Group I plus Group III combinations.

During solidification of the composition the chlorophenol red is concentrated in the remaining liquid part of the solvent. When the solidification has been completed the solid has a nice red color. Microscopic investigation of the solid composition shows that the chlorophenol red particles have been substantially separated from the solvent crystals. In our opinion the intramolecular rearrangement of a sultone group, when the chlorophenol red is dissolved in the liquid solvent, into a quinone structure, when the chlorophenol red is separated, is responsible for this color change.

When the indicator system comprises more than one component, the color change often will be caused by chemical reactions between the indicator compounds.

Why pinacyanol iodide changes its color upon being separated from the sovlent compounds is not fully understood at this time.

The color change may be caused by an intermolecular interaction between the pinacyanol ion and the counter ion. It is most likely that the pinacyanol iodide crystals, being formed upon separation of the solvent, consist of a stack structure with columns of positive dye ions and negative counter ions. Such a structure might give raise to a drastic change in resonance as compared with the unpertubed state of dissolved pinacyanol iodide.

Another example of an especially preferred group I compound is chlorophenol red at a concentration of about 0.05 percent by mass. When dissolved in a solvent such as OCNB/OBNB, dibenzofurane, para-toluic acid and other halogen nitrobenzenes, the liquid composition has a yellow color.

As enumerated above, in the absence of one or more Group III compounds to be used for the organic moieties in the solvent system, one or more of a Group I body of compounds must be employed together with one or more of a Group II body of compounds. The Group I body of compounds generally consist of (a) the organic acids, which when inserted in the solvent system (at conditions other than supersaturation) will yield a color change visible to the naked eye, and have a pK of less than about four, and (b) the halogenated sulfonphthaleins which are soluble in the selected weakly polar or nonpolar aromatic solvent described above. Preferably, the Group I compound has a pK of between zero and three, and most preferably between about zero and about two. Examples of this Group I body of compounds include oxalic acid, naphthalenesulfonic acid, trichloroacetic acid, bromophenol blue, bromothymol blue, chlorophenol red, bromochlorophenol blue, bromocresol green, 3,4,5,6-tetrabromophenol sulfonphthalein, bromophenol red, and chlorocresol green. Some compounds, such as maleic acid, will work if soluble in the predetermined solvent system employed if the correct Group II compound is chosen.

These first groups of compounds, which are generally the halogenated sulfonphthaleins, are derivatives of the sulfonphthaleins, to wit, phenol blue, cresol red and phenol red. It may be observed that the halogenated sulfonphthaleins are different from the basic or unsubstituted sulfonphthaleins in the following ways: first, the unsubstituted compounds are diprotic acid/base indicators, each having pK values of (1) a $pK_1$ of about 2 and (2) a $pK_2$ of about 7 to about 9. The halogenated derivatives show only one pK which is much lower than the $pK_2$ of the unsubstituted sulfonphthalein. Because there are halogen substituents on the sulfonphthalein molecule, it is our belief (while we do not limit the invention to the validity of our theory) that the pK value is reduced and the acid strength of the Group I is increased. As a consequence of this, the halogenated derivatives will respond in combination with one or more of the Group II compounds enumerated below to produce the color reaction. For example, in a OCNB-OBNB solvent system and in combination with basic fuchsin (a Group II material), bromochlorophenol blue (a Group I material) gives a green color in the solid phase and a strikingly red color in the liquid phase. This is very similar to the color found when the bromophenol blue (a Group I compound) is combined with basic fuchsin in the same ortho-chloronitrobenzene:ortho-bromonitrobenzene solvent system.

The Group II compounds, which are generally the aminotriphenylmethanes, their soluble salts, 8-hydroxyquinoline, and the cyanines, act in our opinion as constituents which perform a "dye" function. Of course, as indicated by the disclosure above, a Group I compound may also act as a "dye" function. Examples of Group II compounds include ethyl red, crystal violet, pararosaniline (or "para Rosaniline Base"), pararosaniline acetate (or "para Rosaniline acetate"), basic fuchsin, 8-hydroxyquinoline, ethyl violet, brilliant green, pinacyanol chloride, and 3,3-diethylthiodicarbocyanine iodide. The Group I compounds are preferably selected from the group consisting of bromophenol blue, bromochlorophenol blue, and bromothymol blue. One will notice that the second group of compounds generally consist of dyes which have basic nitrogen groups either as substituent amines or in heterocyclic rings. In general, the addition of one or more of the first group of compounds along with the second group of compounds to a solution of the previously described nonpolar or weakly polar aromatic solvent(s) such as ortho-chloronitrobenzene and ortho-bromonitrobenzene solutions will provide a color difference between the solid and liquid phases of the aromatic solvent. It is preferred that the total weight of the Group I and Group II compounds be about 0.025 to about 0.05 total weight percent of the entire weight of the novel compositions of matter. It is advised that the melting point of the Group III or Group I and Group II moieties be more than the melting point of the solvent system. It is preferred that the melting point of each of the Group I and Group II constituents be substantially more than the melting point of the solvent system selected, and it is much preferred that these Group I and Group II compounds melt at more than sixty degrees above the melting point of the solvent system. A basic requirement is that at least one of the Group I and Group II compounds reflects or absorbs light in the visible area of the spectrum on or below the melting point of the solvent system or, in the alternative, on or above the melting point of the solvent system, or both, in different colors so that a change in color is visible to the naked eye. It is also preferred that the Group I compounds weigh three or more times the weight of the Group II compounds. While 0.05 weight percent of the total of the Group I and Group II compounds or Group III compound(s) is most preferred, any effective amount from the smallest for which the change in color is visible to the naked eye upon change in phases is satisfactory, and certainly no more than the solubility limits of the Group I and Group II compounds (or Group III compound(s)) in the sovlent system at the melting point of the solvent system. Too great an amount of Group I–III organic moieties renders the compositions obtained darker than necessary so that the color change is harder to detect; likewise, the melting point might also be affected. A supersaturated solution of Group I and Group II compounds (or Group III compound(s)) in the solvent system, is not preferred, since Group I–III compounds are substantially more expensive than the solvent system constituents and an excess of them will be extravagant. Any pressure may be employed in making or in using the novel composition(s) of matter in a temperature-indicating device so long as the solvent does not generate a substantial vapor in the application for the composition. If a Group III compound is not employed, it is preferred that the Group I compound have a lesser $pK_1$ and $pK_2$ value than the corresponding pK values of the Group II compound. Preferably, the Group II compound should have a $pK_1$ value of less than about 5, and the Group I compound should have a $pK_1$ of less than about 4.

As it will be appreciated by those skilled in the art, it is possible with the disclosure given above to combine almost any Group I compound of indicated pK, which is soluble in the solvent system selected, (a solvent system of ortho-bromonitrobenzene: ortho-chloronitrobenzene, for example) and a complementary acid base material from Group II and generate practically any desired change in color. The considerations for those skilled in the art will be (1) the selection of Group III and/or Group I and Group II compound(s) which yield a satisfactory change in predetermined colors; (2) that these compounds are soluble in the solvent system in the liquid state; (3) that the solvent system be properly determined for the temperature range desired; (4) that the Group I and/or Group II compounds (or Group III compounds) be soluble in the desired system, and (5) if pertinent, that one compound of the Group I compounds react as a strong acid against one or more of the Group II compounds in the solvent system.

As it will be recognized by those skilled in the art, one may employ combinations of more than one Group III moiety, or a combination of a Group III moiety and a Group I moiety, or a combination of a Group II moiety and Group III moiety, or more than one Group I moiety with more than one Group II moiety to obtain color shifts generally not found in a single system, e.g., a mixture of pinacyanol iodide and quinaldine red (two Group III compounds) yields a tan solid and deep dark purple liquid. There are some instances where two Group I compounds may be operable where one acts as an acid relative to the other e.g., (1) naphthalene sulfonic acid and one or more of (2) bromochlorophenol blue, chlorophenol blue, or bromocresol purple.

We have discovered that, as an alternative of using one or more of the Group II compounds with one or more of the Group I compounds, one may select one of the aforesaid Group III compounds with (or preferably) in place of a combination of one or more Group I compounds and one or more Group II compounds. A caveat and proviso must be stated: in absence of a Group III compound one must employ one or more Group I compounds with one or more Group II compounds; if the Group II compounds consist solely of one or more aminotriphenylmethanes or their soluble salts, then the Group I compound must be from one or more of the group consisting of oxalic acid, suitable sulfonic acids, tetrahalogenated sulfonphthaleins, and other soluble strong organic acids having a $pK_1$ of about or less than 2.

Without affecting the scope of the invention set out in the appended claims, what we believe to be a true mechanism for the color change indicated above for organic moieties involving one or more Group I compounds and one or more Group II compounds without the presence of a Group III compound, and as will be more fully explained below, is the "reacting" of one or another of the compounds of one Group with another compound in another Group in acid/base reactions. This point is further verified by our finding that basic fuchsin (a Group II compound) in combination with naphthalenesulfonic acid (a Group I compound) dissolved in an ortho-chloronitrobenzene:ortho-bromonitrobenzene (OCNB/OBNB) solution formed a purple color in the liquid phase and a yellow-to-green color in the solid phase, depending on the relative concentration of the Group I compound in the novel composition of matter.

More specifically, one possible theory for the Group I–Group II selection is that (1) the organic moieties are soluble in the liquid solvent producing a color, but are less soluble in the solid solvent (i.e., do not form solid solutions). During crystallization of the solvent, the compounds are concentrated. Again, according to this theory, the Group I compound is an acid, which when concentrated protonates or reacts in a neutralization reaction to cause the Group II compound to change from a color characteristic of a base form to a color characteristic of an acid form of the compound. In this theory, simple acids (e.g., naphthalene sulfonic acid, trichloroacetic acid) and acidic dyes (e.g., halogenated sulfonaphthalein, bromphencol blue) are both considered to be acids.

Further, in a OCNB/OBNB system not employing oxalic acid which utilizes a Group I and Group II compound for example, bromochlorophenol blue and quinaldine red, a unique color change was obtained as follows: in the liquid phase, the bromochlorophenol blue (Group I) takes a proton from the quinaldine red, so that the quinaldine red takes on its characteristic basic red color (which is characteristic of the latter compound dye between a pH of 2 and 13); on the other hand, in the solid phase, the bromochlorophenol blue protonates the quinaldine red and is yellow, at the same time quinaldine red is in its acid form and is colorless. Hence, the solid phase is colored by the Group I dye in its yellow form. Thus, the color of the liquid solution was red. Also, in a novel OCNB/OBNB composition employing a Group I and Group II compound, and with bromophenol blue as the Group I compound, and ethyl red as the Group II compound in its acid form having no color whatsoever in the solid phase of the solvent. Thus, the solid took on the yellow coloration of the bromphenol blue. On the other hand, in the liquid form, the bromophenol blue is diluted in the solvent and the ethyl red becomes the red color characteristic of the dye at a higher pH.

Another example of a Group I compound and a Group II compound is bromophenol blue and basic fuchsin. In the solid form, the basic fuchsin behaved as if it were at a very low pH and was in a form which has a green color between its $pK_1$ and $pK_2$. This green color of basic fuchsin at very low pH is a little known fact, but can easily be demonstrated in any laboratory with common reagents. In the liquid form, however, the bromophenol blue is yellow. The basic fuchsin was not in its first acid form and became red. Thus, the color of the liquid was red. With this disclosure, one skilled in the art will more appreciate the results to be enumerated below in Examples 1-5 and in Table II.

As will be appreciated by those in the art, generally the color of the liquid is the same or similar to the color of the Group II compound or Group III compound when dissolved in the liquid phase of most of the suitable solvents employed.

Similarly, crystal violet, which is a pH indicator having a $pK_1$ of approximately 1, forms, in combination with oxalic acid and dissolved in the OCNB/OBNB solution, a blue liquid and a yellow solid.

We have also found as well that (1) quinaldine red (a Group III compound) which has a $pK_1$ of approximately 1.6; (2) ethyl violet, which has a $pK_1$ of about 1.2; and (3) brilliant green, which has a $pK_1$ of about 1.4, all react in solutions with naphthalenesulfonic acid to form different colored solid- then liquid-phases.

As as alternative to the above for Group I–Group II combinations, when the Group I material is other than a simple acid, and is a "dye" compound (such as bromophenol blue), in addition to the Group I's behavior as an acid, there may be formed in the composition aggregates, mixed polymers, and the like, which cause what is referred to in the literature as "metachromism" or "metachromacy". "Metachromacy" is that property of a substance which is expressed as a change in color (according to the wavelength of the light in which it is viewed) due to an outside force. "Metachromacy" is mainly attributed to that color change phenomena when a dye is brought together with certain "tissue" molecules (macromolecules, e.g., solid materials such as heparin, polysaccharides). Certain organic dyestuffs, however, are characterized by different colors when dissolved in inert solvents, which is described as "solvatochromism". See HACKH'S CHEMICAL DICTIONARY 421 (4th ed. 1969). The literature is full of articles attempting to give some explanation of metachromacy (and "solvatochromism") apparently caused by increasing dye concentration in the liquid phase, adding salts, or lowering the dielectric constant of the solvent from medium to low values. Thus the literature speaks of salt-induced metachromism (increase in the concentration of salt), dye-induced metachromism (increase in concentration of dye) and dielectric-induced metachromism (decrease in the dielectric constant of the medium). The concept of metachromacy in the art was studied as a theory (definition), generally with little practical application other than the coloring of tissue. See the classic article by R. B. McKay and P. J. Hillson, "Metachromatic Behavior of Dyes in Solution", 61 TRANS. FARADAY SOC. 1800–1810 (1965); also Such as C. Guhaniyogi and Groja M. Mandal, "Studies on Intramolecular Association of Salt Groups in Polymers Following their Binding with a Metachromatic Dye", 175 DIE MAKROMOLEKULARE CHEMIE 823–831 (1974); Eryl D. Owen, et al, "Metachromic Interactions Between Azo and Triphenylmethane Dyes in Aqueous Solution", 25 J. APP. CHEM. BIOTECHNOL 211–219 (1975); M. K. Pal and Manju Chaduri, "Condutometric Titrations of Anionic Polyelectrolytes with Metachromatic Dyes and Effects of Organic Solvents", 133 DIE MAKROMOLEKULARE CHEMIE 151–160 (1970); Ger. Pat. No. 2,327,723 (1973) to Pilot Ink Co.; A. Van Dormael, "Solvatochromism, Tautochromism, and Metachromism", 31 INDUSTRIE CHIMIQUE BELGE 1–9 (No. 1, 1966); G. Scheibe, "Uber Metachromasie" 35 PALETTE 28–34 (1970); R. B. McKay and P. J. Hillson, "Metachromatic Behavior of Dyes in Solvents of High Dielectric Constant: the Anomoly of Water", 63 TRANS. FARADAY SOC. 777–781 (1967); a fascinating study by Medini Kanta Pal and Maxwell Schubert, "Simple and Compound Metachromasia", 67 J. PHYS. CHEM. 1821 et seq (1963); M. K. Pal and Sudhir Kumar Ash, "Metachromasia of Basic Dyes Induced by Mercuric Chloride II", 78 J. PHYS. CHEM. 536–540 (No. 5, 1974); Yamaokak et al, "Diffuse Reflectance Spectra of Metachromatic Dyes—Existence of a Long Wavelength Band in Solid States", 78 J. PHYS. CHEM. 1040 (No. 10, 1974); CONN'S BIOLOGICAL STAINS 2-58 (9th ed. 1977); von F. Feichtmayr, et al, "Einfluss der Dielectric Eigenschaften von Losungsmitteln and Substraten auf die Lichtabsorption and die Photochemische Verhatten von Kationischen Farbstoffen" (Losurgsmittel) OPTISCHE ANZEGUNG ORGANISCHE SYSTEME VERLAG CHEMIE 1966 (West Germany) 357-374 (1964(?)); L. Micharelis and S. Granick, "Metachromasy of Basic Dyestuffs", 67 JACS 1212 (1945); and P. J. Hillson and R. B. McKay "Metachromasy" 210 NATURE 296-297 (1966); Paddy, J. F., METACHROMASY OF DYES IN SOLUTION, CHEM MOL. BIOL. INTERCELL. MATRIX ADVAN. STUDY INST. 1969: 1007-31 (England). See also Japanese specifications No. 47-34735 and 50-105555.

Indeed, it would appear from the combined definition of Hackh and Hillson/McKay that the phenomena of our invention may not fall within the definition of "metachromacy" (or even solvatochromacy) let alone relying on metachromacy as a complete "mechanism" for understanding the phenomena of our invention.

Perhaps the closest article with a description of similar phenomena (components dissolved in a solvent changing color upon change in phases is P. R. Hammond and L. A. Burkardt, "Electron Acceptor - Electron Donor Interactions. XV. Examination of Some Weak Charge - Transfer Interactions and the Phenomenon of Thermachromism in these Systems", 74 J. PHYS. CHEM. 639 (No. 3, 1970). A number of pairs of non-dye donors and acceptors are listed at page 642 in solvents such as dichloromethane, cyclohexane, and n-hexane. "Thermochromasy" is the change in color of a composition due to a change in temperature. See also Japanese patent application Nos. 75-105,554; 75,105,555; 75,107,040 by Norikaya Nakasuji, et al (1975). Even Hammond/Burkardt, however, fail to give any explanation as far as single compounds (such as those in Group III) which exhibit the novel phenomena of our invention.

Perhaps one theory that might explain the latter phenomena observed is that the Group III compound is soluble in the liquid solvent producing a color, but has lower solubility in the solid phase of the solvent than in the liquid phase (i.e., does not form a solid solution with the solvent). During crystallization of the solvent, the dye is concentrated in the remaining liquid, and the concentration increases until the dye and solvent have crystallized. The dye at the higher concentration or in its crystalline form exhibits "metachromatic-type" behavior, thus producing a change in the color of the solid solvent/dye mass. Some support for this theory exists by way of microscopic evaluation of pinacyanol iodide in an OCNB/OBNB solvent, wherein out of the blue liquid solution numerous light rose/light brown particles appear upon freezing of the composition. As shown under the microscope, the composition of these particles may be of only dye, but they may as well comprise solvent dissolved in dye crystals.

Still another, yet unexplored, possible explanation of the phenomena of our invention may exist in a so-called "heat dependent chemical oscillating reaction", similar to the time dependent chemical oscillating reactions familiar to those in the art (for examples of the latter, see G. Nicolis and J. Portnow, "Chemical Oscillations", 73 CHEMICAL REVIEWS (No. 4) 367–383 (1973). Hans Degn, "Oscillating Chemical Reactions in Homogenous Phase", J. CHEM. EDUCATION 302 (May 1972); R. J. Feld, "A Reaction Periodic In Time and Space", J. CHEM. EDUCATION 308 (May 1972); John F. Lefelhoiz, "The Color Blind Traffic Light", J. CHEM. EDUCATION 312 (May 1972); K. R. Sharma, et al, "Oscillations in Chemical Systems. VII. Effects of Light and of Oxygen on the Bray-Liebhof-sky Reaction", 97 J. AMER. CHEM. SOCIETY (No. 1) at 202 (Jan. 8, 1975); Steven S. Jacobs and Irving R. Epstein, "Effects of Chloride Ion on Oscillations in the Bromate-Eruim-Malonic Rad System", 98 J. AMER. CHEM. SOCIETY (No. 7) 1721 (1976); Arthur T. Winfree, "Rotating Chemical Reactions", 230 SCI. AMER. 82–95 (1974); Marie L. Smoes, "Dissipative Structures in Chemical Oscillations with Concentrations - Dependent Frequency", 59 J. CHEM. PYS. 6277–85 (1973); 80 CATALYSIS, KINETICS (67) 52709j (1974); Richard J. Field, et al, "Oscillations in Chemical Systems II. Thorough Analysis of Temporal Oscillation in the Bromate - Cerium - dMalonic and System", 94 J. AMER. CHEM. SOCIETY 8649 (No. 25) 1972; and John J. Tyson, "Nonlinear Oscillation In Chemical Systems", 58 J. CHEM. PHYS. 3919 (1973). An obvious problem with this theory is that, at a given temperature, the color of the instant novel compositions are stable.

On the other hand, perhaps the color change of our phenomena if only a Group III compound is employed is caused by a disturbance of the potential field of the compound by the anion that either forms a covalent bond or comes into intimate contact with the compound molecule during separation of the dye from its solvent or crystallization.

Still another theory possibly explaining the Group III compound activity is as follows: many dyes are known to have a different crystalline color than when they are in solution, due to differences in absorbance of light by the crystal surface from the absorbance of light by the solvated dye molecule. Thus, this theory party explains why dyes, with color in their crystalline state different than the color in their dissolved liquid state, will show Group III activity with a change in phases.

Consideration for the application of this theory must include the nature of the phase diagram of the dye and solvent. If the solid solubility of the dye is significant, the color of the solid will be essentially the same as the liquid. Also, if the dye and solvent form a low melting eutectic, then at normal observation temperature there will remain some liquid phase composed of solvated dye. Thus, for a system to have a phase/color change, the phase relationship of dye in solvent must be such that the amount of the dye-in-solid-solvent phase is very much less than the solid-dye and solid-solvent phases at temperatures below the melting point of the solvent.

From all the evidence presented by our studies, we think that the following Group III mechanism for the thermometer is probably correct, i.e., that the change in color depends on the use of a dye, or mixture, whose color in liquid solution differs from that in the solid state because the solvent of varying melting point does not form complete solid solutions.

The case of the Group I–II combinations we think is simpler. It is our belief that there is little doubt that the large majority of these do depend, as suggested above, on acid-base equilibrium which change on passing from the solid phase to solution. In general, the solid phase seems to contain more of the undissociated species, as might be expected, since the ions formed by proton transfer shall be stabilized in solution by solvation. Most of the cases cited also seem to take place by proton transfer. However, the possibility of Lewis-base - Lewis acid interactions may be considered by those in the art. Thus amines may combine with cationic centers of cationic dyes to give solids of leuco amines, $\equiv C+ +N\equiv \rightarrow \equiv C-N+\equiv$. A similar association may be possible in some cases between anionic and cationic dyes. Even if cases have not yet definitely come to light, this is a possibility which should certainly be considered. Another theoretical possibility is the use of two compounds, A and B, which together can give rise to a change transfer band but which crystallize separately. It is thought by Applicants that it would be difficult to obtain a sufficiently intense color without using concentrations high enough to interfere with the melting of the solvent over a small temperature range.

Concerning the relationship between structure and use in the Group I–Group II combinations, the types of grouping that give rise to pH-dependent color changes in view of the disclosure herein will be well known to those in the art since compounds of this type are used as indicators. Indeed, all the examples cited here are typical indicator dyes, combined with an acid. In order to obtain a color change on melting, it is necessary to choose an acid-dye combination in which proton transfer occurs on passage from solid to solution. Probably almost any pH indicator could be used in this connection in combination with a suitable acid.

As described above, the Group III compounds operate by showing a color change in their own right, between the crystal and solution in the thermometer solvent. The examples cited herein are generally, with small exception, the "cyanin-type" dyes, conjugated with odd-conjugated hydrocarbon anions. Dyes of this type, in particular the cationic ones, are known to those in the art to show color changes with concentration and solvent changes and also when combined with biological materials ("metachromatism", above). It now seems fairly clear that these changes are mostly due to association of the dye into polymers, the flat dye ions being stacked together like a pack of cards. The interactions between the ground and excited states of individual dye ions leads to a splitting of the lowest transition. Of the resulting spectrum of transitions, all except that of highest energy are forbidden, so the effect is a hypsochromic shift. Similar effects are well known to those in related arts in organic crystals (Davidson effect). For the polymerization of the dye ions to be possible, the interactions between them must be strong enough to overcome their mutual coulombic repulsions. This can be so only if the ions are large (so that the coulombic repulsion is minimal) and if they can approach closely so that the molecular orbitals (MOS) of different ions can overlap. For this to happen, we believe that it is essential that the ions be planar and free from bulky obstructing groups. These conditions are met well by the organic dyes themselves, which show dramatic color changes with concentration in suitable solvents, and also by a variety of other cationic dyes. Other equivalent anionic dyes should be equally able to show similar effects though fewer examples are known to us.

Confusion might be caused at first to those in the art by the observation that the color changes might occur only in water as solvent. This at first glance might be thought to be attributed to binding of the dye ions in pairs by water bridges through hydrogen bonding. However, the examples cited by Applicants herein seem to indicate that the solid dyes also show colors different from those in nonaqueous solvents and that the colors are similar to those of the polymeric species in strong aqueous solutions. This suggests to us that water cannot be involved in the polymerizations. The X-ray crystal structures of a number of crystalline dyes of this type indicates however that they have the stacked polymeric structure postulated for the "abnormal" species in solution.

One skilled in the art might ask the logical question of how then does the water act? In a non-aqueous solvent of low dielectric constant, we think that dyes of this type will exist as intimate ion pairs. Furthermore, since the gegenion is normally much smaller than the planar dye ion, it will normally be held near to the middle of the flat face of the latter to maximize the coulombic attraction.

For the dye to polymerize, it will then be necessary to remove the gegenion which is likely to require considerable energy. Removal of the gegenion can, however, be effected easily by using an ionising solvent in which the dye dissociates. Since water is supreme among normal solvents in this respect, it is not surprising that dyes should tend to polymerize in it.

One in the art may further ask why then does the dye ever polymerize in the crystal? We believe that in our nonpolar solvent, most of the surface of the dye is taken up by solvent molecules. The association between these and the dye ions being quite strong since the forces involved are of charge-dipole type. For the dye to polymerize we have then to remove both the gegenion and the solvent. In the crystal, there is only the gegenion—and the loss of energy in moving this to one side may well be balanced by an increased overall Madelung energy.

Why don't all dyes of this type show similar color changes? There are a number of factors we think that one skilled in the art will now logically consider:

(1) The dye molecules must be geometrically able to form polymeric stacks;

(2) The Van-der Waals-type forces between dye molecules must be sufficient to overcome their mutual coulombic repulsion. It would be expected that the former would increase, and the latter decrease, with size of the ion but there is no simple way in which the balance between the two can be predicted in any given case.

(3) The perturbation due to polymerization must lead to a visible change in color.

(4) A special factor in the case of anionic dyes may be the tendency of the gegenion (usually Na+) to associate with oxygen atoms in the dye, since most of the negative charge in such dyes is localized on the terminal oxygen atoms. Polymerization may then take place by association of dye ions by $O^-$... $Na^+$... $O^-$ links and not by interactions. Salts of large inert anions will present possibilities for Group III phenomena.

There are, however, several other factors that we think need to be considered and which may be exemplified by cases already studied.

First, there is the effect of size of crystal in the solid. At low concentrations, if the dye crystals are relatively large, much of the light may pass through unaffected by the dye. The transmitted light will then consist of a mixture of white light, and light which has been strongly affected by passage through dye crystals. In the case of a dye with a very high extinction coefficient and appreciable absorption over the entire visible spectrum, individual crystals may absorb completely and so appear black. The solid phase in the thermometer will then appear grey (white + black), regardless of the color of the dye in dilute solution. There seem to be several examples of such behavior in the list; e.g. pinacyanol iodide. This may also show an inherent color change in the solid, which is masked by the effect postulated above.

Furthermore, even if the crystal does not absorb completely, the visual impression of a mixture of white with the natural color of the dye may lead to an apparent change of hue. This we believe is responsible for the color changes shown by some of the neutral dyes; e.g. Savinyl Green B TM (No. 131 in Table II below).

This differential effect may also be responsible for the differences in color observed in certain cases for mixtures of dyes with inert colored compounds; e.g. several of the mixtures with phthalocyanins. It is extremely unlikely to us that the phenomena is due to any kind of chemical reaction between the true compounds or to any kind of aggregation. It seems more likely to us that the phthalocyanin is more finely divided in the solid state than is methyl red.

Finally, there seems to be one possible approach to the problem which we have not yet explored, i.e. the use of merocyonin dyes. Cyanin-type dyes are characterized by having two or more possible classical structures, the color of the dye being attributed to resonance interactions between them; e.g.

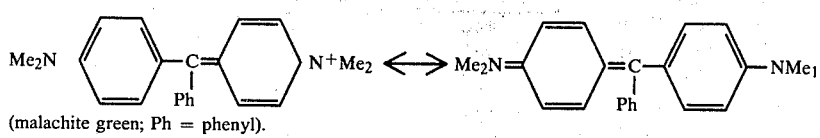

(malachite green; Ph = phenyl).

In typical dyes, at least two such structures have similar energies and so contribute equally to the dye. Since both are charged, this balance is not affected by changes in solvent. A merocyanin dye is generally similar to a cyanin but neutral. As a result, there is just one unchanged resonance structure, the rest being Zwitterionic; e.g.

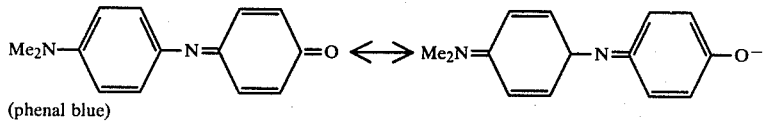

(phenal blue)

Here charges in solvent can greatly alter the balance between the resonance forms and hence the color, and similar large changes take place on passing from the crystal to solution. A dye of this type which does not form solid solutions with the solvent, hence, should be very effective in the novel thermometers of our invention. In summary, we believe that cyanin-type dyes will show differences in light absorption between solid and solution in all cases where the crystal structure of the dye indicates that the dye ions are stacked together in close contact. For this to happen, we believe that the dye molecules must be planar and free from bulky groups that might hinder stacking. Furthermore, be believe most merocyanin dyes are likely to show color changes on passing from solid to solution.

Regardless of the theory one prefers, at this time an understanding of the phenomena is far from complete, and the phenomena discovered must be described as only partially resolved.

An example of an especially preferred Group III compound is pinacyanol iodide at a concentration of 0.025–0.05 percent by weight. When dissolved in an OCNB/OBNB solvent, the liquid composition is an eye-appealing brilliant blue. During solidification at room temperature of the OBNB/OCNB solvent, the pinacyanol iodide becomes increasingly concentrated in the correspondingly decreasing proportion of liquid. The pinacyanol iodide increases in concentration to the point that when solidification of the composition is complete, the pinacyanol iodide, because of (1) its decreasing attraction to the solid OBNB/OCNB solvent, and (2) its apparent metachromatic-type behavior, is isolated in small particles around the crystalline structure of the OBNB/OCNB solvent and from the view of an observer turns the color of the entire composition to an attractive rose. When the solidifying composition is seen by any form of microscopy, the beads of pinacyanol iodide particles appear quickly on the surface of the crystalline solvent in an aggregate. When Group I and Group II materials are employed (without the presence of a Group III material), a similar phenomena is seen when viewed by microscopy at about two hundred to six hundred power.

The method preferably employed in designing a series of compositions of matter for use in a temperature-indicating device or thermometer is as follows: first, two or more weakly polar or moderately polar aromatic solvent constituents (that are inert toward the chosen Group I-III organic moieties) which have melting points that most closely contain the predetermined temperature range desired to be tested are selected, e.g., one of the melting points of the two constituents must be equal or lower (preferably slightly lower) than the lowest temperature of the range, and the other constituent must be equal or higher (preferably slightly higher) than the highest temperature of the range. Preferably, two analogous chemical structures (e.g., analogs, homologs, and optical isomers) having substantially the same molecular volume or having the same crystalline structure (e.g., isomorphous) are selected if they border the temperature range to be tested. The temperature range is divided up into increments, usually no smaller than 2/10° F. or 1/10° C. over the temperature range to be tested. Then, a liquidous curve of the melting point as a function of temperature is constructed for the solid solution of the solvent constituents, herein for example, ortho-chloronitrobenzene and ortho-bromonitrobenzene as in FIG. 1, over the temperature range to be tested. In FIG. 1 it will be noted that the band, exaggerated about 40 or 50 times, is defined by the dash lines $\epsilon$ and $\epsilon'$ on either side of the liquidous curve in the diagram and represents in an exaggerated manner the limit of accuracy of temperature measurements, i.e., approximately 1/10° C. or 2/10° F. It is desired that the percentage of organic moieties (Group I and Group II compounds, or one or more Group III compounds) be of a very small weight fraction of the total novel composition of matter in that when the organic moiety(s) is added to the solvent system as the melting point of the curve is affected by a shift toward a higher or lower temperature for a given proportion of solvent constituents. Usually about 0.05 weight percent moieties (Group I and Group II compounds or Group III compound(s) shifts the temperature curve in a uniform manner less than about 0.5° C. ($\epsilon$ or $\epsilon'$ in FIG. 1) in one direction or the other over the entire length of the curve. By keeping the weight fraction of organic moieties in the solvent system constant, one can determine $\epsilon$ or $\epsilon'$ in a curve such as FIG. 1 and adjust the curve to compensate for the difference in melting point caused by the addition of the moieties. The temperature scale such as in FIG. 1 is then divided into the suitable increment size, for example, 0.2° F. or 0.1° C. in human clinical use, so that the number of novel compositions of matter necessary for the temperature range is determined. These are marked on the ordinate or temperature scale from which the same number of abscissas or mol/weight fractions of one of the solvents may be determined for each of the temperatures incrementally located in the range. For example, if one selects a temperature range of 96.0° F. to 105° F. and one also desires the increment of temperature as 0.2° F., one would divide a chart such as FIG. 1 into fortyfive ordinates (96.0° F., 96.2° F., . . . 104.8° F.).

Figure 12:
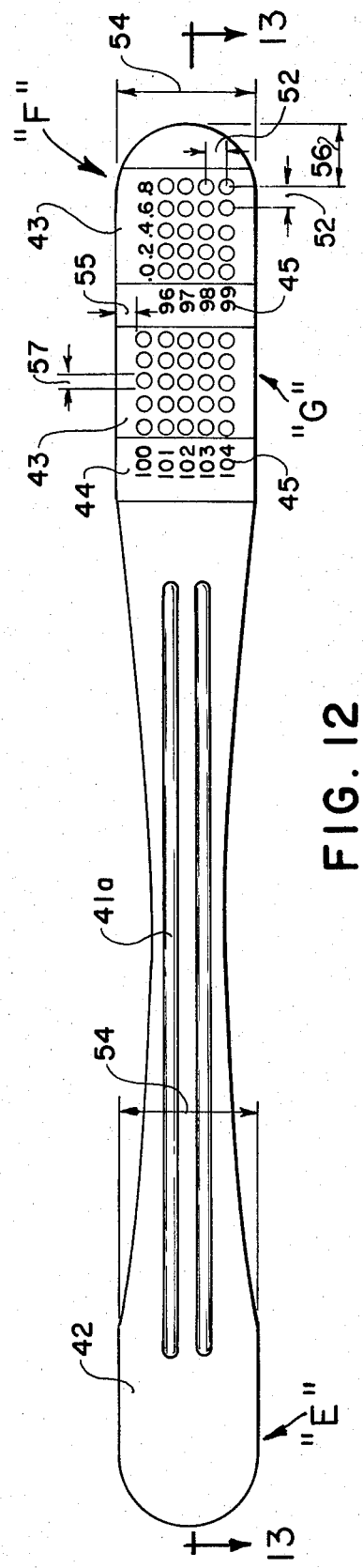
FIG. 12 is a plan view of a flat temperature-indicating device from the vertical without the use of a case, comprising a heat-conducting carrier means with a grid of cavities thereon.
Figure 13:
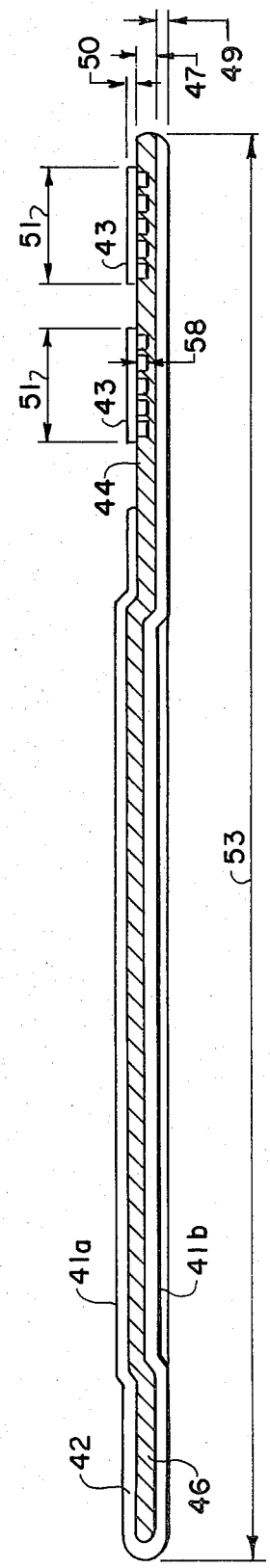
FIG. 13 is a plan horizontal view taken along line 13—13 in FIG. 12 revealing the heat-conducting carrier means, cavities within, transparent cover sheet means, and a bottom plate means.

In preferable operation, the disposable thermometer for the clinical temperature as is shown in FIGS. 12-13 is so constructed with about 0.025 weight percent pinacyanol iodide, and the remaining balance of the composition (except for nucelating agents, if any) orthochloronitrobenzene and ortho-bromonitrobenzene in the proportions shown in FIG. 1, except that the temperatures are adjusted to be about 0.3° C. high (increment "$\Delta$") for the entire curve (even after $\epsilon$ or $\epsilon'$ has been determined) between 96° F. and 104.8° F., since the user of the disposable thermometer is only instructed to insert the thermometer for at least about forty-five seconds to about one minute in the mouth (see spatula portion "F" of FIG. 12) under the tongue as far back as possible (and adjacent, to but on the inside of the lower teeth, with the tongue on top of the thermometer portion "F"). After the stipulated time, the user removes the thermometer from the mouth and the temperature corresponding to the last blue dot is read by the user although the temperature that would have been required to turn the pocket from liquid to solid over an infinte period is about 0.3° C. less than the temperature of the mouth. Of course, the $\Delta$ can be adjusted lower, say, to about 0.2° C., if the user is instructed to spend a longer period of time with the thermometer in place, or visa versa. An example of such a thermometer is the TEMPA-DOT® READY-STRIP™ Single Use Sterile Thermometer, by the Info-Chem Division of Akzona Inc. (distributed by Organon Inc., a subsidiary of Akzona Inc.).

Ignoring the effect of the organic moieties Group I-III of such a temperature curve for the purposes of this paragraph, one would then determine for any given temperature in the range of the novel composition of matter by first determining the proportion of solvent constituents such as ortho-bromonitrobenzene to orthochloronitrobenzene. For example, using Table I listed below, for 100° F. one would select a solvent system of 77.3 weight percent ortho-bromonitrobenzene and 22.7 weight percent ortho-chloronitrobenzene, if one chose to ignore the effects $\epsilon$ or $\epsilon'$ of the organic moieties Group I-III on the melting point curve such as that listed in FIG. 1.

Of course, it is preferred that the weight percent of organic moieties be kept to a slight amount such as under 0.05 percent, so that a curve $\delta = f$ (temperature) or $\delta' = f$ (temperature) could be constructed similar to FIG. 1 with a uniform temperature effect of the organic moieties on the liquidous curve.

TABLE 1

| COMPOSITION IN WEIGHT PERCENT OF PURE OCNB-OBNB | | |
|---|---|---|
| APPROXIMATE MELTING TEMPERATURE °F. | ORTHOBROMO-NITROBENZENE | ORTHOCHLORO-NITROBENZENE |
| 96.0 | 56.2 | 43.8 |
| 96.2 | 57.5 | 42.5 |
| 96.4 | 58.8 | 41.2 |
| 96.6 | 60.1 | 39.9 |
| 96.8 | 61.3 | 38.7 |
| 97.0 | 62.5 | 37.5 |
| 97.2 | 63.5 | 36.5 |
| 97.4 | 64.5 | 35.5 |
| 97.6 | 65.5 | 34.5 |
| 97.8 | 66.5 | 33.5 |
| 98.0 | 67.5 | 32.5 |
| 98.2 | 68.5 | 31.5 |
| 98.4 | 69.5 | 30.5 |
| 98.6 | 70.5 | 29.5 |
| 98.8 | 71.5 | 28.5 |
| 99.0 | 72.5 | 27.5 |
| 99.2 | 73.5 | 26.5 |
| 99.4 | 74.5 | 25.5 |
| 99.6 | 75.5 | 24.5 |
| 99.8 | 76.4 | 23.6 |
| 100.0 | 77.3 | 22.7 |
| 100.2 | 78.1 | 21.9 |
| 100.4 | 79.0 | 21.0 |
| 100.6 | 79.9 | 20.1 |
| 100.8 | 80.8 | 19.2 |
| 101.0 | 81.7 | 18.3 |
| 101.2 | 82.6 | 17.4 |
| 101.4 | 83.5 | 16.5 |
| 101.6 | 84.3 | 15.7 |
| 101.8 | 85.1 | 14.9 |
| 102.0 | 85.9 | 14.1 |
| 102.2 | 86.7 | 13.3 |
| 102.4 | 87.5 | 12.5 |
| 102.6 | 88.2 | 11.8 |
| 102.8 | 88.9 | 11.1 |
| 103.0 | 89.6 | 10.4 |
| 103.2 | 90.3 | 9.7 |
| 103.4 | 91.0 | 9.0 |
| 103.6 | 91.7 | 8.3 |
| 103.8 | 92.4 | 7.6 |
| 104.0 | 93.1 | 6.9 |
| 104.2 | 93.8 | 6.2 |
| 104.4 | 94.5 | 5.5 |
| 104.6 | 95.2 | 4.8 |
| 104.8 | 96.0 | 4.0 |

Once the organic moieties Group III compounds and/or Group I and Group II compounds are determined for the desired color change, they are added to a liquid mixture of the solvent constituents for the predetermined temperature and mixed, preferably by any suitable industrial mechanical mixing means known to those in the art until a substantially complete dissolution has been obtained.

After the solvent weight fractions have been determined and the novel composition of matter formed for each of the increment temperatures to be tested, a suitable temperature-indicating device is constructed such as the novel device described below having a plurality of temperature-sensitive regions, preferably having cavities in a heat-conductive carrier such as aluminum wherein each novel composition of matter corresponding to one of the pre-selected points along the temperature curve fills one of the regions, preferably a cavity, in the heat conductive carrier device. A method and apparatus for depositing precisely metered quantities of a temperature-sensitive composition of matter on a surface is taught by Pickett, et al, U.S. Pat. No. 3,810,779 (1974), incorporated herein by reference, and the techniques of that patent are incorporated herein as much as copied verbatim. A preferable device for sealing a heat-sensitive transparent cover sheet means in vacuum-sealing engagement with an aluminum heat-conductive carrier over cavities in the carrier is the Webb Model No. 2 machine manufactured by Bio-Medical Sciences, Inc., in Fairfield, New Jersey.

Besides use in disposable oral thermometers, the novel compositions of our invention may be employed for the detection of overheating in engines, for the detection of leaks from steam traps (the indicator may be placed on an uninsulated piece of pipe just below the steam trap), for the detection of high temperatures in the surroundings of computers, home furnaces and appliances, as well as on packages for foods, forehead, skin and rectal temperature indicators.

As a preferred embodiment, we have found that film forming materials such as gelatin, polyvinyl alcohol, and water-soluble cellulose derivatives are good barriers for containing small particles or droplets of the novel compositions of matter of our invention, especially the compositions wherein OCNB/OBNB is the solvent. After this form of microencapsulation, a dry granular material is formed that is easily adaptable to various machinery processes. A typical microencapsulated novel composition would be an OCNB/OBNB solution containing 0.035 weight percent pinacyanol iodide surrounded by a layer of gelatin coacervated with acacia and fixed with glutaraldehyde. The use of these microencapsulated novel compositions would permit application to temperature-sensing devices with more flexibility. For example, the microencapsulated novel compositions may be formulated into a pressure-sensitive adhesive from which a temperature indicating tape could be made. Microencapsulated novel compositions could be incorporated into printing presses to permit temperature sensing regions of unlimited geometry including temperature-responsive messages.

2. Novel Temperature-Indicating Device

In FIG. 2, a novel temperature-indicator device is disclosed comprising a flat, gradually curved, or substantially curvilinear heat-conducting carrier means having one or more spaced cavities defined therein to determine a like number of predetermined temperatures in a temperature range by means of a like number of different thermally-responsive composition of matter. Each of the predetermined temperatures is associated with a composition of matter that is substantially without impurities, and may or may not be the novel compositions of matter stated above, but a composition of matter which does change from an opaque form when solid to a transparent liquid upon melting. The novel temperature-indicating device comprises (1) a flat, gradually curved, or substantially curvilinear heat-conducting carrier with one or more cavities indented therein; (2) (in the absence of employing the novel compositions of matter of this invention) an indicator means located at the bottom of each of said cavities; (3) a transparent cover sheet means in sealing engagement with the carrier means above and overlying each of said cavities to form an enclosure between the walls of the cavity and the transparent cover sheet means; and (4) a composition of matter which substantially fills the cavity and is adapted to change from a solid to a liquid at substantially the predetermined temperature associated with said cavity, except for a substantially spherical void in the composition of matter between the bottom of the cavity and the transparent cover sheet means.

Referring to FIG. 2, one will notice that colorant 1 fills the bottom of a cavity "A" in a flat heat-conducting carrier means 2 of width 6 which means is substantially filled with a "classical" solid solution 5. The cavity "A" is covered by a transparent cover sheet means 4 which fits in sealing engagement with heat-conducting carrier means 2 immediately surrounding cavity "A" and covering the solid solution 5 filling cavity "A". Within solid solution 5 is a substantially spherical cavity 3 which has a diameter 10 only slightly smaller than the width 12 of the cavity minus the small width 11 of the colorant 1. In the preferred embodiment shown in FIG. 2, the carrier means cavity is in the shape of a trapezoid rotated around its axis, having a large diameter 8 at the top of the cavity and a smaller diameter 9 at the bottom of the cavity. The width 7 of the transparent film 4 is preferably substantially equal to the width 6 of the heat-conducting carrier means 2. While the exact dimensions (6,7,8,9,11,12) of a cavity in items such as those in FIG. 2 vary with the solvent system employed, the materials selected, and the composition of matter which is predetermined (whether or not one of the novel compositions of matter described above or a classical composition of matter which changes from opaque to transparent with change in phases from solid to liquid), it is well to describe a device employing ortho-chloronitrobenzene and ortho-bromonitrobenzene recently constructed.

Referring again to FIG. 2, the heat conducting carrier means 2 is an aluminum foil of width 6 of approximately 0.003 inches (naturally, the heat-conducting carrier means 2 must be a material which has a high thermal conductivity and relatively large surface area of contact with the test subject and be of minimum thickness, while preserving its structural integrity, in order to permit rapid conduction of heat into the cavity such as shown in FIG. 2. Where aluminum is used, its thickness may vary from about 0.001 inches to about 0.004 inches. In any event, the selection of such heat-conductive carrier means is well within the knowledge of those skilled in the art and needs no further elaboration). In a particularly effective embodiment, the heat-conductive carrier means 2 is always preferably constituted of aluminum or alloys thereof which transfer heat in an effective manner. In the alternative, the heat conducting carrier means may be made of plastic. Thereby, the carrier is provided with the necessary strength to serve as the main structural support, while at the same time providing rapid and uniform temperature distribution throughout the thermometer device. As a consequence, the time required for taking temperature is substantially diminished. The depth 12 of cavity "A" in FIG. 2 is selected to be preferably 0.004 inches, with the upper horizontal width 9 being approximately 0.035 inches. The width 7 of the transparent film is approximately 0.001 inches, the letter being a painted letter on the bottom of the cavity "A". As implied in FIG. 2, a layer 11 of colorant material (paint) is stamped onto the bottom of each cavity "A" of a visible material that may be somewhat absorbed into the composition of matter or solid solution 5 upon melting of the "classical" solid solution 5 to make the colorant material more visible (See FIG. 9). The transparent film cover means 4 may be polypropylene, Mylar (polyethyleneterephthalate), nitrocellulose, polyvinyl chloride, etc. In FIG. 2, the transparent film cover means 4 is preferably a heat-sensitive material and is a coextruded film of Nylon 6 ® (manufactured by the Allied Chemical Company) and Surlyn 1652 ® (manufactured by E. I. duPont deNemours & Company) which film is produced by Pierson Industries Incorporated that is subsequently laminated to polypropylene by the Millprint Company of Milwaukee, Wisconsin.

In each cavity "A", such as that shown in FIG. 2, one of the predetermined compositions of matter that is associated with a predetermined melting point is poured into the cavity, filling approximately 60% of said cavity. After partial filling of each cavity "A" with a particular composition of matter (here OCNB:OBNB) associated with a temperature to be measured (here between 96.0° F. and 104.8° F.), transparent film 4 is put in sealing engagement with aluminum foil 2 through the use of a machine such as the Webb Model No. 2 manufactured by Bio-Medical Sciences Inc. of Fairfield, New Jersey. Because of the surface tension produced in the cavity "A", a substantially spherical void 3 is formed in the cavity "A" which retains its character even upon melting of the composition of matter. This cavity acts as a magnifying device for the observer from above to see the colorant 1 which may or may not be absorbed or partially absorbed into the composition of matter upon melting from the solid. As will be recognized by those skilled in the art, small deviations could be made in ratios of the widths 6 through 12, or alternatively, the ratios could be maintained for different sized systems (e.g., by multiplying distances 6 through 12 by a uniform but different constant) without substantially affecting the results of the invention.

FIGS. 3 and 4 are taken from sectional views [lines 3—3 and 4—4] of FIG. 2 shown as the observer would see them from above the cavity "A" of FIG. 2; FIG. 3 is a view of cavity "A" when empty of the composition of matter (8 in FIG. 3 or 1 in FIG. 2), while FIG. 4 shows a cavity filled with the "classical" composition of matter after the "classical" composition of matter has melted and is transparent, so that the observer has the apparent observation that the colorant 9 fills the entire bottom of the cavity "A", and in this case, partially absorbed throughout the cavity "A". When the cavity "A" has been filled with the composition of matter 5, and the composition of matter is a solid solution prior to its melting, the opaque characteristic of the composition of matter completely obscures sight of the colorant 1 at the bottom of the cavity "A". Hence, only when the composition of matter has melted can one see the colorant 1 at the bottom of the cavity "A" or throughout the cavity "A". It is necessary that the melting substance or composition of matter 5 in FIG. 2 be of such purity in nature that upon melting completely, it has the property of "stable undercooling", or simply "undercooling" known to those skilled in the art, i.e., that it has the property that after liquifying upon cooling at ambient temperature below the freezing point of the composition of matter, it will remain liquid for several hours. It has been found that if the composition of matter has the concentration of impurities indicated above, then it will have such a property of stable undercooling.

If the novel compositions of matter described above are used (instead of "classical" compositions that change only from opaque to transparent upon a corresponding change from solid to liquid) the layer of colorant 1 may be eliminated.

Figure 6:
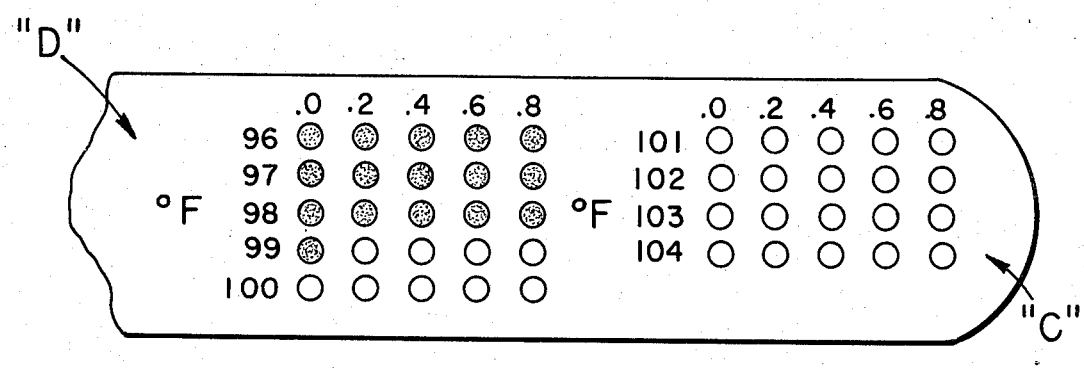
FIG. 6 is a partial overhead plan view of a thermometer over the human clinical temperature range embodying the principles of this invention when in degrees Fahrenheit.

FIGS. 5 and 6, respectively, present a partial plan view from above and the side of one embodiment of the invention showing a heat-conducting carrier means "C" of a thermometer in a Celsius system (one sub-grid showing cavities associated with 35.5° C. to 37.9° C. only), and a plan view from above a similar means of the same chemical thermometer in a Fahrenheit system in a particularly effective embodiment of the invention, to wit, a rectangular grid is formed (preferably having two sub-grids of 35.5° C. to 37.9° C. and 38.0° C. to 40.4° C. for the Celsuis type and 96.0° F. to 99.8° F. and 100.0° F. to 104.8° F. for the Fahrenheit system) wherein each cavity 13 employs a construction as in FIG. 2 and is clearly associated with a temperature to be determined within the range of temperatures to be tested through markings located on the side of the grid. In FIGS. 5 and 6, one will notice that as each cavity 13 employs the same colorant (1 of FIG. 2); so that upon a completion of a test for the thermometer within the predetermined temperature range, one or more cavities having compositions of matter in the liquid phase will clearly be distinguished from the remaining cavities having compositions of matter in the solid phase.

Figure 7:
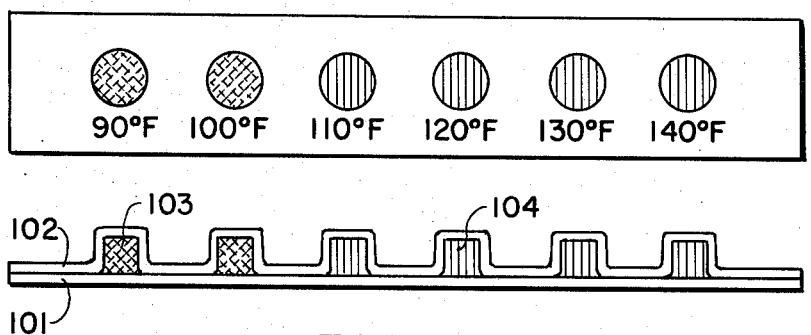
FIG. 7 is a view of a thermometer with 10° F. increments when using the novel compositions of matter of this invention in a commercial application.
Figure 8:
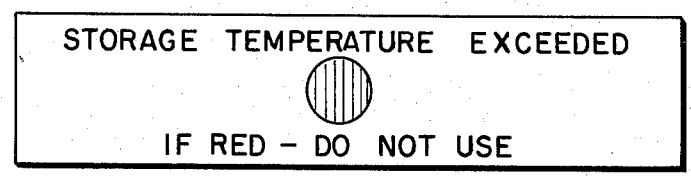
FIG. 8 is a plan view of a temperature-indicating device from the horizontal (together with a plan view from the vertical of a label on said device) using the novel compositions of matter of this invention for indication of a temperature exceeding a predetermined safe limit. The details of the above figures will be discussed, infra.

FIG. 7 indicates a scheme for testing temperatures of intervals of 10° F. using the novel compositions of matter described above (which turns from orange 103 to red 104, for example, on melting) wherein the necessity for colorant materials 1 of FIG. 2 is eliminated. Here in FIG. 7, transparent cover plate means 101 is in sealing engagement, preferably vacuum sealing engagement, with the heat conducting carrier means 102 and each of the peripheries of the six cavities shown. It will readily be appreciated by those skilled in the art that the novel compositions of matter can be used not only in the novel temperature-indicating device shown in FIG. 2, but in other configurations as well, such as FIG. 8, wherein a single cavity is employed with the same novel composition of matter of FIG. 7 (that has already changed to red upon melting) to determine whether or not a material in storage has exceeded a safe temperature.

Referring again to FIG. 2, in the case of employing one or more "classical" composition(s) of matter, the colorant or dye layer 1 may contain a dyestuff which is responsive to the change in the physical state of the composition of matter 5. The colorant 1 may be a "dye layer", or layer constructed of a material impregnated with a dyestuff. Examples of dyestuffs suitable for indicator materials are the halogenated nitrobenzenes such as Croceine Scarlett SS ® and Polynal Blue ®, both manufactured by the Allied Chemical Corporation, and both stable over long periods of time. As the composition of matter 5 undergoes initial melting, the dye layer 1 becomes wetted, resulting in the substantially instantaneous migration of dye from layer 1 to the entire body of the composition of matter 5. However, it may be necessary only to employ colorant materials 1 which are merely paints at the bottom of cavity "A", preferably that are blue or black. The greater the intensity of the visible change of appearance in the composition of matter 5 through the employment of a substantially spherical void space 3 and dark colorant layer 1, the greater the ease in reading the thermometer cavity. In one preferred embodiment, the change in appearance of the "classical" composition of matter 5 when seen from above, such as in FIG. 9, is from white to intense blue using a painted indicator layer having the latter color.

The operation of the thermometer of FIG. 5 (or FIG. 6) is as follows: viewing FIG. 5 with cavities substantially constructed as in FIG. 2, the remote part of the handle portion "B" (not shown in FIG. 5, but 35 in FIG. 9) in FIG. 5 is held between the fingers, and portion "C" with cavities 13 is inserted into the mouth and preferably held under the tongue for a relatively short period, to wit, approximately thirty seconds to one minute. During this time, all of the compositions of matter of the various cavities 13 which have melting points below the temperature in the mouth will melt, revealing the colorant 1 in each of said cavities to indicate a change in color visible to the naked eye. Because of the purity in nature of the melting compositions of matter, such that they have a property of stable undercooling for at least several minutes, the user may simply withdraw the thermometer of FIGS. 5 and 6 and clearly see via the grid shown thereon his temperature to the increment of precision chosen, to wit, 0.2° F. or 0.1° C. Preferably, the colorant 1 for each of the cavities 13 in FIG. 5 is of the same color, and all of the cavities are filled by OCNB/OBNB compositions of matter having melting points separated by equal increments of 0.2° F. or 0.1° C. whose constituents have been selected from a graph such as FIG. 1. FIGS. 9 and 10 display in another preferred embodiment in three dimensions from a skewed angle a flat heat-conducting carrier means 37, here aluminum, with cavities 36 (such as shown in FIG. 2) in a Fahrenheit grid (as FIG. 6) from 96.0° l F. to 104.8° F. connected to a plastic (preferably polystyrene, polypropylene, or polyethylene) handle 35. Until used, the carrier means 37 fits comfortably inside a case (preferably made of the same materials as the handle 35) 32 and by means of a roller 33 which exerts leverage downward against carrier means 37 and a layer of paper, plastic, or other retaining means 31 to prevent the carrier means 37 from being removed accidentally from case 32 unless a deliberate force is exerted on handle 35 to accomplish such removal. Although not shown in FIG. 9, the end of the carrier means 37 (which is most adjacent to handle 34) is fitted with locking means so as to make a vacuum-sealing engagement between said carrier means 37 and case 32 until a deliberate force of sufficient magnitude breaks the locking means. Also, the handle 35 may be notched so as to form indentures 34 therein for a firmer grip by the user who desires to remove the carrier means 37 from the case 32.

In FIG. 10, once again a transparent cover sheet means 39 in the form of a plastic transparent sheet or plastic transparent cover means fits in sealing engagement, preferably vacuum sealing engagement, with the carrier means 37 overlying and above cavities 36 and in sealing engagement with each of the peripheries of said cavities.

FIG. 11 shows a horizontal section along line 11-11 of FIG. 10; it is a partial plan view of several cavities having indicator means 38 in the form of a paint. Transparent cover sheet means 39 is in sealing engagement with aluminum heat conducting carrier means 37 and is in sealing engagement with each of the peripheries of the cavities; a similar bottom plate means 40 fits in sealing engagement with heat conducting carrier means 37 and is in sealing engagement with each of the peripheries of the cavities; a similar bottom plate means 40 fits in sealing engagement with heat conducting carrier means 37 so as to present the thermometer as a flat surface. The bottom plate means 40 is provided to aid the carrier means 37 in preserving structural integrity and is coextensive with the entire surface of carrier means 37, and has a thickness from about 0.001 inches to about 0.004 inches.

In FIGS. 12 and 13, another preferred embodiment of the invention is disclosed for measuring temperatures at 0.2° F. increments from 96.0° F. to 104.8° F., combining the novel compositions of matter of this invention (preferably OCNB:OBNB/pinacyanol iodide) with the novel cavities of FIG. 2, only without the necessity of an indicator layer. Unlike the embodiment shown in FIG. 9 and 10, the embodiment realized in FIGS. 12 and 13 does not have a case, and therefore is less expensive to manufacture.

FIG. 12 displays a plan view of the substantially flat oral temperature indicating device as seen from above. Again, the thermometer has an aluminum heat conducting carrier means 44 (of width 47 in FIG. 12) which acts not only as a main structural body of support, but at the same time provides rapid and uniform temperature distribution throughout the spatula portion "F" (having width 54 containing grid "G" of a plurality of cavities (each of diameter 57 and spaced center-to-center with each neighbor along a horizontal "x" axis or vertical "y" axis in FIG. 12 at a distance 52 apart) of FIG. 2, each cavity with the novel composition of matter and each associated with a predetermined temperature to be measured at 0.2° F. increments from 96.0° F. to 104.8° F., and each novel composition of matter substantially spherical void within said cavity. "Spatula" portion "F" of the device of FIG. 12 is rounded for safety so that some distance 56 is maintained between the most forward row of cavities and the edge of the device. It may be observed by those skilled in the art that if "classical" compositions of matter are employed in lieu of our novel compositions of matter, that each cavity will necessary employ an indicator layer such as layer 1 of FIG. 2.

Again in FIG. 12, one will note that the aluminum heat-conducting carrier means is covered above for the entire handle "E" portion of the thermometer device by a top plastic layer 42 of width 54, preferably made out of a plastic such as polystyrene, polypropylene, or polyethylene. In FIG. 13 a bottom plate means 46 of width 49 extends along the entire length 53 of the thermometer device. The top layer 42 terminates upon entering the spatula portion "F" of the thermometer device, revealing grid "G" of cavities, dark markings (preferably blue or black-painted) 45 indicating the predetermined temperature to be measured for each cavity, and a heat-sensitive transparent film cover means 43 of width 50, which as before is most preferably a coextruded film of Nylon 6 ® and Surlyn 1652 ® produced by Pierson Industries Incorporated that is subsequently laminated to polypropylene by the Millprint Company, or in the alternative, simply Mylar, polypropylene, nitrocellulose, polyvinyl chloride, etc. The heat-sensitive transparent film cover means 43, as in FIG. 12, is in sealing engagement with the carrier means 44 above, and is overlying each of said cavities to form an enclosure between the walls of each cavity and the transparent cover sheet means 43. It is important the film cover means 43 be in tight vacuum- sealing engagement with the periphery of the carrier means 44 with each cavity to avoid loss of the compositions of matter within each cavity. For that reason, as well as for appearances, some minimal distance 55 is maintained between a leading edge of a row of cavities and the edge of the thermometer device. Preferably, the heat-sensitive transparent film cover means 43 consists of bands that cover only the immediate area surrounding the cavities to avoid undue manufacturing expense. (In FIG. 13, the transparent film cover means is shown in two bands, each of width 51 which covers the two rows of cavities), although it will be obvious to one skilled in the art that the heat-sensitive transparent film cover means could cover the entire spatula portion "F" of the device. The heat-sensitive transparent film cover means 43 may be put in sealing engagement with aluminum carrier means 44 through the use of a machine such as Webb Model No. 2 manufactured by Bio-Medical Sciences, Inc., of Fairfield, New Jersey.

Also in FIG. 12, it will be recognized that the handle "E" has been stamped from below so as to make the device realize two ridges, ribs, or abutments 41a that protrude from above the carrier means 44 by some nominal distance which is approximately the same as width 47 of carrier means 44; likewise, the device realizes two cavities 41b in carrier means 44 that parallel the ridges 41a. As will be appreciated by those skilled in the art, although the distances shown in FIGS. 12 and 13 can be readily adjusted with respect to one another or in proportion (widths 47, 48, 49, 50, 51, 52, 53, 54, 55, 56, 57, and 58 can be multiplied by different constants) it is well to describe a device for measuring human temperatures in the range of 96.0° F. to 104.8° F. that we recently constructed, employing ortho-chloronitrobenzene and ortho-bromonitrobenzene in a solvent system with pinacyanol iodide in the amount of 0.035% by weight to form a thermometer with the novel compositions of matter of this invention, which is the best mode of our invention and which is marketed by Organon Inc., (West Orange, New Jersey) under the trademark DEMPA DOT READY STRIP®. Referring again to FIG. 12, the thermometer has a width 54 of about 0.345 inches at the widest portion of handle "E" and has the same width 54 of about 0.345 inches in the spatula portion "F" of the thermometer. The cavities each have a diameter 57 of about 0.039 inches and each cavity has a depth of about 0.005 inches, and is spaced from each neighbor on a horizontal "x" axis or vertical "y" axis by a distance 52 of 0.015 inches. The top and bottom rows of cavities are of a distance 55 of about 0.039 inches from the leading edges, respectively, of the thermometer, and have a center line on the right-hand column which is a distance 56 of about 0.193 inches from the tip of the rounded edge of the spatual "G" portion of the thermometer. In FIG. 13, taken along line 13—13 of FIG. 12, it will be appreciated that the oral thermometer device has an overall length of 4.250 inches, and consists of an aluminum heat conducting carrier means 44 having an overall length of 4.250 inches and a depth 47 of about 0.003 inches. The aluminum heat conducting carrier means 44 is covered on the handle portion "E" of the thermometer by a polypropylene or polystyrene layer of thickness 48 of about 0.003 inches; the carrier means also is in engagement with a polypropylene or polystrene bottom plate means 46 of width 49 of about 0.003 inches that traverses the entire length of the thermometer. Two bands of heat-sensitive material (co-extruded film of Nylon 6 TM and Surlyn 1652 TM subsequently laminated to polypropylene) cover the two sub-grids (100° F. to 104.8° F. and 96.0° F. to 99.8° F.) and are each of width 51 of approximately 0.300 inches along the "x" axis and of depth 50 of from about 0.003 to about 0.005 inches.

As previously stated, grid "G" in FIG. 12 consists of two sub-grids, one from 96.0° F. to 99.8° F. and the second from 100° F. to 104.8° F. In this pattern, the cavities are arranged in rows along the longitudinal axis of the thermometer. Although the two sub-grids selected were merely for convenience, one large grid could have been selected for the device. The group associated with the lower temperature value is positioned more distantly from the thermometer handle while the group associated with the higher temperature value is positioned nearer to the thermometer handle. The temperature scale utilized Fahrenheit or Celsius) and the desired range of measurements and temperature increments will quite obviously determine the exact number of cavities and therefore rows.

Although not shown, a thermometer similar to that shown in FIGS. 12 and 13 could be constructed whereby the bottom plate means (46 in FIG. 13) could be removed from spatula portion "F" of the device, and each of the cavities allowed to protrude entirely through the carrier means (44 in FIGS. 12 and 13); a bottom heat-sensitive and transparent film cover means could be placed in sealing engagement with the carrier means the peripheries of each of the cavities so that one could observe the change in color of the novel compositions of matter if the latter were employed. Also, it is obvious to one skilled in the art that ribs 41a in FIG. 12 are not necessary; indeed, many minor changes in the device shown in FIGS. 12 and 13 could be made without departing from the spirit of the invention. As a preferred embodiment, ribs 41a may be removed as in actual practice (TEMPA-DOT ® READY-STRIP TM disposable clinical thermometer of Organon Inc., West Orange, New Jersey). The spherical void of FIG. 2 is not required for the embodiment of FIGS. 12-13 when novel compositions are employed.

Figure 14:
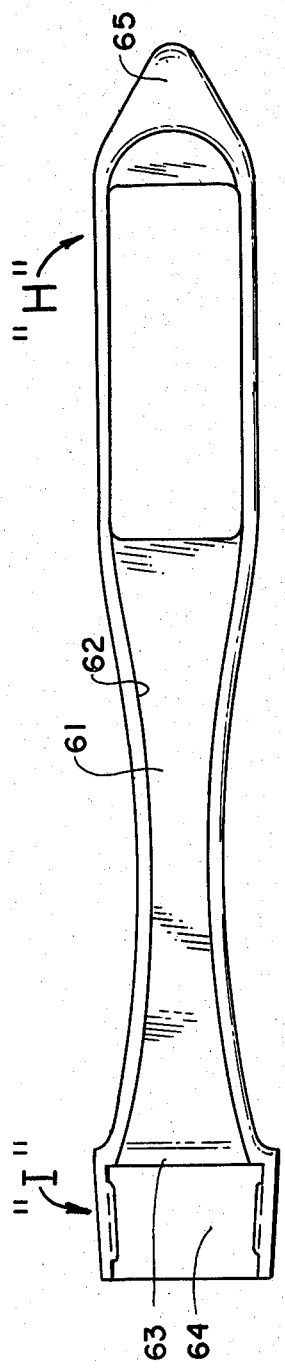
FIG. 14 is a plan view taken from the vertical of a transparent support member for a disposable clinical thermometer either of FIG. 10 or FIGS. 12-13.

FIG. 14 is a plan view of a elongated monolithic support member (preferably transparent) for a disposable clinical thermometer such as depicted in FIG. 10 or in FIGS. 12-13. The support member is preferably made of highly translucent polypropylene, although it will readily be noticed by one skilled in the art that the support member could, in the alternative, be constructed of any suitable malleable, soft material form so as to support the thermometer, yet flexible enough to avoid damaging delicate tissue of the user. The support member is intended specifically for rectal administration of the thermometer, such as for infants and the elderly or others who might otherwise not be capable of receiving oral administration properly. The member can also be used for administration in any body cavity indicative of the temperature of the body and of sufficient dimensions to accept the member.

Figure 15:
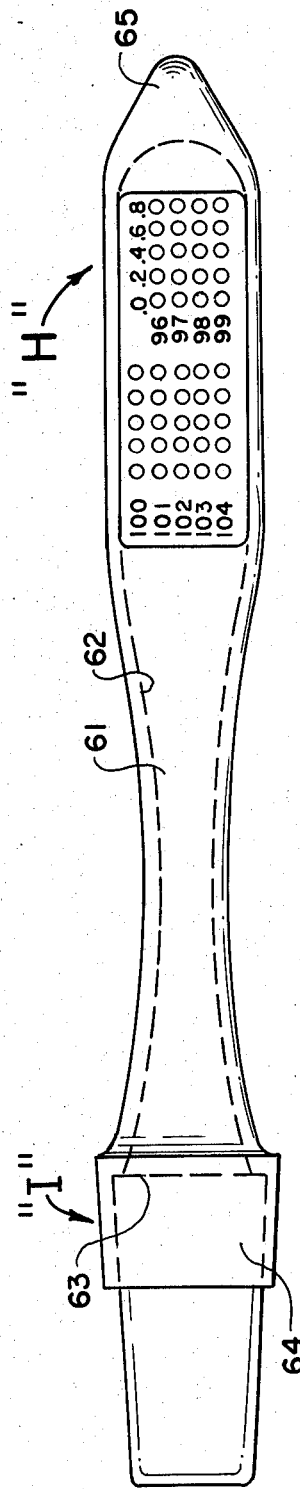
FIG. 15 is a plan view taken from the vertical of the transparent support member of FIG. 14, except in sealing engagement, with a disposable thermometer such as that shown in FIG. 10 with a Fahrenheit scale from 96.0 degrees Fahrenheit to 104.8 degrees Fahrenheit graduated in 0.2 degrees Fahrenheit increments.
Figure 16:
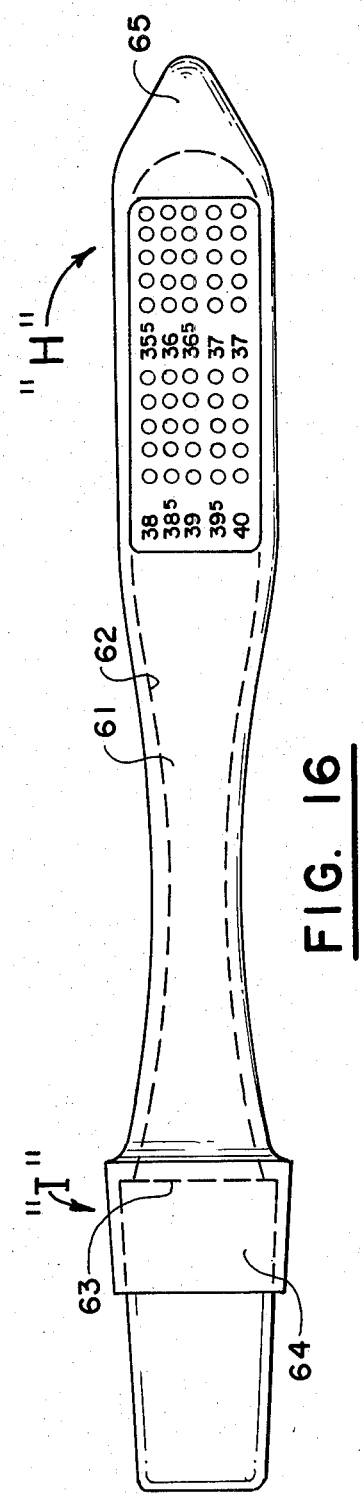
FIG. 16 is a plan view taken from the vertical of the transparent support member of FIG. 14, except in sealing engagement, with a disposable thermometer, such as that shown in FIG. 10, but with a Centigrade scale from 35.5 degrees Centigrade to 40.4 degrees Centigrade graduated in 0.1 degrees Centigrade increments.

Referring to FIG. 14 as before and now also FIGS. 15-16, it will be apparent that FIGS. 14-16 are taken from the vertical, and more particularly, that FIG. 15 depicts in plan view the translucent support member, except in sealing engagement with a disposable thermometer as shown in FIG. 10 with a Fahrenheit scale from 96.0 to 104.8 degrees Fahrenheit with 0.2 degrees Fahrenheit increments. FIG. 16 is identical to FIG. 15, except utilizing a Centigrade scale from 35.5 degrees Centigrade to 40.4 degrees Centigrade with increments of 0.1 degrees Centigrade. Body 61 of the member acts as a bridge between the sections "H" and "I", which are adapted to fit comfortably spatula portion "F" and handle portion 42 of the disposable thermometer of FIG. 12, respectively, in sealing engagement. Section "I" comprises a handle portion 64 with a ridge or indentation 63 as seen from above and facing the user in FIG. 14 and above but away from the user in FIGS. 15-16, i.e. as if the member of FIG. 14 was merely rotated on its axis 180° to receive the Fahrenheit thermometer of FIG. 15 or the Centigrade thermometer of FIG. 16. Ridge 63 continues into body 61 as ridge or indentation 62 which traverses the entire support member on both sides of the member into section"H". The ridge is of sufficient width (about 1 cm) to accept the thermometer comfortably and to alleviate the problem of cutting during insertion into the body cavity, and is of such a tolerance that the disposable thermometer of FIG. 10 or 12 snaps securely into fitting engagement with the member. The spatula tip 65 of section "H" is rounded smoothly, as are exterior edges of the member, in order to avoid damage to delicate tissue upon administration of the thermometer. Spatula portion "H" is suitably constructed to have a window or vacancy so that the grid of the thermometer such as grid "G" of FIG. 10 is clearly seen upon removal from the source by the user.

As a most preferred embodiment, and referring again to FIGS. 14, 15 and 16 display a rectal adapter including forward section "H" and rearward section "I". Forward section "H" includes substantially solid tip 65 which is the leading edge of the rectal adapter during insertion into the rectum. Tip 65 is a partially flattened conical shape for comfort during insertion. The inside portion 64 of the rectal adapter receives the bottom portion 42 of thermometer of FIG. 12. The thermometer is adapted to be snap-fitted into the adapter by means of lips 62 and 63 which extend about a portion of the periphery of the adapter. As can be seen, lip 62 extends outwardly from the bottom surface of the adapter and inwardly towards its longitudinal axis. The rearward portion 12 of the adapter further includes a handle receiving portion 63 for the receiving handle 42 of the thermometer. Other embodiments of disposable thermometers do not utilize a handle and thus handle receiving portion 16 would act as a handle itself or could be eliminated.

Again referring to FIGS. 15 and 16, the forward section "H" of the adapter further includes an open window portion which is adapted to align with thermally-responsive temperature indicating portion of the thermometer of FIGS. 12 and 13. This window is in effect a hole punched through the adapter for providing improved thermal contact for temperature indicating portion of the thermometer and its immediate environment.

FIG. 14 also shows the thermometer of FIG. 12 snap-fitted into a rectal adapter with the top side of the indicating portion facing the user and partially covered by an open window shown in Section "H". FIG. 15 also shows the rectal adapter with the temperature indicating portion of the thermometer 1 exposing pockets directly to its surrounding environment through the open window in Section "H". The use of the thermometers of the prior art with prior art rectal adapters did not permit the bottom side of the thermometer thermally-responsive material to be exposed to the environment. That is, the pockets such as 43 of FIGS. 12 and 13 rested against the polypropylene material on the inside bottom layer of the prior art rectal adapter. Since the rectal adapter of the prior art was normally made of a plastic, such as polypropylene, and since these plastic materials are thermal insulators, it was found that the thermometer, when used with the prior art rectal adapter, registered lower than a mercury and glass thermometer. Furthermore, clinical studies have shown that the use of the disposable thermometers with the prior art rectal adapter did not "fire", that is, some of the dots between the highest temperature dot fired and some lower temperature dots did not even register, thus providing a confused reading to the observer. Furthermore, if the indicating portion of the thermometer was inserted face down into the prior art adapter, the thermometer could be read only by removing it from the adapter. The instant adapter exposes both sides of the thermally-responsive portion of the disposable thermometer to its immediate environment by providing an open window in the rectal adapter thermally-responsive portion of the thermometer greatly improving the accuracy and response time of the thermometer. It has been shown by experiment that rectal temperatures taken using the improved rectal adapter/disposable thermometer combination provides the same temperature readings as a 3-minute glass and mercury thermometer reading. The disposable thermometer, however, provided the reading within 1½ to 2 minutes. Furthermore, experiments showed no tendency for the disposable thermometer to register "no fires", or skips, as did the thermometer used with a prior art rectal adapter. Because of the window, the thermometer may be easily read without removing it from the rectal adapter even if the thermometer has its indicating portion face down in the adapter. Thus, the window in the improved rectal adapter provides a dual function of improved thermal transfer characteristics and ease of reading for the thermometer.

As stated previously, one of the problems with the prior art adapter is incorrect low thermometer readings due to the fact that the adapter may be made of plastic insulators with the thermal conductivities listed below:

| | |
|---|---|
| polypropylene | $2.8 \times 10^{-4}$ cal-cm/sec/cm$^2$/°C. |
| polyethylene | $8-12 \times 10^{-4}$ cal-cm/sec/cm$^2$/°C. |
| polyvinylchloride | $3-4 \times 10^{-4}$ cal-cm/sec/cm$^2$/°C. |
| polycarbonate | $4.6 \times 10^{-4}$ cal-cm/sec/cm$^2$/°C. |
| polystyrene | $1-3 \times 10^{-4}$ cal-cm/sec/cm$^2$/°C. |

Thus an operable adapter utilizing applicant's invention may be made from the same or similar materials enabling correct thermometer readings.

From the foregoing description of the adapter, it would be apparent that many modifications may be made therein. For example, the thermometer of FIG. 12 may be placed into the adapter with either the pockets 22 facing up or down. It is therefore intended that such modifications shall be covered by the appended claims.

In still another embodiment to this invention, we have found that one may add an additional and effective amount of a soluble suitable nucleating agent, here a small amount of anthraquinone, to the existing novel compositions of this invention (or just to "classical" compositions of matter which will change from opaque to transparent upon a change from solid to the liquid state, or vice versa) which limits the amount of undercooling that the novel composition of matter (or even "classical" compositions of matter) can experience. Previously, (Chadha, U.S. Pat. No. 3,956,153) those skilled in the art employed anthraquinone in a "saturated" amount (e.g., from about 0.7% by weight to 0.9% by weight) in disposable thermometers in order to assure that the disposable thermometer (such as one employing OCNB:OBNB systems, such as shown in Table I) did not become molten prior to time of usage because of accidental or inadvertent melting due to high storage or shipping temperatures (see U.S. Pat. No. 3,980,581). However, we have discovered unexpectedly that anthraquinone may be employed in an effective amount, which is a somewhat lower content, e.g., from about 0.01% to about 0.4% by weight, in order to allow the user to induce resolidification of the thermometer at a predetermined controlled temperature below the melting point of the novel (or "classical") composition of matter. In this manner, the thermometer can utilize the undercooling principle to indicate accurately for a substantial period of time a temperature upon withdrawal of a heat-conducting carrier means containing a grid of cavities from the mouth, and also be regenerated or made reusable by placing the thermometer (e.g., the heat-conducting carrier with the grid of cavities) in cold water (e.g., 32° F.–40° F.) or another convenient low temperature medium which would lower its temperature to a point where nucleation sites would be formed in the supercooled liquid causing a spontaneous solidification of the novel (or "classical") compositions of matter, with its indicator additives. At that time, the thermometer would change from its liquid phase color (for example, red in the case of a OCNB/OBNB system with chlorophenol blue and ethyl red) back to its solid phase color (yellow). This embodiment would make the novel temperature-indicating device of our invention, whether employing the novel compositions of matter or the "classical" compositions of matter with the indicator means being a painted layer, etc., capable of multiple uses, thus representing a substantial advancement in the technology of chemical thermometry. For examples of other suitable nucleating agents, see U.S. Pat. No. 3,980,581, columns 5 of 6 incorporated herein by reference and especially column 6, lines 26–49 listing equivalent alternatives to anthraquinone.

As a much preferred embodiment, from about 0.01 weight percent to about 1.0 weight percent of an insoluble nucleating agent, talc (Talcum Powder, USP, $Mg_2(Si_4O_{10}(OH)_2)$, which may be obtained from Whittaker, Clark & Daniels Co., South Plainfield, New Jersy. (#399 Magnesium Silicate), may be employed in the novel compositions of matter as a means to control the temperature of resolidification in a pinacyanol iodide/OCNB-OBNB system adopted for clinical use with the 0.1 weight percent talc addition, regeneration or recrystallization occurs at about −6° C. Inter alia, potassium ethyl sulfate or potassium pyrosulfate in effective amounts are suitable alternatives to talc; see U.S. Pat. No. 3,980,581, of which Col. 6, lines 7–49 are incorporated herein). It must be noted that some routine experimentation is necessary to determine whether or not a nucleating agent is inert, i.e., whether or not it will affect the change in color upon change in phases of the novel compositions of matter. For example, some nucleating agents such as hydroxylamine hydrochloride act as a strong acid and will decolorize the dye portion of the composition; for example, a pinacyanol iodide/OCNB-OBNB composition. Others, Floricil, for example, will form a pigment "lake" ("laking") within the dye and render the novel compositions inoperable. Other potential nucleating agents, such as potassium acetate or sodium tetraborate contain substantial quantities of water which when released upon crystallization will deactivate some of our novel compounds by dissolving and partitioning the dye (for example bromochlorophenol blue) in the aqueous phase. Also, the water may affect the melting point of the solvent.

We have found that about a preferable amount of 0.1 weight percent of the recited talc in a composition of 0.035 weight percent pinacyanol iodide and the balance OCNB/OBNB (contained within a package of SURLYN ®1652 by E. I. duPont deNemours & Company, and aluminum) will raise the temperature of recrystallization from −40° C. to about −6° C.

As an alternate to the nucleating agents mentioned above, the surface of the heat-conducting carrier may be treated by anodizing (anodic oxidation) or chemical passivation to create nucleating sites. The anodizing procedure may be carried out in e.g. sulphuric acid or phosphoric acid or under other circumstances as will be known to those skilled in the art. Chemical passivation of the surface may be carried out by an etching procedure in 2% sodium hydroxide, a subsequent treatment with 10% nitric acid and washing with water.

In yet another preferred embodiment of the invention, and as an alternative of employing a substantially spherical void of FIG. 2, one may employ a circular layer of suitable absorbent bibulous material, which may be loaded with the novel composition(s) of matter, and that substantially fills not only the space of the solution 5, but also the void space 3, and is impregnated with the novel compositions of matter of the instant invention. Viewed from above, as in FIG. 5, each of the pockets 13 appear to be a fully colored dot which is surprisingly as easy, if not easier, for the user to read as the pockets of FIG. 2 employing a substantially spherical void space. Of course, the bibulous material must be inert to the phenomena of the novel compositions of matter upon changing phase. One material which has been found to be especially suitable is E. I. duPont deNemours & Company, spun-bonded polyoklefin TYVEK TM. Other suitable materials may include aggregated inorganic powders, glass fiber paper, ordinary celluosic paper, or other permeable polymeric material. An additional advantage of employing a bibulous material is that in case of accidential rupture of transparent film cover means 43 (FIG. 13) by the user, for example, by the teeth, the bibulous material would prevent spillage of the liquid contents on the surroundings. Another advantage of the employment of bibulous material is that instead of relying on the expertise of a skilled operator to meter the amount of liquid novel compositions to each cavity through the careful adjustment of many variables of a filling machine such as that depicted in U.S. Pat. No. 3,810,779 (such as hydrostatic head, flow rates, cycle time, and interfacial tension) can be eliminated since the capacity of the bibulum is predetermined for the size of the cavity and material employed. Thus, the open end of the filling system will contact the bibulum (when previously installed in place in the cavity) and liquid will contact the bibulum and liquid will quickly saturate the bibulum; driven by the capilliary attraction of the liquid to the bibulum, the flow will stop when saturation is reached. A still further advantage of the invention is that it provides for flexibility in the geometry of the display-symbols, such as letters and numbers, of other than dot or grid geometry, which be juxtaposed (as shown in FIGS. 5 and 12) or messages constructed from the novel composition(s) loaded on the bibulum.

Another preferred temperature indicating device consists of a layer of an absorbant material (bibulum) in which the novel composition of matter has been absorbed and which is surrounded by two transparent cover sheets in a sealing engagement with each other.

Another type of operation can be developed for application to suitable devices. The novel composition can be loaded onto a web of bibulum, solidified and then processed (e.g. by die cutting for example) into various devices simplifying manufacturing and reducing capital costs even further as the necessity for hot liquid loading of the novel compositions into the cavities is eliminated.

It is noted that is the duPont SURLYN® 1652 sealing layer aforementioned is replaced by a suitable structure comprising polyisobutylene (PIB by BASF, B-15 TM), then the novel liquid compositions inside each cavity sometimes remains pooled in a "dot" configuration instead of a "donut" or ring display of FIG. 2. It is believed that this phenomena is different from that phenomena observed when SURLYN® 1652 is employed, because the interfacial tension of the novel liquid composition (here pinacyanol iodide of about 0.025–0.05 weight percent/OBNB-OBNB as before) to the SURLYN® 1652 is very low while the interfacial tension of the novel composition to PIB is extremely high. Thermodynamics predicts that when materials are liquid and are physically free to move about, that they will occupy the lowest energy configuration. Hence, if SURLYN® 1652 or other SURLYN® adhesives are employed in the clinical thermometer of FIGS. 12-13 with the novel compositions, the lowest energy configuration is with the novel composition drawn against the SURLYN®, and particularly in the region where the SURLYN® forms a narrow capillary with the circumference of the aluminum base (44 of FIG. 13). With PIB adhesives (By BASF, B-15 TM) it is believed that the novel composition is "repelled" by the surface of the adhesive (compared to the aluminum base 44 and instead remains spread against the aluminum with which it has a lower interfacial tension.

Furthermore, we have found, unexpectedly, that a bibulous material raises the re solidification temperature of the compositions of matter (when in a supercooled state) to a level higher than heretofore experienced by solid inorganic nucleating agents. Therefore, by employing TYVEK® or other suitable bibulous material, an easily regeneratable thermometer (placing the fired thermometer into a refrigerator at about 40° F.) of a design substantially similar to that shown in FIGS. 12-13 can be produced. Otherwise, without the use of the bibulous material, temperatures of −40° F. to −50° F. are needed to regenerate a fired thermometer. In this manner, thermometers which have "fired" because of excessive heat in transit or storage may be salvaged easily. Bibulous materials have been used for the determination of glucose and other substances in liquids; U.S. Pat. No. 4,059,407.

A further advantage of a bibulous embodiment is that the bibulum may be used as a carrier for the inclusion of other hard-to-handle materials such as finely powdered insoluble nucleating agents. Thus, if talc is employed as a nucleating agent, it may be first loaded onto the bibulum. Such loading can be accomplished by passing the web through a dispersion of powder and then by evaporating the solvent. Bibulum material can be punched in predetermined configuration; the punched bibulum can carry predetermined quantity of the nucleating agent to each and every cavity of the thermometer pocket(s) or other device employing the novel compositions of matter.

Many items of commerce are subject to degradation or destruction by excessively high temperatures, and as recited before, single-use clinical thermometers employing the novel compositions of matter of the instant invention are no exception, especially when a nucleating agent is not employed. Exposure of the clinical thermometers above 96° F. will cause them to "fire", i.e. to record the exposed temperature and become unusable for further temperature measurement unless an effective method of recrystallization is employed. If no nucleating agent is employed in a composition having OCNB/OBNB as a solvent, means to lower the temperature of the thermometer from −40° F. to −50° C. will be necessary, which means is sometimes unavailable to the user. Typically, products such as clinical thermometers are shielded from adverse effects of high shipping and storage temperatures through heavy insulated shipping cartons containing ice (solid water) as refrigerant—a method which has obvious shortcomings.

We have discovered, unexpectedly, that protective packaging of heat labile goods can be greatly improved by using certain salts, notably sodium sulfate decahydrate, e.g. Glauber's salt, as the refrigerant. Glauber's salt acts as a refrigerant as follows: the melting point of Glauber's salt is 32.28° C. the TEMPA-DOT® READY-STRIP TM begins to indicate temperature at 35.2° C. When TEMPAT-DOT® READY-STRIP thermometers are packaged with Glauber's salt and exposed to high temperatures, for example 50° C., the temperature of the package rises until it reaches 32.28° C. At that temperature the Glauber's salt begins to melt and absorb heat (energy) at a capacity of about 54 cal/gram. The package will remain at about 32° C. until the salt has been consumed.

Ice, on the other hand, can only be loaded into the package immediately before anticipated thermal abuse since it will melt and lose its refrigeration capacities in storage at normal temperature (i.e. approximately 70° F.).

A further advantage of the invention over commonly used refrigeration relates to its ability to preserve the goods for extended periods of time. The rate of thermal conductivity through any material, including insulation, is directly proportional to the difference in temperature on either side of the material or insulation. When ice is used as refrigerant in an exposure to 100° F. the difference in temperature is 68° F. since ice performs most of its refrigeration during melting at 32° F. With Glauber's salt, however, the difference in temperature is only 10.4° F. (100° F.-89.6° F.). Thus, the rate of heat flow with Glauber's salt is less than 1/6 the rate of heat flow with ice as refrigerant. The result of the differences in temperature and heat of fusion between Glauber's salt and ice is that one pound of Glauber's salt will preserve the goods in the package as well as 4.5 pounds of ice during exposure to 100° F.

For the application of preserving single-use thermometers sodium sulfate decahydrate or calcium chloride hexahydrate are well suited, other thermally labile goods or applications may require alternate salts or compounds. The refrigerant should be selected as one having a melting point 3°-5° C. below the labile temperature. The amount of refrigerant is dependent upon the thickness of insulation and surface area/volume ratio of the package, the amount of time and the temperature for which the goods need protection. An example of another usable salt is sodium metaphosphate trihydrate (e.g. Knorre's salt) which melts at 53° C. and can be used to protect things labile at 57° C. There are many more examples of usable inorganic compounds (e.g. Potassium iron (III) sulfate 0.24H$_2$O, MP=28° C.) but organic compounds may be substituted. Thus, Glauber's salt may be replaced with o-chloronitrobenzene in the application with single-use thermometers.

It is desirable to package the novel refrigerant as with the classical refrigerant, ice. The novel refrigerant may be sealed in a flexible polypropylene plastic bag or closed in a rigid container. The purpose of such a package is to prevent contamination and moisture exchange to take place as well as to prevent the molten refrigerant from contaminating the goods being thermally shielded.

While the use of the above "novel refrigerants" has many advantages, there are some minor problems. First, unless cast into a solid block, the novel refrigerants are generally formless powders which can be difficult to handle. Further, upon melting, they form liquids which are free to flow into new geometrics within their container, if flexible.

We have found that these novel problems can be overcome by absorbing the molten novel refrigerant into a bibulous material such as open cell foam, paper, natural or synthetic sponge and the like, sealed to exclude contamination and, for hydrated salts, water vapor exchange by enclosing the structure in a flexible plastic bag, for example.

The novel refrigerant so packaged, is easy to handle, retains its shape when the refrigerant is molten and prevents the refrigerant from sagging from its intended location within the package.

An example of such a packaged novel refrigerant is sodium sulfate decahydrate absorbed into a block of open cell phenol-formaldehyde foam and contained in a polyethylene bag closed by heat sealing. When placed in an insulated container, the novel refrigerant block protects the contents from exposure to high temperature in the same fashion as the unsupported Glauber's salt.

As a preferable example of containing disposable thermometers as depicted in FIGS. 12-13 with the novel compositions of matter (such as pinacyanol iodide/OCNB-OBNB) one may ship and store about two thousand thermometers in a standard cardboard box of outer dimensions 9¾ inches wide by 13⅝ inches long by 15½ inches high (top and bottom 9¾ inches by 13⅝ inches; two sides 9¾ inches by 15½ inches; two sides 13⅝ inches by 15½ inches), by placing in the box square pieces (preferably six) of close cell polyurethane foam of 1½ inches thickness adjacent to the sides, top, and bottom of the box and placing the aforementioned polypropylene-wrapped squares of sodium sulfate decahydrate (thickness of about ½ inch to 1 inch) inside the polyurethane foam. Pieces of such a container are easy to manufacture and assemble.

It must be noted that a preferred method of individually wrapping the thermometer of FIGS. 12-13 is by wrapping them in an envelope (here 1⅛ inches wide by 4-11/16 inches long) of bleached paper sealed on the edges by a suitable contact adhesive known to those in the art. Such envelopes are readily available at a reasonable cost from Modern Packaging Inc., Mount Holly, New Jersey. More elaborate methods of individually wrapping the thermometers are available, e.g. U.S. Pat. No. 3,835,990, incorporated herein, but are not necessary if the above precautions are taken for shipping and storing (using the Glauber's salt, etc., when ambient temperature is above 96° F. and otherwise preventing exposure to temperatures above 96° F.).

Figure 17:
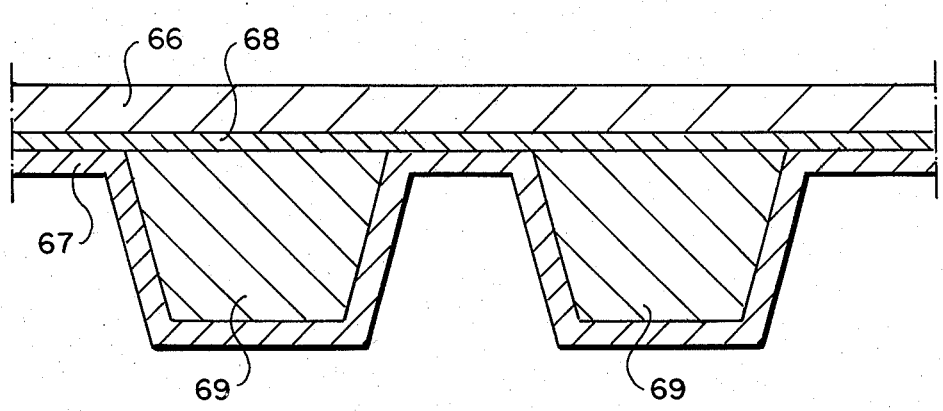
FIG. 17 is a partial plan view from the horizontal of a flat or gradually curved novel heat-conducting carrier having a cavity defined therein, where a cover layer is bonded to a carrier layer by a pressure-sensitive adhesive layer comprised of polyisobutylene (PIB)
Figure 18:
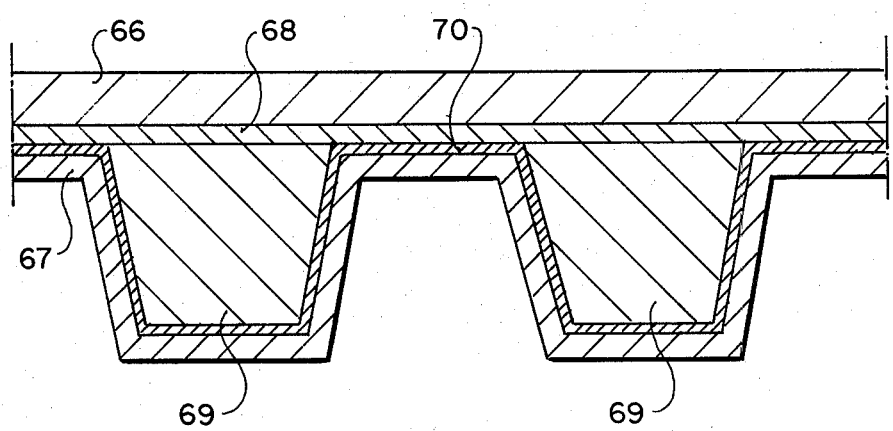
FIG. 18 is a partial plan view from the horizontal like FIG. 17 except using an additional layer of PIB adjacent to the lower edges of the cavity.

In one preferred embodiment the transparent cover sheet and the heat conducting carrier means of the above FIGS. 1-16 are preferably bonded together by means of a layer of a pressure sensitive adhesive which entirely or substantially consists of polyisobutylene, as shown in FIGS. 17-18.

More specifically, a temperature-indicating device heat-conducting carrier may be employed having one or more spaced regions defined therein to determine a like number of predetermined temperatures in a predetermined temperature range, with a like number of different compositions of matter defined therein, contained by a transparent cover sheet means in sealing engagement with the carrier, and with a single composition of matter being deposited in each of said regions and being associated with a single one of said predetermined temperatures wherein the compositions of matter used are the novel compositions of matter of this invention and wherein the transparent cover sheet means and the heat-conducting carrier are sealed to each other by means of an adhesive layer of a pressure-sensitive adhesive which entirely or substantially consists of polyisobutylene.

In addition, in a similar way polyisobutylene may be used as an adhesive in any temperature-indicating device comprising:

(a) a heat-conducting carrier means provided with one or more cavities at least one of which cavities is filled with an indicator means and a classical composition of matter which melts at a predetermined temperature and is composed of a mixture of ortho-chloronitro-benzene and ortho-bromonitro-benzene, and (b) a transparent cover sheet in sealing engagement with the carrier means overlying each of said cavities.

From the U.S. Pat. No. 3,002,385, temperature-indicating devices are known in which use is made of low-temperature bonding adhesive, such as an epoxy resin or a pressure-sensitive adhesive substance having a basis of silicones. For various reasons, such as insufficient resistance to the chemicals used, release of low-molecular constituents, which detrimetally affect durability, temperature indication and reproducibility, and the fact that they are insufficiently impervious to chemicals, said adhesives have been found to be unsuitable.

It is preferred that the polyisobutylene used as pressure-sensitive adhesive should have an average molecular weight in the range of 50,000 to 5,000,000, more particularly 150,000 to 4,000,000.

A very favorable combination of adhesive strength and resistance to the chemicals present in the cavities is obtained if the adhesive layer consists of a mixture of 30-70% by weight of polyisobutylene having an average molecular weight of 70,000 to 100,000 and 70-30% by weight of polyisobutylene having an average molecular weight of 1,000,000 to 3,500,000. It is preferred that said mixture should consist of practically equal parts by weight of the respective constituents.

The adhesion between carrier layer and pressure-sensitive adhesive can still be further improved in various ways. Such improvement is obtained if the carrier layer consists of aluminum foil having an etched surface. Improvement of the adhesive strength can also be realized by making use of a carrier layer of aluminum foil coated with a polyisobutylene surface layer applied from a solution in an organic solvent.

The adhesion between carrier layer and pressure-sensitive adhesive can still be further improved in various ways. Such improvement is obtained if the carrier layer consists of aluminum foil having an etched surface. Improvement of the adhesive strength can also be realized by making use of a carrier layer of aluminum foil coated with a polyisobutylene surface layer applied from a solution in an organic solvent.

As example of a suitable solvent hexane may be mentioned. It is preferred that such a surface layer should have a thickness of 2-10 micrometers. It is preferred that the polyisobutylene used for such a surface layer should have an average molecular weight in the range of 2,000,000 to 3,500,000.

The use of a carrier layer having a surface thus modified makes it possible to obtain good adhesive strength also when employing polyisobutylene having a relatively high molecular weight. A carrier layer coated with a surface layer of polyisobutylene is therefore preferably used if the carrier layer is bonded to the transparent cover layer by means of a pressure-sensitive adhesive layer of polyisobutylene having an average molecular weight in the range of 2,000,000 to 3,500,000.

The pressure-sensitive adhesive to be used according to the invention can be applied as thin layer to one side of the film material used as transparent cover layer, for instance polyester film. This may be done from a solution in, for instance, hexane or from the melt. The thickness of the adhesive layer thus formed is as a rule 10–100 micrometers and preferably 20–60 micrometers.

The polyisobutylene-coated side of the transparent cover layer is brought into contact with the carrier layer on the side where the cavities to be closed off are positioned, and bonded to it under pressure without the temperature being increased. The bonding pressure applied is generally in the range of 1 to 50 kg/cm².

Various types of polyisobutylene are suitable to be used for this purpose. It is preferred that the average molecular weight of the polyisobutylene should be in the range of 50,000 to 5,000,000. By average molecular weight is to be understood the viscosity average molecular weight. This is calculated from the intrinsic viscosity, which in its turn is determined from the rate of flow of a solution having a concentration of 1 g/dl in isoctane through the capillary of a Ubbelohde viscometer at a temperature of 20° C.

For the calculation, the following formula is used:

$$[n] = \frac{n_{sp}/C}{1 + 0.31\, n_{sp}} = 3.06 \times 10^{-4} \times \overline{M}_v^{0.65}$$

where:
[n] = intrinsic viscosity
$n_{sp} = t/t - 1$ = specific viscosity
t = rate of flow of the solution, corrected in accordance with Hagenbach-Couette
$t_o$ = rate of flow of the solvent, corrected in accordance with Hagenbach-Couette
c = concentration of the solution in g/dl
$\overline{M}_v$ = average molecular weight The polyisobutylene used has a good resistance to the chemical substances present in the cavities, does not influence their melting point, and hardly absorbs chemical substances and does not allow the passage thereof.

In FIG. 17 the cover layer 66 is bonded to the carrier layer 67 by an adhesive layer 68. This adhesive layer 68 consists of a pressure-sensitive adhesive which is entirely or substantially of polyisobutylene and can be applied to the carrier layer 67 without the melt temperature of the temperature-sensitive composition 69 in the cavities being exceeded.

In FIG. 18 the carrier layer 67 is still provided with a surface layer 70 of polyisobutylene. The latter serves to improve the adhesion between the pressure-sensitive polyisobutylne of the adhesive layer 68, consisting essentially of polyisobutylene, and the material of the carrier layer 67. The surface layer 70 is generally obtained by providing the carrier layer material with a thin coat of a solution of polyisobutylene in an organic solvent, e.g. hexane, and subsequently allowing the solvent to evaporate. The temperature-sensitive composition 69 in FIGS. 17 and 18 is preferably selected from the novel compositions of matter of this invention. When the temperature-sensitive composition 69 is a classical composition of matter it is used together with an indicator means (not shown in FIGS. 17 and 18), which may be any indicator means known in the art, e.g. a layer of paint located at the bottom of the cavity, a dye dispersed in the temperature-sensitive composition or an indicator layer of absorbent material located above the temperature-sensitive composition.

Although the invention has been described with reference to specific embodiments above, numerous variations and modifications will become evident to those skilled in the art, without departing from the scope and spirit of the invention as described above defined in the appended claims, and as shown in the following examples:

EXAMPLE 1

About 1.25 grams of pinacyanol iodide was mixed and dissolved in a 100 ml beaker by mechanical stirring means in a solvent system of 24.99 g of a mixture of ortho-bromonitrobenzene and ortho-chloronitrobenzene (75% of the solvent system was composed of ortho-bromonitro-benzene and 25% was composed of ortho-chloronitrobenzene). The 0.05% pinacyanol iodide content could be determined accurately by means of a Mettler TM balance wherein 0.0125 g of pinacyanol iodide was placed on top of paper weighing 0.2426 g to obtain the objective of a total 0.2551 g. The pinacyanol iodide was mixed in the beaker with the 24.99 g of ortho-bromonitrobenzene: ortho-chloronitrobenzene solution at from about 45° C. to about 60° C. to obtain a uniform novel composition of matter. This liquid was allowed to cool, and at about 38.04° C. with artificial nucleation the liquid solution changed from a blue color to a solid solution which was light brown rose. This example demonstrates that a novel composition of matter employing a Group III compound of pinacyanol iodide without the presence of a Group I or Group II compound may alone change color in a transition from a liquid to a solid state. It was found that upon heating up the solid solution back into the liquid phase, that the solution turned from a light brown back to its original blue form.

EXAMPLE 2

In the same manner as Example 1, a 10.0 g solution of 0.05% chlorophenol blue (a Group I and Group III material) and ethyl red (a Group II material), wherein the chlorophenol blue weighed 0.00375 g and the ethyl red weighed 0.00125 g, were added to a liquid solution of ortho-bromonitrobenzene:ortho-chloro-nitrobenzene of 9.995 g, wherein the ratio of the ortho-bromonitrobenzene to the ortho-chloronitrobenzene in the 9.995 g solvent system was 3:1 by weight. The 0.00375 g of chlorophenol blue and 0.00125 g of ethyl red were added simultaneously to the ortho-bromonitrobenzene: ortho-chloronitrobenzene solution at from about 40° C. to about 60° C. The liquid solution had a red color that changed at about 37.5° C. to a yellow-orange color in the solid state immediately at the change in state. Upon heating, the yellow solid solution turned at 38.04° C. back to its original red color. This example demonstrates that a combination of a Group I compound and a Group II compound for a novel composition of matter in a suitable weakly polar aromatic solvent system will change color upon a corresponding change from a liquid to a solid state or vice versa.

EXAMPLE 3

In the same manner as Example 1, a 0.05% solution of ethyl red (a Group II compound) consisting of 0.005 g of ethyl red was mixed at from about 40° C. to about 60° C. in a solution composed of 75% ortho-bromonitrobenzene and 25% ortho-chloronitrobenzene wherein the ortho-bromonitrobenzene and ortho-chloronitrobenzene weighed a total of 9.995 g. No Group I material was added to the instant solution. The liquid at 40° C. was purple in color, but upon solidifying at 38.04° C. with the aid of artificial nucleation remained in its original purple form for several days. Likewise, upon reheating, the purple solid solution turned back into a purple liquid at 38.04° C. This example demonstrates that a Group II material in and of itself without the presence of a Group III material will not undergo the desired color change without a Group I material with the corresponding change in phases, and therefore, a Group II material alone will not suffice for one of our novel compositions of matter. (One notes that the phenomena observed herein is inconsistent with the complement of the theory proposed by R. B. McKay and P. J. Hillson, "Metachromatic Behavior of Dyes in Solution", 61 TRANSACTIONS OF FARADAY SOCIETY 1800 (1965).

EXAMPLE 4

In this example, in the same manner as Example 1, a solution of 0.05% bromochlorophenol blue and pinacyanol chloride (a Group II/Group III compound mixture) where the ratio of bromochloro-phenol blue to pinacyanol chloride was 5:1 (0.0042 g bromochlorophenol blue was employed to 0.0008 g pinacyanol chloride with 9.9995 g of a solvent solution composed of 75% ortho-bromonitro-benzene and 25% ortho-chloronitrobenzene). Again, by the use of a Mettler TM balance, the weight of the bromochlorophenol blue and pinacyanol chloride could be accurately determined after placing these materials on pieces of paper weighing 0.2517 g and 0.2457 g, respectively. The 0.0042 g bromochlorophenol blue and 0.0008 g pinacyanol chloride was added at from 40° C. to 60° C. to the ortho-bromonitrobenzene:ortho-chloronitrobenzene solution in a 100 ml beaker and stirred by mechanical stirring means. The greenish-blue liquid solution was allowed to cool from 40° C. to its solidification point at about 38.04° C., whereby it changed with the aid of artificial nucleation instantly to a yellowish-green solid form. This example demonstrates clearly that another Group I compound, bromochlorophenol blue, is suitable for use in the making of a novel composition of matter when taken into a solvent mixture with a Group II/Group III compound, pinacyanol chloride, and will change color upon a corresponding change in state.

EXAMPLE 5

In the same manner as the preceding Examples, a 10 g solution of 0.05% by weight bromochlorophenol blue (0.005 g by Mettler TM balance) was added to a 25:75 weight ratio ortho-chloronitrobenzene: ortho-bromonitrobenzene of 9.995 g, at a temperature from about 40° C. to about 60° C. The liquid solution at 40° C. was yellow, and was allowed to cool slowly to its solidification point at about 38.04° C. Upon solidification, the material remained yellow in its solid state. Upon reheating, there was no change in color visible to the naked eye. This example demonstrates that a Group I compound taken alone without a Group II or III compound will not bring forth the desired color change results at the change in phases from a liquid state to a solid state.

EXAMPLE 6

A solution of about 0.05 mass % of chlorophenol red in dibenzofurane was prepared by adding the chlorophenol red to liquid dibenzafurane at 95° C. After dissolution of the chlorophenol red a yellow liquid was obtained. After this liquid had been cooled to about 87° C., it began to solidify and when the solidification was complete a red colored solid was obtained. Upon heating the red solid, it changed back into a yellow liquid. This example demonstrates the use of a Group I and Group III member dissolved in a heterocyclic solvent to obtain a color change while passing from the liquid state to the solid state, or conversely.

EXAMPLE 7

In the same manner as Example I, a solution of 0.037 mass % naphthalenesulphonic acid and 0.013 mass % of ethyl violet was prepared in a mixture of ortho-bromo-nitrobenzene and ortho-chloronitrobenzene (mass ratio 3:1). Whereas the liquid solution was green, the solid solution obtained by artificial nucleation at 38° C. was yellow. Upon heating the composition to its melting point a green liquid was obtained. This example demonstrates that the combination of an acid with pK of less than about 2 and an amino-triphenylmethane dye will change color while passing from the liquid state to the solid state, or conversely.

EXAMPLE 8

This example demonstrates the use of a combination of a dye having a molecular structure containing a lactone group and an acid having a pK of about 8 to about 12. In the same way as described in Example 1, a composition of matter was prepared by dissolving 0.05 mass % phenol in a mixture of ortho-bromonitrobenzene and ortho-chloronitrobenzene (mass ratio 3:1). The liquid solution was yellow, and turned blue when it had completely solidified at 37.5° C. by artificial nucleation. Upon heating the composition it became yellow again.

EXAMPLE 9

This example deals with a dye falling beyond the scope of this invention. In the same way as described in Example I, a solution was prepared of Fast Blue Salt B in a mixture of ortho- bromonitrobenzene and ortho-chloronitrobenzene (mass ratio 3:1). The color of the liquid was yellow and did not change after complete crystallization of the solvent.

EXAMPLE 10

This example gives dyes tested for their suitability as a Group III member in various solvents at different concentrations. The results are given in Table 2.

Unless otherwise indicated, each of the cases 1–117 in the following Table 2 employs a solvent system of 75 weight percent ortho-chloronitro-benzene: 25 weight percent ortho-bromonitrobenzene, with about 0.05 weight percent of indicated Group I, Group II, Group III or other organic compounds. The solution of each case was prepared in a similar manner as Example 1.

TABLE 2

| No. | Class | Dye | Solvent | Concentration % (m/m) | Color Liquid | Color Solid |
|---|---|---|---|---|---|---|
| 1 | nitroso dyes | Irgalith green BLN (Ciba-Geigy) | OBNB/OCNB 3:1 | 0.05 | *yellowish green | yellowish green |
| 2 | nitroso dyes | Naphtol green B C.I. Acid green 1 C.I. No. 10020 (Baker) | OBNB/OCNB 3:1 | 0.2 0.05 0.005 | *green light green yellow | green light green yellow |
| 3 | nitroso dyes | 1-nitroso-2-naphtol C.I. Mordant green 4 C.I. No. 10005 (Fluka) | OBNB/OCNB 3:1 | 0.2 0.05 0.05 | brown yellowish brown yellow | brown yellowish brown yellow |
| 4 | nitro dyes | Naphtol Yellow S C.I. Acid yellow 1 C.I. No. 10316 (Eastman Kodak) | OBNB/OCNB 3:1 | 0.05 | *yellow | yellow |
| 5 | nitro dyes | Artisil Yellow F-L (Sandoz) C.I. Disperse yellow 42 C.I. No. 10388 | OBNB/OCNB 3:1 | 0.05 | *yellow | yellow |
| 6 | nitro dyes | Aurantia C.I. No. 10360 Fluka | OBNB/OCNB 3:1 | 0.2 | *red | dark orange |
| 7 | azo dyes | Savinyl red BLSN (Sandoz) C.I. Solvent red 90 | OBNB/OCNB 3:1 | 0.05 | red | red |
| 8 | azo dyes | Savinyl Fire Red 3 GLS (Sandoz) C.I. Solvent red 124 | OBNB/OCNB 3:1 | 0.05 | red | red |
| 9 | azo dyes | Orasol Orange RLN (Ciba-Geigy) | OBNB/OCNB 3:1 lauryl alcohol | 0.05 | red | orange-red |
| 10 | monoazo | 4-(p-ethoxyphenyl-azo)-m-phenylene diamine mono-hydrochloride (Eastman Kodak) | OBNB/OCNB 3:1 lauryl alcohol | 0.2 0.05 0.005 0.2 | brownish red reddish orange yellow *orange | dark yellow dark yellow yellow orange |
| 11 | monoazo | Orasol navy blue (Ciba-Geigy) C.I. Solvent blue 53 | OBNB/OCNB 3:1 formamide lauryl alcohol | 0.2 0.05 0.005 0.2 0.05 0.005 0.2 0.05 0.005 | dark blue dark blue bluish green dark blue dark blue blue dark blue dark blue blue | bluish black greenish blue green dark blue dark blue blue dark blue blue light blue |
| 12 | monoazo | Organol Orange (Ugine Kuhlmann) C.I. Solvent orange 2 C.I. No. 12100 | OBNB/OCNB 3:1 formamide lauryl alcohol | 0.2 0.05 0.005 0.2 0.2 0.05 0.005 | reddish orange orange orange *dark orange dark orange orange orange | reddish orange orange orange orange dark orange orange light orange |
| 13 | monoazo | Janus Green C.I. No. 11050 (B.D.H.) | OBNB/OCNB 3:1 formamide lauryl alcohol | 0.2 0.05 0.005 0.2 0.05 0.005 0.2 0.05 0.005 | dark blue dark blue green dark blue dark blue blue dark blue blue light blue | dark blue green green dark blue dark blue blue blue light blue nearly colorless |
| 14 | monoazo | Irgalith Red PR (Ciba-Geigy) C.I. Pigment red 3 C.I. No. 12120 | OBNB/OCNB 3:1 formamide | 0.2 0.05 0.005 0.2 | orange-red dark orange orange *red | red pink orange-yellow red |
| 15 | monoazo | Azophloxin C.I. Acid red 1 Food red 10 C.I. No. 18050 (Fluka) | OBNB/OCNB 3:1 | 0.2 0.05 0.005 | dark red reddish brown yellow | dark red reddish brown yellow |
| 16 | monoazo | Dimethyl Yellow C.I. Solvent yellow 2 C.I. No. 11020 (A.C.F) | OBNB/OCNB 3:1 lauryl alcohol | 0.2 0.05 0.005 0.2 0.05 0.005 | reddish orange orange orange yellowish orange dark yellow yellow | orange orange dark yellow dark yellow yellow light yellow |

TABLE 2-continued

| No. | Class | Dye | Solvent | Concentration % (m/m) | Color Liquid | Color Solid |
|---|---|---|---|---|---|---|
| 17 | monoazo | Fast Yellow C.I. Acid yellow 9 Food yellow 2 C.I. No. 13015 (Merck) | naphthalene OBNB/OCNB 3:1 | 0.05 0.2 0.05 0.005 | orange orange dark yellow yellow | dark yellow dark yellow yellow yellow |
| | | | lauryl alcohol | 0.2 | *orange | yellow |
| 18 | monoazo | Methyl Red, sodium salt C.I. Acid red 2 C.I. No. 13020 (Merck) | OBNB/OCNB 3:1 | 0.2 0.05 0.005 | red red dark orange | red orange-brown orange |
| | | | lauryl alcohol | 0.2 0.05 0.005 | reddish orange reddish orange orange | orange-yellow light brown light orange |
| | | | naphthalene | 0.05 | orange | orange |
| 19 | monoazo | Alizarin Yellow R C.I. Mordant orange 1 C.I. No. 14030 (Merck) | OBNB/OCNB 3:1 | 0.2 | *greenish brown | brownish yellow |
| 20 | monoazo | Eriochrome Black T C.I. Mordant black 11 C.I. No. 14645 (Baker) | OBNB/OCNB 3:1 | 0.2 | *dark brown | brown |
| 21 | monoazo | Chromotope 2R C.I. Acid red 29 Mordant blue 80 C.I. No. 16570 (H. & W.) | OBNB/OCNB 3:1 | 0.2 | *green | light green |
| 22 | monoazo | Ponceau 6R C.I. Food red 8 C.I. No. 16920 (Merck) | OBNB/OCNB 3:1 | 0.2 | *dark brown | yellowish brown |
| 23 | monoazo | Titan yellow C.I. Direct yellow 9 C.I. No. 19540 (B.D.H.) | OBNB/OCNB 3:1 | 0.2 0.05 0.005 | yellow yellow yellow | yellow yellow yellow |
| 24 | monoazo | Yellow orange S C.I. Food yellow 3 C.I. No. 15985 (Merck) | OBNB/OCNB 3:1 | 0.2 0.05 0.005 | red orange yellow | orange dark yellow yellow |
| 25 | monoazo | Brilliant Ponceau 5R C.I. Acid red 18 Food red 7 C.I. No. 16225 (Holliday) | OBNB/OCNB 3:1 | 0.2 0.05 0.005 | *brownish red brownish yellow yellow | light brown brownish yellow yellow |
| 26 | monoazo | Chrysoidin G C.I. Basic orange 2 C.I. No. 11270 (Fluka) | OBNB/OCNB 3:1 | 0.2 0.05 0.005 | red reddish orange dark yellow | ochre dark yellow light yellow |
| | | | lauryl alcohol | 0.2 0.05 0.005 | red orange-red dark yellow | red reddish orange yellow |
| | | | naphthalene | 0.05 | orange | orange |
| 27 | monoazo | Chrysoidin R C.I. Basic orange 1 C.I. No. 11320 (Fluka) | OBNB/OCNB 3:1 | 0.2 | *dark orange-red | dark orange-red |
| 28 | monoazo | Eriochrome Black A C.I. Mordant black 1 C.I. No. 15710 (M.C.& B.) | OBNB/OCNB 3:1 | 0.2 0.05 0.005 | black moss green light green | dark green moss green light green |
| 29 | monoazo | Benzyl orange (Merck) | OBNB/OCNB 3:1 | 0.05 | deep yellow | yellow |
| | | | lauryl alcohol | 0.05 | orange | yellow |
| | | | naphthalene | 0.05 | light orange | colorless |
| 30 | monoazo | Ponceau G,R,2R C.I. Acid red 26 Food red 5 C.I. No. 16150 (M.C.& B.) | OBNB/OCNB 3:1 | 0.2 | *brownish red | brownish yellow |
| 31 | monoazo | Chromolan Yellow C.I. Acid yellow 54 C.I. No. 19101 (M.C.& B.) | OBNB/OCNB 3:1 | 0.2 0.05 0.005 | *light brown yellow yellow | yellow yellow yellow |
| 32 | disazo | Fat Red BS (Sandoz) C.I. Solvent red 24 C.I. No. 26105 | OBNB/OCNB 3:1 | 0.22 0.05 0.005 | dark red dark red light red | dark red brownish red light red |
| | | | lauryl alcohol | 0.05 | dark red | red |

TABLE 2-continued

| No. | Class | Dye | Solvent | Concentration % (m/m) | Color Liquid | Color Solid |
|---|---|---|---|---|---|---|
| 33 | disazo | Sudan Red B C.I. Solvent red 25 C.I. No. 26110 (Fluka) | OBNB/OCNB 3:1 | 0.2 0.05 0.005 | dark red dark red red | dark red dark red orange |
| | | | lauryl alcohol | 0.2 0.05 0.005 | *dark red red light red | dark red red light red |
| | | | naphthalene | 0.05 | vermilion | dark red |
| 34 | disazo | Bismark Brown G C.I. Basic brown 1 C.I. No. 21000 (Fluka) | OBNB/OCNB 3:1 | 0.2 0.05 0.005 | very dark green brownish green light green | dark green dark green light green |
| | | | lauryl alcohol | 0.2 | *dark green | dark green |
| | | | naphthalene | 0.05 | yellow | light brown |
| 35 | disazo | Fat Black C.I. Solvent black 3 C.I. No. 26150 (Fluka) | OBNB/OCNB 3:1 | 0.2 0.05 0.005 0.0005 | black black very dark green green | black black dark green light green |
| | | | lauryl alcohol | 0.2 0.05 0.005 0.0005 | black black dark blue blue | black dark blue blue light blue |
| 36 | disazo | Resorcin Brown C.I. Acid Orange 24 C.I. No. 20170 (M.C.& B.) | OBNB/OCNB 3:1 | 0.2 0.05 0.005 | *brownish red brownish yellow yellow | reddish brown brownish yellow yellow |
| 37 | disazo | Benzo Fast Pink 2BL C.I. Direct red 75 C.I. No. 25380 (M.C.& B.) | OBNB/OCNB 3:1 | 0.2 | *green | light green |
| 38 | disazo | Oil Red EGN C.I. Solvent red 26 C.I. No. 16120 (M.C.& B.) | OBNB/OCNB 3:1 | 0.2 0.05 0.005 | vermillion vermillion red | dark red dark red red |
| 39 | disazo | Trypan Blue C.I. Direct blue 14 C.I. No. 23850 (Merck) | OBNB/OCNB 3:1 | 0.2 0.05 0.005 | light green light green light green | light green light green light green |
| 40 | disazo | Brilliant Yellow C.I. Direct yellow 4 C.I. No. 24890 | OBNB/OCNB 3:1 | 0.2 0.05 0.005 | orange dark yellow yellow | orange dark yellow yellow |
| 41 | trisazo | Chlorazol Black E C.I. Direct black 38 C.I. No. 30235 (Eastman Kodak) | OBNB/OCNB 3:1 | 0.05 | *greenish yellow | greenish yellow |
| 42 | trisazo | Diamingreen B C.I. Direct green 6 C.I. No. 30295 (Merck) | OBNB/OCNB 3:1 | 0.2 0.05 0.005 | green light green yellowish green | light green light green yellowish green |
| | | | lauryl alcohol | 0.2 | *green | light green |
| 43 | trisazo | Direct Green G C.I. Direct green 8 C.I. No. 30315 (M.C.& B.) | OBNB/OCNB | 0.2 0.05 0.005 | *green light green yellow | light green light green yellow |
| 44 | azoic | Fast Red Salt 3 GL C.I. No. 37040 | OBNB/OCNB 3:1 | 0.2 0.05 0.005 | yellowish orange very dark yellow yellow | dark yellow dark yellow yellow |
| 45 | azoic | Fast Blue Salt BB C.I. No. 37175 (Fluka) | OBNB/OCNB 3:1 | 0.2 0.05 0.005 | brownish yellow brownish yellow yellow | greenish yellow greenish yellow yellow |
| 46 | azoic | Fast Garnet Salt GBC C.I. No. 37210 (Fluka) | OBNB/OCNB 3:1 | 0.2 0.05 0.005 | dark brown brownish red yellow | dark brown brownish yellow yellow |
| 47 | azoic | Fast Blue Salt B C.I. No. 37235 (Fluka) | OBNB/OCNB 3:1 | 0.2 0.05 0.005 | yellow yellow yellow | yellow yellow yellow |
| 48 | stilbene | Carta Yellow G 180% (Sandoz) C.I. Direct yellow 11 C.I. No. 40000 | OBNB/OCNB 3:1 | 0.2 0.05 0.005 | *brownish yellow yellow yellow | yellow yellow yellow |
| 49 | Diphenyl-methane | Auramin C.I. Basic yellow 2 C.I. No. 41000 (Merck) | OBNB/OCNB 3:1 | 0.2 0.05 0.005 | yellow yellow yellow | yellow yellow yellow |
| 50 | triaryl-methane | Malachite Green C.I. Basic green 4 C.I. No. 42000 (Y. W. Towers & Co.) | OBNB/OCNB 3:1 | 0.2 0.05 0.005 | green green green | green green green |

TABLE 2-continued

| No. | Class | Dye | Solvent | Concentration % (m/m) | Color Liquid | Color Solid |
|---|---|---|---|---|---|---|
| | | | formamide | 0.2 | dark green | dark green |
| | | | | 0.05 | green | green |
| | | | | 0.005 | light green | light green |
| 51 | triaryl-methane | Brilliant Green C.I. Basic green 1 C.I. No. 42040 (Fluka) | OBNB/OCNB 3:1 | 0.2 0.05 0.005 | green green green | green green green |
| | | | formamide | 0.2 0.05 0.005 | dark green green light green | dark green green light green |
| 52 | triaryl-methane | Methyl Violet C.I. Basic violet 1 C.I. No. 42535 (A.C.F.) | OBNB/OCNB 3:1 | 0.2 0.05 0.005 | violet bluish violet bluish violet | violet bluish violet bluish violet |
| | | | formamide | 0.2 0.05 0.005 | violet violet violet | violet violet violet |
| 53 | triaryl methane | Xylene Cyanol FF C.I. No. 43535 (Baker) | OBNB/OCNB 3:1 | 0.2 0.05 0.005 | blue blue green | blue light blue light green |
| | | | formamide | 0.2 0.05 0.005 | blue blue blue | dark blue blue blue |
| 54 | triaryl-methane | Erioglaucine C.I. Acid blue 9 Food blue 2 C.I. No. 42090 (B.D.H.) | OBNB/OCNB 3:1 | 0.2 0.05 0.005 | blue blue green | greenish blue green light green |
| | | | lauryl alcohol | 0.2 0.05 0.005 | blue light blue light blue | light blue light blue light blue |
| | | | naphthalene | 0.05 | greenish blue | greenish blue |
| 55 | triaryl-methane | Fuchsin BN C.I. Basic violet 2 C.I. No. 42520 (Merck) | OBNB/OCNB 3:1 | 0.2 0.05 0.005 | dark red dark red pinkish violet | dark red reddish brown greenish yellow |
| | | | lauryl alcohol | 0.2 0.05 0.005 | dark purple pinkish purple pink | dark purple purple pink |
| | | | naphthalene | 0.05 | *purple | lt. purple violet |
| 56 | triaryl-methane | Fuchsin C.I. Basic violet 14 C.I. No. 42510 (Merck) | OBNB/OCNB 3:1 | 0.2 0.05 0.005 | dark reddish violet dark red pinkish violet | dark violet brownish red greenish beige |
| | | | lauryl alcohol | 0.2 0.05 0.005 | dark purple purple pink | dark purple purple pink |
| | | | naphthalene | 0.05 | *red | light brown |
| 57 | triaryl-methane | Parafuchsin C.I. Basic red 9 C.I. No. 42500 (Fluka) | OBNB/OCNB 3:1 | 0.2 0.05 0.005 | dark red red light red | dark brown light brown orange-yellow |
| | | | lauryl alcohol | 0.2 0.05 0.005 | red purple-red lilac | red lilac purple lilac |
| | | | naphthalene | 0.05 | *dark purple | light purple |
| 58 | triaryl-methane | Aurintricarboxylic acid, ammonium salt C.I. Mordant violet 39 C.I. No. 43810 (Merck) | OBNB/OCNB 3:1 | 0.2 | *reddish orange | orange brown |
| 59 | triaryl-methane | Patent Blue C.I. Acid blue 1 Food blue 3 C.I. No. 42045 (M.C.& B.) | OBNB/OCNB 3:1 | 0.2 0.05 0.005 | very dark blue dark blue green | dark blue bluish green light green |
| 60 | triaryl- | Ethyl Violet C.I. Basic violet 4 C.I. No. 42600 (M.C.& B.) | OBNB/OCNB 3:1 | 0.2 0.05 0.005 | dark blue blue blue | dark blue blue blue |
| 61 | triaryl-methane | Victoria Blue R C.I. Basic blue 11 C.I. No. 44040 (M.C.& B.) | OBNB/OCNB 3:1 | 0.2 0.05 0.005 | dark blue dark blue dark blue | dk. greenish blue dk. bluish green bluish green |
| 62 | triaryl-methane | Irgalith Violet MNC (Ciba-Geigy) C.I. Pigment violet 3 C.I. No. 42535:2 | OBNB/OCNB 3:1 | 0.2 0.05 0.005 | bluish violet blue blue | bluish violet blue blue |
| | | | formamide | 0.2 0.05 0.005 | bluish violet bluish violet bluish violet | violet bluish violet bluish violet |

TABLE 2-continued

| No. | Class | Dye | Solvent | Concentration % (m/m) | Color Liquid | Color Solid |
|---|---|---|---|---|---|---|
| 63 | triaryl-methane | Crystal Violet C.I. Basic violet 3 C.I. No. 42555 (A.C.F.) | OBNB/OCNB 3:1 | 0.2 0.05 0.005 | bluish violet blue blue | violet bluish violet bluish violet |
| | | | formamide | 0.2 0.05 0.005 | violet violet violet | violet bluish violet bluish violet |
| 64 | triaryl-methane | Irgalith Blue TNC (Ciba-Geigy) C.I. Pigment blue 1 C.I. No. 42595:2 | OBNB/OCNB 3:1 | 0.2 0.05 0.005 | blue blue blue | blue blue bluish green |
| | | | formamide | 0.2 0.05 0.005 | blue blue blue | blue blue blue |
| 65 | Xanthene | Phloxin B C.I. Acid Red 92 C.I. No. 45410 | OBNB/OCNB 3:1 | 0.2 0.05 0.005 | orange yellowish orange yellow | pinkish orange yellowish orange yellow |
| | | | formamide | 0.2 0.05 0.005 | orange-red reddish orange pink | orange-red orange-brown-red pink |
| | | | lauryl alcohol | 0.05 | pink | light pink |
| 66 | Xanthene | Fluorescein, sodium salt C.I. Acid yellow 73 C.I. No. 45350 (Merck) | OBNB/OCNB 3:1 | insoluble | | |
| | | | formamide | 0.2 0.05 0.005 | yellow yellow yellow | orange-yellow yellow yellow |
| | | | lauryl alcohol | 0.05 | *yellow | yellow |
| 67 | Xanthene | Rose Bengale C.I. Acid red 94 C.I. No. 45440 (I.G. Farben) | OBNB/OCNB 3:1 | insoluble | | |
| | | | formamide | 0.2 0.05 0.005 | dark red violet-red pinkish violet | dark red violet-red pinkish violet |
| 68 | Xanthene | Rhodamine B C.I. Basic violet 10 C.I. No. 45170 (Merck) | OBNB/OCNB 3:1 | 0.2 0.05 0.005 | red pinkish red pinkish red | violet violet violet-pink-red |
| | | | formamide | 0.2 0.05 0.005 | red orange-red pinkish orange | reddish violet pinkish red pink |
| | | | lauryl alcohol | 0.05 | violet-red | pinkish violet |
| | | | naphthalene | 0.05 | dark-purple-red (fluorescent) | lilac |
| 69 | Xanthene | Rhodamine B Base C.I. Solvent red 49 C.I. No. 45170:1 (Baker) | OBNB/OCNB 3:1 | 0.2 0.05 0.005 | red red light red | red deep pink pink |
| 70 | Xanthene | Rhodamine 6 G C.I. Basic Red 1 C.I. No. 45160 (Merck) | OBNB/OCNB 3:1 | 0.2 0.05 0.005 | red red orange | violet-red reddish violet pinkish red |
| | | | formamide | 0.2 0.05 0.005 | orange-red orange orange-pink | purple-red orange-pink orange-pink |
| | | | lauryl alcohol | 0.05 | pinkish orange | pink |
| 71 | Xathene | Pyronin G C.I. NO. 45005 (Fluka) | OBNB/OCNB | 0.2 0.05 0.005 | reddish brown red pink | violet-brown brown pinkish red |
| | | | formamide | 0.2 0.05 0.005 | red greenish red pink | reddish violet brownish red pink |
| | | | lauryl alcohol | 0.05 | pink | pinkish violet |
| 72 | Xanthene | Irgalith Magenta TCB (Ciba-Geigy) C.I. Pigment violet 2 C.I. No. 45175 | OBNB/OCNB 3:1 | 0.2 0.05 0.005 | red red red | violet-red violet-red pink |
| | | | formamide | 0.2 0.05 0.005 | reddish orange orange orange-pink | violet-red orange-pink pink |
| | | | lauryl alcohol | 0.05 | *orange-pink | light pink |
| 73 | Xanthene | Irgalith Pink TYNC (Ciba-Geigy) C.I. Pigment red 81:1 C.I. No. 45160:2 | OBNC/OCNB 3:1 | 0.2 0.05 0.005 | red orange-red orange | violet-red red red |
| | | | formamide | 0.2 | orange | brownish red |

TABLE 2-continued

| No. | Class | Dye | Solvent | Concentration % (m/m) | Color Liquid | Color Solid |
|---|---|---|---|---|---|---|
| | | | | 0.05 | yellowish orange | pinkish red |
| | | | | 0.005 | pink | pink |
| 74 | Xanthene | Eosin Scarlet C.I. Acid red 91 C.I. No. 45400 (Fluka) | lauryl alcohol | 0.05 | *orange-pink | light pink |
| | | | OBNB/OCNB 3:1 | 0.05 | *yellow | yellow |
| | | | formamide | 0.05 | *pinkish orange | orange |
| 75 | Xanthene | Eosin Yellowish C.I. Acid red 87 C.I. No. 45380 (Fluka) | lauryl alcohol | 0.05 | *orange | orange-pink |
| | | | OBNB/OCNB 3:1 | 0.05 | *yellow | yellow |
| | | | formamide | 0.05 | orange | orange |
| 76 | Xanthene | Erythrosin, Extra Bluish (Fluka) C.I. Acid red 51 C.I. No. 45430 | lauryl alcohol | 0.05 | orange | pinkish orange |
| | | | OBNB/OCNB 3:1 | 0.05 | *yellow | yellow |
| | | | formamide | 0.05 | orange-pink | pinkish orange |
| 77 | Xanthene | 4',5'-Dibromo-fluorescein C.I. Acid orange 11 C.I. No. 45370 (Eastman Kodak) | lauryl alcohol | 0.05 | pinkish orange | pinkish red |
| | | | OBNB/OCNB 3:1 | 0.05 | yellow | orange |
| | | | formamide | 0.05 | orange-yellow | orange-yellow |
| 78 | Xanthene | Ethyl Eosin C.I. Solvent red 45 C.I. No. 45386 (Eastman Kodak) | lauryl alcohol | 0.05 | orange-yellow | orange-yellow |
| | | | OBNB/OCNB 3:1 | 0.05 | *reddish orange | orange |
| | | | formamide | 0.05 | pinkish orange | orange-pink |
| 79 | Xanthene | Gallein C.I. Mordant violet 25 C.I. No. 45445 (Eastman Kodak) | lauryl alcohol | 0.05 | *orange-pink | pink |
| | | | OBNB/OCNB 3:1 | 0.05 | *yellowish brown | brown |
| | | | formamide | 0.05 | brownish orange | light brown |
| 80 | Xanthene | Phloxine C.I. Acid red 98 C.I. No. 45405 (Merck) | lauryl alcohol | 0.05 | brownish orange | violet |
| | | | OBNB/OCNB 3:1 | 0.2 | red | brownish red |
| | | | | 0.05 | deep brownish yellow | brownish yellow |
| | | | | 0.005 | yellow | yellow |
| 81 | Xanthene | Erythrosin yellowish blend C.I. Acid red 95 C.I. No. 45425 (M.C.& B.) | OBNB/OCNB 3:1 | 0.2 | *red | brownish red |
| | | | | 0.05 | brownish yellow | lt. brownish red |
| | | | | 0.005 | yellow | yellow |
| 82 | Xanthene | Cyanosin B C.I. No. 45420 (ICN-K&K) | OBNB/OCNB 3:1 | 0.2 | orange | orange |
| | | | | 0.05 | orange | orange |
| | | | | 0.005 | light orange | yellowish |
| 83 | sulphone-phthalein | Cresol red (Merck) | OCNB | 0.05 | yellow | red |
| | | | dioxane | 0.05 | yellow | reddish orange |
| | | | water | 0.05 | yellow | red (deep cooling) |
| | | | naphthalene | 0.05 | light yellow | red |
| 84 | sulphone phthalein | chlorophenol red (Merck) | OBNB/OCNB 3:1 | 0.05 | yellow | red |
| | | | OCNB | 0.05 | yellow | red |
| | | | dioxane | 0.05 | yellow | reddish orange |
| | | | paraffin | 0.05 | nearly colorless | pink |
| | | | para-dichlorobenzene | 0.05 | pink | red |
| | | | water | 0.05 | yellow | red (deep cooling) |
| | | | naphthalene | 0.05 | nearly colorless | red |
| | | | o-iodonitrobenzene | 0.05 | brown | orange |
| | | | m-iodonitrobenzene | 0.05 | yellow | red |
| | | | p-iodonitrobenzene | 0.05 | brown | red |
| | | | p-chloronitro-benzene | 0.05 | yellow | red |
| | | | m-bromonitrobenzene | 0.05 | yellow | red |
| | | | p-bromonitrobenzene | 0.05 | orange | red |
| | | | p-dibromobenzene | 0.05 | pink | red |
| | | | p toluic acid | 0.05 | yellow | red |
| | | | 2 naphtol | 0.05 | brown | red |

TABLE 2-continued

| No. | Class | Dye | Solvent | Concentration % (m/m) | Color Liquid | Color Solid |
|---|---|---|---|---|---|---|
|  |  |  | indole | 0.05 | orange | reddish brown |
|  |  |  | dibenzofurane | 0.05 | yellow | red |
| 85 | sulphone-phthalein | chlorophenol blue (Info-Chem) | OBNB/OCNB 3:1 | 0.05 | yellow | yellowish-orange |
| 86 | sulphone-phthalein | bromophenol blue (Baker) | OBNB/OCNB 3:1 | 0.05 | yellow | yellowish-orange |
| 87 | sulphone-phthalein | bromocresol purple (Baker) | OBNB/OCNB 3:1 | 0.05 | yellow | orange-yellow |
| 88 | sulphone-phthalein | chlorocresol green (Info-Chem) | OBNB/OCNB 3:1 | 0.05 | yellow | yellowish-orange |
| 89 | acridine | Acridine yellow C.I. No. 46025 (Eastman Kodak) | OBNB/OCNB 3:1 | 0.05 | *yellow | yellow |
| 90 | acridine | Coriphosphine O C.I. Basic yellow 7 C.I. No. 46020 (ICN-K&K) | OBNB/OCNB 3:1 | 0.2 0.05 0.005 | deep violet deep violet brown | brown greenish brown greenish beige |
| 91 | acridine | Acriflavine C.I. No. 46000 (ICN-K&K) | OBNB/OCNB 3:1 | 0.2 0.05 0.005 | orange yellowish orange yellow | dark yellow yellow light yellow |
| 92 | acridine | Acridine Orange C.I. Basic orange 14 C.I. No. 46005 (Merck) | OBNB/OCNB 3:1 OCNB | 0.05 0.05 0.01 | brownish orange red orange | brownish orange orange yellow |
|  |  |  | lauryl alcohol | 0.05 | yellowish orange | orange |
| 93 | quinoline | Terasil Yellow 2GW C.I. Disperse yellow 54 C.I. No. 47020 (Ciba-Geigy) | OBNB/OCNB 3:1 | 0.05 | *yellow | yellow |
| 94 | quinoline | Quinoline Yellow C.I. Solvent yellow 33 C.I. No. 47000 (M.C.& B.) | OBNB/OCNB 3:1 | 0.2 0.05 0.005 | dark yellow yellow yellow | dark yellow yellow yellow |
| 95 | quinoline | Pinacyanol chloride (Info-Chem) | OCNB OBNB/OCNB 3:1 | 0.05 0.005 0.05 | blue blue blue | violet green violet-blue |
| 96 | quinoline | Pinacyanol bromide (Fluka) | OBNB/OCNB 3:1 | 0.05 | blue | violet |
| 97 | quinoline | Pinacyanol iodide (Info-Chem) | OBNB/OCNB 3:1 naphthalene n-tetracosane dibenzofurane l-tetradecanol stearic acid iodole | 0.05 0.05 0.025 0.05 0.05 0.025 0.025 0.025 | blue blue light blue blue blue blue blue dark blue | lt. greenish pink light blue light violet lt. bluish green light violet light grey light greyish violet blue |
| 98 | quinoline | Quinaldine Red (Merck) | OBNB/OCNB 3:1 naphthalene | 0.05 0.05 | purple red deep purple-red | light purple-tan beige |
| 99 | quinoline | Cryptocyanine | OBNB/OCNB 3:1 p-dichlorobenzene naphthalene OCNB | 0.05 0.05 0.05 0.05 | green light blue green dark green | bluish green nearly colorless dark blue bluish green |
| 100 | quinoline | 1,1'-Diethyl-2,2'-cyanine iodide (Eastman Kodak) | OBNB/OCNB 3:1 naphthalene OCNB | 0.05 0.05 0.05 | red deep red deep reddish | brownish yellow reddish pink red |
| 101 | quinoline | 2-(p-dimethylaminostyryl-1-ethyl-pyridinium iodide (Eastman Kodak) | OBNB/OCNB 3:1 naphthalene OCNB | 0.05 0.05 0.05 | red red red | orange orange orange |
| 102 | quinoline | 3,3'-Diethylthia-dicarbocyanine iodide (Eastman Kodak) | OBNB/OCNB 3:1 | 0.05 | bluish green | blue |
| 103 | quinoline | Ethyl Red (Eastman Kodak) | OBNB/OCNB 3:1 p-dichlorobenzene | 0.05 0.05 | red violet | red[*2] light violet |
| 104 | quinoline | Dicyanine A (Eastman Kodak) | OBNB/OCNB 3:1 | 0.05 | green | blue green |
| 105 | quinoline | Merocyanine 540 (Eastman Kodak) | OBNB/OCNB 3:1 | 0.05 | purple | rose |
| 106 | quinoline | Neocyanine (Eastman Kodak) | OBNB/OCNB 3:1 | 0.05 | green | yellow green |

TABLE 2-continued

| No. | Class | Dye | Solvent | Concentration % (m/m) | Color Liquid | Color Solid |
|---|---|---|---|---|---|---|
| 107 | thiazole | Thioflavine TCN C.I. Basic yellow 1 C.I. No. 49005 (Merck) | OBNB/OCNB 3:1 | 0.2 | *yellow | yellow |
| 108 | azine | Neutral Red (chloride) C.I. Basic red 5 C.I. No. 50040 (Baker) | OBNB/OCNB 3:1 | 0.2 | red | reddish brown |
|  |  |  |  | 0.05 | red | reddish orange |
|  |  |  |  | 0.005 | red | light orange |
|  |  |  | formamide | 0.2 | red | dark brown |
|  |  |  |  | 0.05 | orange-red | reddish brown |
|  |  |  |  | 0.005 | orange | yellow orange |
|  |  |  | lauryl alcohol | 0.2 | red | brown |
|  |  |  |  | 0.05 | red | reddish orange |
|  |  |  |  | 0.005 | reddish orange | pink |
|  |  |  | naphthalene | 0.05 | red | dark brown |
| 109 | azine | Neutral Red (iodide) (ICN-K&K) | OBNB/OCNB 3:1 | 0.05 | deep red | reddish brown |
|  |  |  |  | 0.005 | red | brownish orange |
| 110 | azine | Nigrosine C.I. Acid black 2 C.I. No. 50420 (Edward Gurr) | OBNB/OCNB 3:1 | 0.2 | dark grey-blue | dark grey-black |
|  |  |  |  | 0.05 | blue | grey blue |
|  |  |  |  | 0.005 | greenish | greenish |
|  |  |  | formamide | 0.2 | dark violet | dk. violet-black |
|  |  |  |  | 0.05 | dark violet | dark violet |
|  |  |  |  | 0.005 | violet | violet |
|  |  |  | lauryl alcohol | 0.2 | grey-blue-violet | dark violet |
|  |  |  |  | 0.05 | blue-violet | violet |
|  |  |  |  | 0.005 | violet | violet |
| 111 | azine | Savinyl Blue B (Sandoz) C.I. Acid blue 59 C.I. No. 50315 | OBNB/OCNB 3:1 | 0.2 | dark blue | dark blue |
|  |  |  |  | 0.05 | blue | light blue |
|  |  |  |  | 0.005 | greenish blue | green |
|  |  |  | formamide | 0.2 | dark blue | dark blue |
|  |  |  |  | 0.05 | dark blue | dark blue |
|  |  |  |  | 0.005 | blue | blue |
|  |  |  | lauryl alcohol | 0.2 | dark blue | blue |
|  |  |  |  | 0.05 | dark blue | blue |
|  |  |  |  | 0.005 | blue | light blue |
| 112 | azine | Orasol Blue BLN (Ciba-Geigy) C.I. Solvent blue 49 | OBNB/OCNB 3:1 | 0.2 | dark blue | dark blue |
|  |  |  |  | 0.05 | blue | blue |
|  |  |  |  | 0.005 | greenish blue | greenish blue |
|  |  |  | formamide | 0.2 | dark blue | dark blue |
|  |  |  |  | 0.05 | dark blue | dark blue |
|  |  |  |  | 0.005 | blue | blue |
|  |  |  | lauryl alcohol | 0.2 | dark blue | dark blue |
|  |  |  |  | 0.05 | blue | blue |
|  |  |  |  | 0.005 | light blue | blue |
| 113 | azine | Safranin O C.I. No. 50240 (Merck) | OBNB/OCNB 3:1 | 0.05 | *red | brownish red |
|  |  |  |  | 0.005 | *orange | light brown |
|  |  |  | formamide | 0.05 | red | red |
|  |  |  | lauryl alcohol | 0.05 | red | orange-brown |
|  |  |  |  | 0.005 | pinkish red | pink |
| 114 | azine | Azocarmin G C.I. Acid red 101 C.I. No. 50085 (Fluka) | OBNB/OCNB 3:1 | 0.05 | *yellow | brownish yellow |
|  |  |  | formamide | 0.05 | violet red | violet red |
|  |  |  | lauryl alcohol | 0.05 | *violet pink | violet pink |
| 115 | azine | Azocarmine BX (B) C.I. Acid red 103 C.I. No. 50090 (Merck) | OBNB/OCNB 3:1 | 0.2 | red | red |
|  |  |  |  | 0.05 | red | beige |
|  |  |  |  | 0.005 | yellow | yellow |
|  |  |  | lauryl alcohol | 0.2 | red | pink |
|  |  |  |  | 0.05 | purple | light purple |
|  |  |  |  | 0.005 | pink | pink |
|  |  |  | naphthalene | 0.05 | dark red | red |
| 116 | azine | Phenosafranine C.I. No. 50200 (Baker) | OBNB/OCNB 3:1 | 0.02 | dark red | dark red |
|  |  |  |  | 0.05 | red | beige |
|  |  |  |  | 0.005 | yellow | yellow |
|  |  |  | lauryl alcohol | 0.2 | dark red | purple red |
|  |  |  |  | 0.05 | dark pink | dark pink |
|  |  |  |  | 0.005 | pink | pink |
|  |  |  | naphthalene | 0.05 | pink | pink |
| 117 | azine | Rhoduline Violet C.I. No. 50215 (ICN-K&K) | OBNB/OCNB 3:1 | 0.2 | violet | dp reddish violet |
|  |  |  |  | 0.05 | violet | reddish violet |
|  |  |  |  | 0.005 | red | violet red |
| 118 | oxazine | Deorlene Blue 5G (Ciba) C.I. Basic blue 3 C.I. No. 51004 | OBNB/OCNB 3:1 | 0.05 | bluish green | bluish green |
| 119 | oxazine | Solophenyl Brilliant blue BL (Ciba-Geigy) | OBNB/OCNB 3:1 | 0.05 | *yellow | greenish |

TABLE 2-continued

| No. | Class | Dye | Solvent | Concentration % (m/m) | Color Liquid | Color Solid |
|---|---|---|---|---|---|---|
| | | C.I. Direct blue 106 C.I. No. 51300 | formamide | 0.05 | dark blue | dark blue |
| 120 | oxazine | Nile Blue A C.I. Basic blue 12 C.I. No. 51180 (Eastman Kodak) | OBNB/OCNB 3:1 | 0.05 | *greenish blue | grey-green-blue |
| 121 | oxazine | Gallocyanine C.I. Mordant blue 10 C.I. No. 51030 (ICN-K&K) | OBNB/OCNB 3:1 | 0.2 0.05 0.005 | dark blue bluish green green | dark green light green greenish yellow |
| 122 | oxazine | Gallamine Blue C.I. Mordant blue 45 C.I. No. 51045 (ICN-K&K) | OBNB/OCNB 3:1 | 0.2 | *greenish blue | light green |
| 123 | oxazine | Celestine Blue C.I. Mordant blue 14 C.I. No. 51050 (ICN-K&K) | OBNB/OCNB 3:1 | 0.2 0.05 0.005 | blue blue green | green light green greenish yellow |
| 124 | thiazine | Methylene Blue C.I. Basic blue 9 C.I. No. 52015 (Baker) | OBNB/OCNB 3:1 | 0.2 0.05 0.005 | dark blue dark blue green | dark violet blue greenish |
| | | | formamide | 0.2 0.05 0.005 | dark blue dark blue blue | dark blue dark blue blue |
| | | | lauryl alcohol | 0.2 0.05 0.005 | dark blue dark blue blue | violet violet blue |
| | | | OCNB | 0.05 0.01 | deep blue green/blue | violet violet |
| 125 | thiazine | Thionin (Lauth's violet) C.I. No. 52000 (Merck) | OBNB/OCNB 3:1 | 0.02 0.05 0.01 0.005 | *dark red dark red red red | greenish violet greenish pink beige |
| | | | formamide | 0.2 0.05 0.005 | violet-blue violet-blue violet | dark violet blue blue |
| | | | lauryl alcohol | 0.2 0.05 0.005 | dark violet violet pink-violet | violet violet violet |
| | | | OCNB | 0.05 0.01 | deep red wine red | violet pink |
| 126 | thiazine | Toluidine Blue 0 C.I. Basic blue 17 C.I. No. 52040 (Serva) | OBNB/OCNB 3:1 | 0.2 0.05 0.005 | dark blue dark blue greenish blue | bluish violet violet pink |
| | | | OCNB | 0.05 0.01 | deep blue blue/green | violet pink/violet |
| | | | t. butanol | 0.01 | blue | blue |
| | | | formamide | 0.2 0.05 0.005 | dark blue dark blue blue | blue violet dark blue blue |
| | | | lauryl alcohol | 0.2 0.05 0.005 | dark blue blue light blue | violet violet nearly colorless |
| | | | naphthalene | 0.05 | deep blue | blue |
| 127 | thiazine | Methylene Green C.I. Basic green 5 C.I. No. 52020 (Fluka) | OBNB/OCNB 3:1 | 0.05 | dk bluish green | dark green |
| | | | formamide | 0.05 | dk bluish green | dk bluish green |
| | | | lauryl alcohol | 0.05 | *blue | grey |
| 128 | thiazine | Azure, A,B,C C.I. No. 52010 (Eastman Kodak) | OBNB/OCNB 3:1 | 0.05 | *blue | violet |
| | | | formamide | 0.05 | dark blue | dark blue |
| | | | lauryl alcohol | 0.05 | *blue | violet |
| 129 | thiazine | Methylene Violet C.I. No. 52041 (Eastman Kodak) | OBNB/OCNB 3:1 | 0.05 | dark violet | dark violet |
| 130 | amino- ketone | Murexide C.I. No. 56085 (Merck) | OBNB/OCNB 3:1 | 0.2 0.05 0.005 | *brown brownish yellow yellow | yellow yellow yellow |
| 131 | anthra- quinone | Savinyl Green B (Sandoz) C.I. Solvent green 19 | OBNB/OCNB 3:1 | 0.2 0.05 0.005 | dark green dark green green | dark green green light green |
| | | | formamide | 0.2 0.05 | *dark green *dark green | dark green green |
| | | | lauryl | 0.2 | dk bluish green | green |

TABLE 2-continued

| No. | Class | Dye | Solvent | Concentration % (m/m) | Color Liquid | Color Solid |
|---|---|---|---|---|---|---|
| | | | alcohol | 0.05 | bluish green | green |
| | | | | 0.005 | green | light green |
| 132 | anthra- | Savinyl Blue RS (Sandoz) C.I. Solvent blue 45 | OBNB/OCNB 3:1 | 0.2 | dark blue | dark blue |
| | | | | 0.05 | dark blue | blue |
| | | | | 0.005 | blue | greenish blue |
| | | | formamide | 0.2 | *dark blue | dark blue |
| | | | | 0.05 | *blue | blue |
| | | | lauryl alcohol | 0.2 | dark blue | dark blue |
| | | | | 0.05 | violet-blue | blue |
| | | | | 0.005 | blue | light blue |
| 133 | anthra-quinone | D + C green 6 (American Cyanimid) C.I. Solvent green 3 C.I. No. 61565 | OBNB/OCNB 3:1 | 0.2 | dark green | dark green |
| | | | | 0.05 | dark green | green |
| | | | | 0.005 | green | green |
| | | | lauryl alcohol | 0.2 | dk greenish blue | blue |
| | | | | 0.05 | greenish blue | lt greenish blue |
| | | | | 0.005 | greenish blue | lt greenish blue |
| 134 | anthra-quinone | Blue VIF Organol (Ugine Kuhlmann) C.I. Solvent blue 63 C.I. No. 61520 | OBNB/OCNB 3:1 | 0.2 | dark blue | dark blue |
| | | | | 0.05 | dark blue | blue |
| | | | | 0.005 | bluish green | bluish green |
| | | | formamide | 0.2 | *dark blue | blue |
| | | | | 0.05 | *blue | blue |
| | | | lauryl alcohol | 0.2 | dark blue | dark blue |
| | | | | 0.05 | dark blue | blue |
| | | | | 0.005 | blue | light blue |
| 135 | anthra-quinone | Alizarin C.I. Mordant red 11 C.I. No. 58000 (Fluka) | OBNB/OCNB 3:1 | 0.2 | dark yellow | dark orange |
| | | | | 0.05 | dark yellow | dark yellow |
| | | | | 0.005 | yellow | yellow |
| | | | lauryl alcohol | 0.2 | *brownish orange | brownish orange |
| | | | naphthalene | 0.05 | yellow | light orange |
| 136 | anthra-quinone | Alizarin Cyanin 2R C.I. Mordant blue 50 C.I. No. 58550 (H & W) | OBNB/OCNB 3:1 | 0.2 | dark red | dark brown |
| | | | | 0.05 | dark red | brown |
| | | | | 0.005 | reddish pink | yellow |
| | | | lauryl alcohol | 0.2 | dark red | dark brown |
| | | | | 0.05 | dark red | brown |
| | | | | 0.005 | purple | pink |
| | | | naphthalene | 0.05 | dark red | dark red |
| 137 | anthra-quinone | Celliton Blue Extra C.I. solvent blue 18 Disperse blue 1 C.I. No. 64500 (BASF) | OBNB/OCNB 3:1 | 0.2 | dark blue | dark green |
| | | | | 0.05 | dark blue | green |
| | | | | 0.005 | light green | light green |
| | | | lauryl alcohol | 0.2 | dark blue | blue |
| | | | | 0.05 | vivid blue | light blue |
| | | | | 0.005 | light blue | light blue |
| | | | naphthalene | 0.05 | *dark blue | light blue |
| 138 | anthra-quinone | Alizarin Blue S C.I. Mordant blue 27 C.I. No. 67415 (H & W) | OBNB/OCNB 3:1 | 0.2 | deep dark red | black |
| | | | | 0.05 | dark red | greyish green |
| | | | | 0.005 | dark orange | light green |
| | | | lauryl alcohol | 0.2 | dk purple red | dark grey |
| | | | | 0.05 | red purple | light purple |
| | | | | 0.005 | light blue | colorless |
| | | | naphthalene | 0.05 | *dark red | grey |
| 139 | anthra-quinone | Nitrofast Green GSB C.I. Solvent green 3 C.I. No. 61565 (Sandoz) | OBNB/OCNB 3:1 | 0.2 | dark green | dark green |
| | | | | 0.05 | dark green | dark green |
| | | | | 0.005 | greenish blue | light green |
| | | | lauryl alcohol | 0.2 | deep dark blue | deep dark blue |
| | | | | 0.05 | dark blue | blue |
| | | | | 0.005 | blue | light blue |
| 140 | anthra-quinone | Alizarin Red S C.I. Mordant red 3 C.I. No. 58005 (Baker) | OBNB/OCNB 3:1 | 0.2 | dark orange | yellowish orange |
| | | | | 0.05 | dark yellow | dark yellow |
| | | | | 0.005 | yellow | yellow |
| | | | lauryl alcohol | 0.2 | dk orange-yellow | dark yellow |
| | | | | 0.05 | yellow | light yellow |
| | | | | 0.005 | light pink | colorless |
| 141 | anthra-quinone | quinalizarin C.I. Mordant violet 26 C.I. No. 58500 (Fluka) | OBNB/OCNB 3:1 | 0.2 | red | red |
| | | | | 0.05 | orange-red | reddish orange |
| | | | | 0.005 | reddish orange | dark yellow |
| | | | lauryl alcohol | 0.2 | *vermillion | red |
| | | | | 0.05 | reddish orange | reddish pink |
| | | | | 0.005 | pinkish orange | pink |
| 142 | anthra-quinone | Oil Blue N C.I. Solvent blue 14 | OBNB/OCNB 3:1 | 0.2 | deep blue | deep green |
| | | | | 0.05 | deep blue | moss green |

TABLE 2-continued

| No. | Class | Dye | Solvent | Concentration % (m/m) | Color Liquid | Color Solid |
|---|---|---|---|---|---|---|
| 143 | anthra-quinone | C.I. No. 61555 (ICN-K&K) Solvay Purple C.I. Acid violet 431 C.I. No. 60730 (ICN-K&K) | OBNB/OCNB 3:1 | 0.005 0.2 0.05 0.05 | greenish blue deep blue deep blue light green | bluish green deep blue bluish green light green |
| 144 | anthra-quinone | Purpurin C.I. No. 58205 (H & W) | OBNB/OCNB 3:1 | 0.2 0.05 | *orange orange | orange-red reddish orange |
| | | | formamide | 0.2 0.05 0.005 | *dark red dark red red | dark red dark red red |
| | | | lauryl alcohol | 0.2 0.05 0.005 | *orange orange light orange | orange light orange light orange |
| 145 | indigo | Indigo Synthetic C.I. Vat blue 1 (Fluka) | OBNB/OCNB 3:1 | 0.05 | *dark blue | grey blue |
| | | | lauryl alcohol | 0.05 | *blue | light blue |
| 146 | indigo | Cromophtal Bordeaux RS (Ciba-Geigy) C.I. Pigment red 88 C.I. No. 73312 | OBNB/OCNB 3:1 | 0.2 0.05 0.005 | brown beige yellow | reddish brown beige-yellow yellow |
| 147 | indigo | Thioindigo Red C.I. Vat red 41 C.I. No. 73300 (ICN-K&K) | OBNB/OCNB 3:1 | 0.2 0.05 0.005 | dk purple-red carmine yellowish orange | dark purple beige yellow |
| | | | lauryl alcohol | 0.2 0.05 0.005 | *dark red purple light violet | dark purple light purple light violet |
| 148 | indigo | Ciba Blue C.I. Vat blue 5 C.I. No. 73065 (ICN-K&L) | OBNB/OCNB 3:1 | 0.2 0.05 0.005 | deep blue bluish green green | green light green greenish yellow |
| 149 | indigo | Indigo Carmine C.I. Acid blue 74 C.I. No. 73015 (Baker) | OBNB/OCNB 3:1 | 0.05 | *yellowish green | yellowish green |
| 150 | phthalo-cyanine | Savinyl Blue GLS (Sandoz) C.I. Solvent blue 44 | OBNB/OCNB 3:1 | 0.05 | bluish green | greenish blue |
| 151 | phthalo- | Irgalith Blue GLSM (Ciba-Geigy) C.I. Pigment blue 15:3 C.I. No. 74160 | OBNB/OCNB 3:1 | 0.05 | greenish blue | blue |
| 152 | phthalo-cyanine | Phthalocyanine C.I. Pigment blue 15 C.I. No. 74160 (Eastman Kodak) | OBNB/OCNB 3:1 | 0.05 | dark green | dark grey green |
| 153 | natural | Alcannin C.I. Natural red 20 C.I. No. 75530 (H & W) | OBNB/OCNB 3:1 | 0.2 0.05 0.005 | red red red | dark red purple-red beige |
| | | | lauryl alcohol | 0.2 | brownish red | light pink |
| 154 | natural | Curcumin C.I. Natural yellow 3 C.I. No. 75300 (Merck) | OBNB/OCNB 3:1 | 0.2 0.05 0.005 | dark yellow yellow yellow | dark yellow yellow yellow |
| 155 | natural | Quercitrindihydrate C.I. Natural yellow 10 C.I. No. 75720 (Carl Roth) | OBNB/OCNB 3:1 | 0.2 0.05 0.005 | yellow yellow yellow | yellow yellow yellow |
| 156 | inorganic pigments | Prussian blue C.I. Pigment blue 27 C.I. No. 77510 (M.C. & B.) | OBNB/OCNB 3:1 | 0.2 0.05 0.005 | *green light green yellowish green | green light green yellowish green |
| 157 | monoazo | Ceres Orange R C.I. No. 12055 C.I. Solvent yellow 14 | OBNB/OCNB 3:1 | 0.2 0.05 0.005 | red orange orange orange | dark orange orange yellowish orange |
| 158 | monoazo | Ceres Yellow 3G C.I. Solvent yellow 16 C.I. No. 12700 | OBNB/OCNB 3:1 | 0.2 0.05 0.005 | orange yellowish orange yellow | yellowish orange yellow yellow |
| 159 | monoazo | 4-phenylazo-1-naphtyl-amine | OBNB/OCNB 3:1 | 0.2 0.05 0.005 | dk reddish brown reddish brown brownish orange | dark brown brown yellow |
| 160 | monoazo | 4-(4-Dimethylamino-1-naphtylazo)-3-methoxybenzene | OBNB/OCNB 3:1 | 0.2 0.05 0.005 | green green yellow | green light green yellow |

TABLE 2-continued

| No. | Class | Dye | Solvent | Concentration % (m/m) | Color Liquid | Color Solid |
|---|---|---|---|---|---|---|
| 161 | monoazo | sulfonic acid p-(p-Dimethylamino-phenylazo)benzoic acid sodium salt | OBNB/OCNB 3:1 | 0.2 0.05 0.005 | reddish orange orange light orange | orange light orange yellow |
| 162 | disazo | Ceres Red B C.I. No. 26110 C.I. Solvent red 25 | OBNB/OCNB 3:1 | 0.2 0.05 0.005 | dark red red red | dark red red pinkish red |
| 163 | indamine | Bindschedler's Green C.I. No. 49405 | OBNB/OCNB 3:1 | 0.2 0.05 0.005 | orange brown orange brown yellow | beige light beige yellow |
| 164 | | Phenylene Blue (ICN-K&K) Cat. No. 17371 | OBNB/OCNB 3:1 | 0.2 0.05 0.005 | dark blue dark blue greenish blue | bluish green light green yellowish green |
| 165 | azine | Amethyst Violet C.I. No. 50225 | OBNB/OCNB 3:1 | 0.2 0.05 0.005 | purple purple red purple red | violet violet pink |
| 166 | anthraquinone | Alizarin Viridin C.I. Acid green 41 C.I. No. 62560 | OBNB/OCNB 3:1 | 0.2 0.05 0.005 | *green light green yellow | green light green yellow |
| 167 | unknown | Ceres Blue R C.I. Solvent blue 78 | OBNB/OCNB 3:1 | 0.2 0.05 0.005 | deep blue blue greenish blue | blue light blue bluish green |

*not completely dissolved.
*[2]After one week storage at room temperature nearly colorless.

EXAMPLE 11

This example gives combinations tested for color change in various solvents and at different combinations. These combinations include:

(a) mixtures of Group III moieties;
(b) mixtures of acids having a pK less than about four and basic dyes or basic indicators;
(c) mixtures of organic acids having a pK less than about two and acidic dyes or acidic indicators;
(d) mixtures of Group III moieties and organic acidic compounds with a pK less than about 4;
(e) mixtures of Group III moieties and basic dyes or basic indicators; and
(f) mixtures of a dye having a molecular structure containing a lactone dye and acids.

The results are given in Table III.

TABLE 3

| No. | Organic Compounds | Total Concentration % m/m | Solvent | Color Liquid | Color Solid |
|---|---|---|---|---|---|
| 1 | Quinaldine red/ acridine orange 1:1 | 0.05 | OCNB | wine red | orange brown |
| 2 | Toluidine blue 0/ acridine orange 1:1 | 0.05 | OCNB | green | brown |
| 3 | Same mixture | 0.05 | OCNB/OBNB 1:3 | green | brownish yellow |
| 4 | Same mixture | 0.05 | t. butanol | green | brownish yellow |
| 5 | Same mixture | 0.05 | sym. trioxane* | green | brown |
| 6 | Acridine orange/ fuchsin 2:1 | 0.015 | OCNB | red | reddish-orange |
| 7 | Bromophenol blue/ pinacyanol iodide | 0.05 | OCNB/OBNB 1:3 | blue | greenish yellow |
| 8 | Chlorophenol red/ pinacyanol iodide | 0.05 | OCNB/OBNB 1:3 | greenish blue | light yellowish brown |
| 9 | Chlorophenol blue/ pinacyanol iodide | 0.05 | OCNB/OBNB 1:3 | blue | green |
| 10 | Chlorocresol green/ pinacyanol iodide | 0.05 | OCNB/OBNB 1:3 | blue | moss green |
| 11 | Phthalocyanine/ pinacyanol iodide | 0.05 | OCNB/OBNB 1:3 | blue | brown |
| 12 | Bromochlorophenol blue/ pinacyanol chloride 5:1 | 0.05 | OCNB/OBNB 1:3 | greenish blue | yellowish brown |
| 13 | Bromocresol purple/ 2-(p-dimethylaminostyryl) -1-ethyl-pyridinium iodide | 0.05 | OCNB/OBNB 1:3 | red orange | orange |
| 14 | Bromochlorophenol blue/ 2-(p-dimethylaminostyryl) -1-ethyl-pyridinium iodine | 0.05 | OCNB/OBNB 1:3 | red orange | yellow |
| 15 | Bromophenol red/ 2-(p-dimethylaminostyrl) -1-ethyl-pyridinum iodide | 0.05 | OCNB/OBNB 1:3 | red orange | orange |
| 16 | Chlorocresol green/ 2-(p-dimethylaminostyryl) -1-ethyl-pyridinium iodide | 0.05 | OCNB/OBNB 1:1 | red orange | yellow |
| 17 | Bromophenol blue/ | 0.05 | OCNB/OBNB | blue | green |

TABLE 3-continued

| No. | Organic Compounds | Total Concentration % m/m | Solvent | Color Liquid | Color Solid |
|---|---|---|---|---|---|
| | crystal violet | | 1:3 | | |
| 18 | Chlorophenol red/ cryptocyanine | 0.05 | OCNB/OBNB 1:3 | green | red |
| 19 | Bromochlorophenol blue/ cryptocyanine | 0.05 | OCNB/OBNB 1:3 | green | yellow |
| 20 | Chlorophenol red/ Dicyanine A | 0.05 | OCNB/OBNB 1:3 | green | red |
| 21 | Bromochlorophenol blue/ Dicyanine A | 0.05 | OCNB/OBNB 1:3 | green | yellow |
| 22 | Cromocresol purple/ 3,3'-diethylthiadicarbo- cyanine iodide | 0.05 | OCNB/OBNB 1:3 | greenish blue | green |
| 23 | Bromophenol blue/ 3,3'-diethylthiadicarbo- cyanine iodide | 0.05 | OCNB/OBNB 1:3 | greenish blue | yellow green |
| 24 | Bromochlorophenol blue/ 1,1'-diethyl-2,2'- cyanine iodide | 0.05 | OCNB/OBNB 1:3 | red | yellow orange |
| 25 | Chlorophenol red/ phthalocyanine | 0.05 | OCNB/OBNB 1:3 | green | red |
| 26 | Bromophenol blue/ ethyl red | 0.05 | OCNB/OBNB 1:3 | red | yellow |
| 27 | Chlorophenol blue/ ethyl red | 0.05 | OCNB/OBNB 1:3 | red | yellow |
| 28 | Chlorophenol red/ ethyl red 3:1 | 0.05 | OCNB/OBNB 1:3 | red | orange |
| 29 | Bromocresol purple/ ethyl red | 0.05 | OCNB/OBNB 1:3 | red | yellow |
| 30 | Bromochlorophenol blue/ ethyl red | 0.05 | OCNB/OBNB 1:3 | purple red | yellow |
| 31 | Bromophenol red/ ethyl red 3:1 | 0.05 | OCNB/OBNB 1:3 | reddish violet | violet |
| 32 | Bromochlorophenol blue/ ethyl red/pinacyanol iodide | 0.05 | OCNB/OBNB 1:3 | dark blue | yellow |
| 33 | Murexide/quinaldine red | 0.05 | OCNB/OBNB 1:3 | purple yellow | light brownish |
| 34 | Bromochlorophenol blue/ Quinaldine red/pinacyanol iodide | 0.05 | OCNB/OBNB 1:3 | purple | yellow |
| 35 | Phthalocyanine/ quinaldine red | 0.05 | OCNB/OBNB 1:3 | violet | dark brown |
| 36 | Fluorescein/pinacyanol iodide | 0.05 | OCNB/OBNB 1:3 | blue | brownish purple |
| 37 | Trichloroacetic acid/ cryptocyanine | 0.05 | OCNB/OBNB 1:3 | green | yellow |
| 38 | Maleic acid*/crypto- cyanine | 0.05 | OCNB/OBNB 1:3 | green | light yellow green |
| 39 | Maleic acid/dicyanine A | 0.05 | OCNB/OBNB 1:3 | green | light yellow green |
| 40 | Napthalenesulphonic acid/dicyanine A | 0.05 | OCNB/OBNB 1:3 | greenish yellow | yellow |
| 41 | Trichloroacetic acid/ dicyanine A | 0.05 | OCNB/OBNB 1:3 | greenish yellow | yellow |
| 42 | 3,4,5,6-tetrabromophenol- sulphonepthalein/2- (p-dimethylaminostyryl) -1-ethyl-pyridinium iodide | 0.05 | OCNB/OBNB 1:3 | red orange | orange |
| 43 | Thymolphthalein/ethyl red | 0.05 | OCNB/OBNB 1:3 | red | purple |
| 44 | 3,4,5,6-tetrabromophenol- sulphonephthalein/ethyl red | 0.05 | OCNB/OBNB 1:3 | red | brownish red |
| 45 | Naphthalenesulphonic acid/ethyl red | 0.05 | OCNB/OBNB 1:3 | red | yellow |
| 46 | 2,4-dinitrobenzene- sulphonic acid/ethyl red 5:1 | 0.30 | OCNB | red | yellow |
| 47 | Naphthalenesulphonic acid/ quinaldine red | 0.05 | OCNB/OBNB 1:3 | purple red | yellow |
| 48 | Trichloroacetic acid/ quinaldine red | 0.05 | OCNB/OBNB 1:3 | purple | yellow |
| 49 | 2,4-dinitrobenzene- sulphonic acid/ quinaldine red 5:1 | 0.30 | OCNB | red | yellow |
| 50 | 3,4,5,6-tetrabromophenol- sulphonephthalein/ quinaldine red | 0.05 | OCNB/OBNB 1:3 | reddish pink | yellow |
| 51 | Naphthalenesulphonic acid/ 1,1'-diethyl-2,2'-cyanine iodide | 0.05 | OCNB/OBNB 1:3 | red | yellow |
| 52 | Trichloroacetic acid/1,1'- | 0.05 | OCNB/OBNB | red | yellow |

TABLE 3-continued

| No. | Organic Compounds | Total Concentration % m/m | Solvent | Color Liquid | Color Solid |
|---|---|---|---|---|---|
| | diethyl-2,2'-cyanine iodide | | 1:3 | | |
| 53 | Maleic acid*/1,1'-diethyl-2,2'cyanine iodide | 0.05 | OCNB/OBNB 1:3 | red | yellow |
| 54 | Trichloroacetic acid/3,3'-diethylthiadicarbocyanine iodide | 0.05 | OCNB/OBNB 1:3 | blue green | light rose |
| 55 | Naphthalenesulphonic acid/crystal violet | 0.05 | OCNB/OBNB 1:3 | green | yellow brown |
| 56 | Maleic acid*/crystal violet | 0.05 | OCNB/OBNB 1:3 | blue | green |
| 57 | Dichloroacetic acid/crystal violet 1:1 | 0.05 | OCNB/OBNB 1:3 | blue | green |
| 58 | Dichloroacetic acid/crystal violet 3:1 | 0.20 | OCNB/OBNB 1:3 | blue | dark green |
| 59 | Naphthalenesulphonic acid/ethyl violet | 0.05 | OCNB/OBNB 1:3 | green | yellow |
| 60 | Trichloroacetic acid/ethyl violet | 0.05 | OCNB/OBNB 1:3 | green | yellow |
| 61 | Maleic acid*/ethyl violet | 0.05 | OCNB/OBNB 1:3 | blue | yellowish green |
| 62 | Naphthalenesulphonic acid/basic fuchsin | 0.05 | OCNB/OBNB 1:3 | purple | yellow |
| 63 | Naphthalenesulphonic acid/basic fuchsin 4:1 | 0.05 | OCNB | purple | greenish |
| 64 | Maleic acid*/basic fuchsin | 0.05 | OCNB/OBNB 1:3 | red | blue violet |
| 65 | Chloroanilic acid/basic fuchsin | 0.05 | OCNB/OBNB 1:3 | red | grey |
| 66 | Bromophenol blue/basic fuchsin | 0.05 | OCNB/OBNB 1:3 | red | moss green |
| 67 | Bromophenol red/brilliant green | 0.05 | OCNB/OBNB 1:3 | green | dark green |
| 68 | Bromochlorophenol blue/brilliant green | 0.05 | OCNB/OBNB 1:3 | blue | green |
| 69 | Bromochlorophenol blue/ethyl violet | 0.05 | OCNB/OBNB 1:3 | blue | light moss |
| 70 | Cryptocyanine/5-(p-dimethyl aminobenzilidene)rhodanine | 0.05 | OCNB/OBNB 1:3 | dark yellow | dark brown |
| 71 | Dicyanin A/5-(p-dimethylaminobenzilidene)rhodanine | 0.05 | OCNB/OBNB 1:3 | green | purple |
| 72 | Sodium phthalocyanine/pinacyanol iodide | 0.05 | OCNB/OBNB 1:3 | blue | brown |
| 73 | Sodium phthalocyanine/quinaldine red | 0.05 | OCNB/OBNB 1:3 | violet | light brown |
| 74 | Sodium phthalocyanine/chlorophenol red | 0.05 | OCNB/OBNB 1:3 | green | red |
| 75 | Naphthalenesulphonic acid/bromochlorophenol blue | 0.05 | OCNB/OBNB 1:3 | yellow | very light red |
| 76 | Naphthalenesulphonic acid/chlorophenol blue | 0.05 | OCNB/OBNB 1:3 | orange | red |
| 77 | Naphthalenesulphonic acid/bromocresol purple | 0.05 | OCNB/OBNB 1:3 | orange | red |
| 78 | Crystal violet lactone/phenol 1:1 | 0.10 | OCNB/OBNB 1:3 | yellow | blue |
| 79 | Crystal violet lactone/bisphenol A 1:1 | 0.05 | OCNB/OBNB 1:3 | yellowish green | blue |
| 80 | Crystal violet lactone/benzoic acid 1:1 | 0.05 | OCNB/OBNB 1:3 | green | green |
| 81 | Crystal violet lactone/3-nitrophenol 1:1 | 0.05 | OCNB/OBNB 1:3 | yellowish green | greenish blue |
| 82 | Crystal violet lactone/pyrocatechol 1:1 | 0.05 | OCNB/OBNB 1:3 | yellowish green | blue |

*trimer of formaldehyde.
Ratios are mass ratios.
*maleic acid is poor soluble in the solvents.

EXAMPLE 12

The following Table lists compound found to be unsatisfactory as Group III moieties:

TABLE 4

| Class | Dye | Solvent | Concentration % (m/m) | Color Liquid | Color Solid |
|---|---|---|---|---|---|
| nitroso | 2 Nitroso-1-Naphtol Mordant dye | OBNB/OCNB 3:1 | 0.2 0.05 | brown yellowish brown | brown yellowish brown |

TABLE 4-continued

| Class | Dye | Solvent | Concentration % (m/m) | Color Liquid | Color Solid |
|---|---|---|---|---|---|
| | C.I. No. 10010 (Fluka) | | 0.005 | yellow | yellow |
| nitro | Salicyl Yellow A and B Acid dye C.I. No. 10300 (Merck) | OBNB/OCNB 3:1 | 0.2 | *yellowish brown | yellowish brown |
| monoazo | Orasol Red G C.I. Solvent red 125 (Ciba-Geigy) | OBNB/OCNB 3:1 | 0.05 | red | red |
| monoazo | Orasol Red B C.I. Solvent red F (Ciba-Geigy) | OBNB/OCNB 3:1 | 0.05 | dark red | dark red |
| monoazo | Tropeolin O C.I. Acid orange 6 Food Yellow 8 C.I. No. 14270 (Baker) | OBNB/OCNB 3:1 | 0.2 0.05 0.005 | dark yellow dark yellow yellow | dark yellow dark yellow yellow |
| monoazo | Sudan red G C.I. Solvent Red 1 C.I. No. 12150 (BASF) | OBNB/OCNB 3:1 | 0.2 0.05 0.005 | red dark orange orange | red dark orange orange |
| | Orange G C.I. Acid orange 10 Food orange 4 C.I. No. 16230 (Fluka) | OBNB/OCNB 3:1 | 0.2 0.05 0.005 | orange dark yellow yellow | orange dark yellow yellow |
| monoazo | Alizaren yellow G.G. C.I. Mordant yellow 1 C.I. No. 14025 (Merck) | OBNB/OCNB 3:1 | 0.2 | *dark yellow | dark yellow |
| monoazo | Calcon C.I. Mordant black 17 C.I. No. 15705 (Merck) | OBNB/OCNB 3:1 | 0.2 | *greenish brown | greenish brown |
| monoazo | Awaranth C.I. Acid red 27 Food red G C.I. No. 16185 (Merck) | OBNB/OCNB 3:1 | 0.2 | *brownish green | brownish green |
| monoazo | Tartiazine C.I. Pigment yellow 100 C.I. No. 19140:1 (I.G. Farber) | OBNB/OCNB 3:1 | 0.2 0.05 0.005 | orange dark yellow yellow | orange dark yellow yellow |
| monoazo | Orange I C.I. Acid orange 20 C.I. No. 14600 (Fluka) | OBNB/OCNB 3:1 | 0.2 0.05 0.005 | brown brownish yellow yellow | brown brownish yellow yellow |
| monoazo | Eriochrome blue Blk B C.I. Mordant Black 3 C.I. No. 14640 (Fluka) | OBNB/OCNB 3:1 | 0.2 0.05 0.005 | black greenish brown yellow | black greenish brown yellow |
| monoazo | Thiazin Red R C.I. Direct red 45 Food red 13 C.I. No. 14780 (Fluka) | OBNB/OCNB 3:1 | 0.2 0.05 0.005 | green greenish yellow yellow | green greenish yellow yellow |
| monoazo | Orange GGN C.I. Food orange 2 C.I. No. 15980 (Merck) | OBNB/OCNB 3:1 | 0.2 0.05 0.005 | red orange orange yellow | red orange orange yellow |
| monoazo | Chromotrope 2B C.I. Acid red 176 Mordant black 93 C.I. No. 16575 (Fluka) | OBNB/OCNB 3:1 | 0.2 | *green | green |
| monoazo | Eriochrome Blue SE C.I. Mordant blue 133:1 C.I. No. 16680 (ICN-K&K) | OBNB/OCNB | 0.2 | *light green | light green |
| monoazo | Eriochrome Red B C.I. Mordant red 7 C.I. No. 18760 (Fluka) | OBNB/OCNB 3:1 | 0.2 | *reddish brown | reddish brown |
| monoazo | Sudans C.I. Acid red 60 Mordant blue 81 C.I. No. 16645 (Fluka) | OBNB/OCNB 3:1 | 0.2 | *green | green |
| monoazo | Methanil Yellow C.I. Acid dye | OBNB/OCNB 3:1 | 0.2 0.05 | dark yellow yellow | dark yellow yellow |

TABLE 4-continued

| Class | Dye | Solvent | Concentration % (m/m) | Color Liquid | Color Solid |
|---|---|---|---|---|---|
| | C.I. No. 15165 (Baker) | | 0.005 | yellow | yellow |
| monoazo | Orange II C.I. Acid orange 7 C.I. No. 15510 (Fluka) | OBNB/OCNB 3:1 | 0.2 | *red orange | red orange |
| monoazo | Aniline Yellow C.I. Solvent yellow 1 C.I. No. 11000 (MC&B) | OBNB/OCNB 3:1 | 0.2 0.05 0.005 | orange dark yellow yellow | orange dark yellow yellow |
| monoazo | Ponceau 3R Acid dye C.I. No. 16155 (MC&B) | OBNB/OCNB 3:1 | 0.2 | *brownish red | brownish red |
| disazo | Organol Yellow JR (Ugine Kuhlmann) | OBNB/OCNB 3:1 | 0.05 | orange | orange |
| disazo | Congo Red C.I. No. 22110 Direct dye (Baker) | OBNB/OCNB 3:1 | 0.2 | *red | red |
| disazo | Sudan Red 7B C.I. Solvent red 1G C.I. No. 26050 (Edward Gurr) | OBNB/OCNB 3:1 | 0.2 0.05 0.005 | dark red red light red | dark red red light red |
| disazo | Oil red 0 C.I. Solvent red 27 C.I. No. 26125 (Baker) | OBNB/OCNB 3:1 | 0.2 0.05 0.005 | very dark red dark red red | very dark red dark red red |
| disazo | Evans Blue C.I. Direct blue 533:1 C.I. No. 23860 (Merck) | OBNB/OCNB | 0.2 | *green | green |
| disazo | Naptal Blue Black B C.I. Acid black 1 C.I. No. 20470 (Fluka) | OBNB/OCNB 3:1 | 0.2 | *green | green |
| disazo | Bismarck Brown R C.I. Basic brown 4 C.I. No. 21000 (Fluka) | OBNB/OCNB 3:1 | 0.2 0.05 0.005 | very dark green green light green | very dark green green light green |
| disazo | Ponceau BS C.I. acid red 66 C.I. No. 26905 (Fluka) | OBNB/OCNB 3:1 | 0.2 | *brownish red | brownish red |
| disazo | Ponceau S C.I. Acid red 112 C.I. No. 27195 (Fluka) | OBNB/OCNB 3:1 | 0.2 | *brownish yellow | brownish yellow |
| disazo | Benzopurpurin 4B C.I. Direct red 2 C.I. No. 23500 .(MC&B) | OBNB/OCNB | 0.2 | *brown | brown |
| disazo | Sudan III C.I. Solvent red 23 C.I. No. 26100 (Baker) | OBNB/OCNB 3:1 | 0.2 0.05 0.005 | very dark red dark red red | very dark red dark red red |
| disazo | Crocein Scarlet 1700,3B C.I. Acid red 73 C.I. No. 27290 (MC&B) | OBNB/OCNB 3:1 | 0.2 | brownish red | brownish red |
| trisazo | Direct Yellow 62 C.I. No. 36900 (MC&B) | OBNB/OCNB 3:1 | 0.2 0.05 0.005 | yellow yellow yellow | yellow yellow yellow |
| polyazo | Solophenyl Red 3BL Direct red 80 (Ciba-Geigy) | OBNB/OCNB 3:1 | 0.05 | non soluble | |
| azoic | Fast Violet Salt C.I. No. 37165 (Fluka) | OBNB/OCN 3:1 | 0.2 0.05 0.005 | yellow yellow yellow | yellow yellow yellow |
| azoic | Fast Red Salt RC C.I. No. 37120 (Fluka) | OBNB/OCNB 3:1 | 0.2 0.05 0.005 | yellow yellow yellow | yellow yellow yellow |
| azoic | Fast Red Salt B C.I. No. 37125 (Fluka) | OBNB/OCNB 3:1 | 0.2 0.05 0.005 | yellow yellow yellow | yellow yellow yellow |
| triaryl methane | Methyl Green C.I. Basic blue 20 C.I. No. 42505 (Merck) | OBNB/OCNB 3:1 | 0.2 0.05 0.005 | dark green green light green | dark green green light green |
| triaryl | Water Blue Standard | OBNB/OCNB | 0.2 | *green | green |

TABLE 4-continued

| Class | Dye | Solvent | Concentration % (m/m) | Color Liquid | Color Solid |
|---|---|---|---|---|---|
| methane | (Fluka)<br>C.I. solvent blue 3<br>C.I. No. 42775 | 3:1 | 0.05<br>0.005 | | |
| triaryl<br>methane | Acid Fuchsin<br>C.I. Acid violet 1g<br>C.I. No. 42685<br>(Fluka) | OBNB/OCNB<br>3:1 | 0.2<br>0.05<br>0.005 | dark green<br>light green<br>yellow | dark green<br>light green<br>yellow |
| triaryl<br>methane | Alkaline Blue 6B<br>C.I. Acid blue 119<br>C.I. No. 42765<br>(Baker) | OBNB/OCNB<br>3:1 | 0.2<br>0.05<br>0.005 | dark green<br>green<br>light green | dark green<br>green<br>light green |
| triaryl<br>methane | Patent Blue V<br>C.I. Acid blue 3<br>Food blue 5<br>C.I. No. 42051<br>(Merck) | OBNB/OCNB<br>3:1 | 0.2<br>0.05<br>0.005 | blue<br>blue<br>green | blue<br>blue<br>green |
| triaryl<br>methane | Water blue<br>C.I. Acid blue 22<br>C.I. No. 42755<br>(Fluka) | OBNB/OCNB | 0.2 | *green | green |
| triaryl<br>methane | Aurine<br>C.I. No. 43800<br>(H&W) | OBNB/OCNB<br>3:1 | 0.2 | dark orange | dark orange |
| triaryl<br>methane | Eriochrome Cyamin R<br>C.I. Mordant blue 3<br>C.I. No. 43820<br>(Merck) | OBNB/OCNB<br>3:1 | 0.2<br>0.05<br>0.005 | brown<br>dark yellow<br>yellow | brown<br>dark yellow<br>yellow |
| triaryl<br>methane | Eriochromaznol B<br>C.I. Mordant blue 1<br>C.I. No. 43830<br>(Ciba-Geigy) | OBNB/OCNB<br>3:1 | 0.2<br>0.05<br>0.005 | brown<br>brownish yellow<br>yellow | brown<br>brownish yellow<br>yellow |
| triaryl<br>methane | Fast Green FCF<br>C.I. Food green 3<br>C.I. No. 42053<br>(MC&B) | OBNB/OCNB<br>3:1 | 0.2<br>0.05<br>0.005 | *moss green<br>light green<br>greenish yellow | moss green<br>light green<br>greenish yellow |
| triaryl<br>methane | Methyl Violet Base<br>C.I. Solvent violet 8<br>C.I. No. 42535:1<br>(MC&B) | OBNB/OCNB<br>3:1 | 0.2<br>0.05<br>0.005 | very dark blue<br>very dark blue<br>dark blue | very dark blue<br>very dark blue<br>dark blue |
| triaryl<br>methane | Naphtalene Green V<br>C.I. Acid green 16<br>C.I. No. 44025<br>(MC&B) | OBNB/OCNB<br>3:1 | 0.2<br>0.05<br>0.005 | very dark green<br>dark green<br>green | very dark green<br>dark green<br>green |
| triaryl | Light Green SF<br>yellowish<br>C.I. Acid green 5<br>C.I. Food green 2<br>C.I. No. 42095<br>(Fluka) | OBNB/OCNB<br>3:1 | 0.2<br>0.05<br>0.005 | green<br>light green<br>very light green | green<br>light green<br>very light green |
| triaryl<br>methane | Alkaline Blue<br>C.I. Acid blue 110<br>C.I. No. 42750<br>(Merck) | OBNB/OCNB<br>3:1 | 0.2<br>0.05<br>0.005 | dark blue<br>bluish green<br>light green | dark blue<br>bluish green<br>light green |
| triaryl<br>methane | Chromarurol S<br>C.I. Mordant blue 2g<br>C.I. No. 43825<br>(Fluka) | OBNB/OCNB<br>3:1 | 0.2<br>0.05<br>0.005 | brown<br>brownish green<br>yellow | brown<br>brownish green<br>yellow |
| triaryl<br>methane | Victoria Blue B<br>C.I. Basic blue 26<br>C.I. No. 40445<br>(Fluka) | OBNB/OCNB<br>3:1 | 0.2<br>0.05<br>0.005 | dark blue<br>dark blue<br>dark blue | dark blue<br>dark blue<br>dark blue |
| xanthene | Dichlorofluorescein<br>C.I. Solvent orange 32<br>C.I. No. 45365<br>(Fluka) | OBNB/OCNB<br>3:1 | 0.2<br>0.05<br>0.005 | dark yellow<br>dark yellow<br>yellow | dark yellow<br>dark yellow<br>yellow |
| xanthene | Acridine red<br>C.I. No. 45000<br>(MC&B) | OBNB/OCNB<br>3:1 | 0.2<br>0.05<br>0.005 | red<br>red<br>red | red<br>red<br>red |
| xanthene | Violamine 3B<br>C.I. Acid blue 1g<br>C.I. No. 45205<br>(ICN-K&K) | OBNB/OCNB<br>3:1 | 0.2 | *green | green |
| acidine | Rivanol<br>(ICN-K&K) | OBNB/OCNB<br>3:1 | 0.2<br>0.05<br>0.005 | yellow<br>yellow<br>yellow | yellow<br>yellow<br>yellow |
| acidine | Proflavine<br>(ICN-K&K) | OBNB/OCNB<br>3:1 | 0.2 | *yellow | yellow |
| quinoline | Quinoline Yellow<br>C.I. Acid yellow 3<br>Food yellow 13 | OBNB/OCNB<br>3:1 | 0.2<br>0.05<br>0.005 | yellow<br>yellow<br>yellow | yellow<br>yellow<br>yellow |

TABLE 4-continued

| Class | Dye | Solvent | Concentration % (m/m) | Color Liquid | Color Solid |
|---|---|---|---|---|---|
| azine | C.I. No. 47005 (Fluka) Indulin Water Soluble C.I. Acid blue 20 | OBNB/OCNB 3:1 | 0.2 | *light green | light green |
| azine | C.I. No. 50405 (Fluka) Neutral Violet C.I. No. 50030 (ICN-K&K) | OBNB/OCNB 3:1 | 0.2 0.05 0.005 | *green light green greenish yellow | green light green greenish yellow |
| azine | Magdala Red C.I. Basic red 6 C.I. No. 50375 (ICN-K&K) | OBNB/OCNB 3:1 | 0.2 0.05 0.005 | greenish yellow yellow | greenish yellow yellow |
| azine | Indulin Alcohol soluble C.I. Solvent Green C.I. No. 50400 (ICN-K&K) | OBNB/OCNB 3:1 | 0.2 0.05 0.005 | green light green greenish yellow | green light green greenish yellow |
| oxazine | Sandorin Violet Blue C.I. Pigment violet 23 C.I. No. 51319 (Sandoz) | OBNB/OCNB 3:1 lauryl alcohol | 0.2 0.05 0.05 | dark violet violet | dark violet violet |
| oxazine | Brilliant Cresyl Blue C.I. No. 51010 (Merck) | OBNB/OCNB 3:1 | 0.2 0.05 0.005 | dark blue dark blue green | dark blue dark blue green |
| oxazine | Capri Blue C.I. No. 51015 (ICN-K&K) | OBNB/OCNB 3:1 | 0.2 0.05 0.005 | dark blue blue bluish green | dark blue blue bluish green |
| oxazine | Iris Blue C.I. No. 51400 (ICN-K&K) | OBNB/OCNB 3:1 | 0.2 | *greenish | greenish |
| anthraquinone | Chromophtal Blue A3R C.I. Vat blue 4 Food blue 4 Pigment blue 60 C.I. No. 69800 (Ciba-Geigy) | OBNB/OCNB 3:1 | 0.2 0.05 0.005 | dark blue dark blue green | dark blue dark blue green |
| anthraquinone | Chromophtal Red A3B C.I. Pigment red 177 C.I. No. 65300 (Ciba-Geigy) | OBNB/OCNB 3:1 | 0.2 0.05 0.005 | dark red red light red | dark red red light red |
| anthroquinone | Celliton fast Blue FFG C.I. Disperse blue 6 C.I. No. 62050 (BASF) | OBNB/OCNB 3:1 | 0.2 0.05 0.005 | dark blue dark green light green | dark blue dark green light green |
| anthroquinone | Anthra Purpurin C.I. Mordant dye C.I. No. 58225 (H&W) | OBNB/OCNB 3:1 | 0.2 0.05 0.005 | orange brown yellow yellow | orange brown yellow yellow |
| anthroquinone | Anthracene Blue WR C.I. Mordant blue 32 C.I. No. 58605 (H&W) | OBNB/OCNB | 0.2 | *greenish yellow | greenish yellow |
| anthroquinone | Anthraquinone Violet R C.I. Acid violet 34 C.I. No. 61710 (MC&B) | OBNB/OCNB 3:1 | 0.2 | *moss green | moss green |
| anthroquinone | Acid Alizarin Blue BB C.I. Mordant blue 23 C.I. No. 58610 (ICN-K&K) | OBNB/OCNB 3:1 | 0.2 | *green | *green |
| anthroquinone | Alizarin Blue Black B C.I. Mordant black 13 C.I. No. 63615 (MC&B) | OBNB/OCNB | 0.2 | *moss green | moss green |
| anthroquinone | Alizarin Brilliant Blue BS C.I. Acid blue 45 C.I. No. 63010 (ICN-K&K) | OBNB/OCNB 3:1 | 0.2 | *green | green |
| phtalocamine | Orasol Blue Brilliant GN C.I. Solvent blue 67 (Ciba-Geigy) | OBNB/OCNB 3:1 | 0.05 | greenish blue | greenish blue |
| phtalocamine | Orasol Blue 2 GLN (Ciba-Geigy) | OBNB/OCNB 3:1 | 0.05 | bluish green | bluish green |
| phtalocamine | Solphenyl Turquois blue GRL C.I. direct blue 18g (Ciba-Geigy) | OBNB/OCNB 3:1 | 0.05 | *green | green |

TABLE 4-continued

| Class | Dye | Solvent | Concentration % (m/m) | Color Liquid | Color Solid |
|---|---|---|---|---|---|
| phtalocamine | Sandorin Green GLS C.I. Pigment green 7 C.I. No. 74260 (Sandoz) | OBNB/OCNB 3:1 | 0.05 | green | green |
| | | lauryl alcohol | 0.05 | light green | light green |
| phtalocamine | Solar Turquois blue GLL C.I. Direct blue 86 C.I. No. 74180 (Sandoz) | OBNB/OCNB 3:1 | 0.05 | *yellowish green | yellowish green |
| natural | Cochineal C.I. Natural red 4 C.I. No. 75470 (Kon. Pharm. Fab.) | OBNB/OCNB 3:1 | 0.2 | *yellow | yellow |
| natural | Brazilin C.I. Natural red 24 C.I. No. 75280 (H&W) | OBNB/OCNB 3:1 | 0.2 | *yellow | yellow |
| natural | Hematoxylin C.I. Natural Blk 1&2 C.I. No. 74290 (Baker) | OBNB/OCNB 3:1 | 0.2 0.05 0.005 | yellow yellow yellow | yellow yellow yellow |
| natural | Morin C.I. Natural Yellow 8, 11 C.I. No. 75660 (B.D.H.) | OBNB/OCNB 3:1 | 0.2 | *yellow | yellow |
| natural | Diamond black C.I. Natural black 3&4 C.I. No. 75291 (ICN-K&K) | OBNB/OCNB 3:1 | 0.2 | *greenish | greenish |
| natural | Quercetin Dihydrate C.I. Natural yellow 10, 13 C.I. Natural red 1 C.I. No. 75670 (Fluka) | OBNB/OCNB 3:1 | 0.2 | *yellow | yellow |
| inorganic pigments | New Green C.I. Pigment green 21 C.I. No. 77410 (ICN-K&K) | OBNB/OCNB 3:1 | 0.2 0.05 0.005 | dark green green green | dark green green green |
| inorganic | China Yellow C.I. Pigment yellow 42, 43 C.I. Pigment brown 6, 7 C.I. No. 77492 (ICN-K&K) | OBNB/OCNB 3:1 | 0.2 0.05 0.005 | *dark yellow yellow yellow | dark yellow yellow yellow |
| phenol- phthaleine | Tetrabromophenol phthalein ethyl ester (Eastman Kodak #6810) | OBNB/OCNB 3:1 | 0.2 0.05 0.005 | brownish yellow greenish yellow light green | brownish yellow greenish yellow light green |
| phenol- phthaleine | Tetrabromphenol phtahalein ethyl ester potassium salt (Eastman Kodak #7083 | OBNB/OCNB 3:1 | 0.2 0.05 0.005 | dark green green light green | dark green green light green |
| disazo | 44'bis(4-amino-1- naphtylazo)-2,2'- stilbenedisulphonic acid (Eastman Kodak #7089) | OBNB/OCNB 3:1 | 0.2 | *greenish yellow | greenish yellow |
| unkown | Solochrome Red B (H&W) | OBNB/OCNB 3:1 | 0.2 | *yellowish brown | yellowish brown |
| unknown | Brenzcathechin Violet (Merck) | OBNB/OCNB 3:1 | 0.2 | *very dark green | very dark green |
| unknown | 5(p-dimethyl aminobenzylidine rhodamine (Eastman Kodak #2748) | OBNB/OCNB 3:1 | 0.2 0.05 0.005 | orange red orange red orange yellow | orange red orange red orange yellow |

*not completely dissolved.

EXAMPLE 13

The following Table 5 lists results of various compositions contrasting quick (instantaneous) versus slow (using ambient temperature) cooling of liquids on color change:

TABLE 5

| Compound | Solvent | % Concentration | Liquid | Color Quick Cooling | Slow Cooling |
|---|---|---|---|---|---|
| 2,2'-(4,4'-Biphenylene)-bis-(2-hydroxy-4,4'-dimethylmorpholinuem Bromide) (East. 9702) | formamide | 0.5 | clear yellow | white | |
| | | 0.05 | clear | white | |
| | | 0.005 | clear | white | |
| Chicago Blue 6B Direct Blue 1 (MCB CX685) | formamide | 0.5 | navy blue | navy blue | |
| | | 0.05 | royal blue | royal blue | royal blue |
| | | 0.005 | blue | light blue | |
| Aurintricarboxylic Acid (East. P 1946) | formamide | 0.5 | dark red | dark red | |
| | | 0.05 | deep red | deep red | deep red |
| | | 0.005 | orange | orange-red | pink |
| Cresyl violet perchlorate (East. 11884) | formamide | 0.5 | deep purple w/red fluorc. | deep purple | |
| | | 0.05 | pur. w/red fluorc. | deep purple | |
| | | 0.005 | blue w/red fluorc. | violet | |
| Cresyl violet* Acetate (East. C8687) | formamide | 0.5 | deep purple | deep purple | |
| | | 0.05 | bl (red flourc) | deep purple | |
| | | 0.005 | lt. blue (red fl) | violet | |
| 1,1'-Diethyl-2,2'* diarbocyanene Iodide (East. 9618) | formamide | 0.5 | aqua-blue | aqua-blue | |
| | | 0.05 | green-blue | green-blue | |
| | | 0.005 | lt. green blue | lt. green blue | |
| Chlorophenol red (East. 2116) | formamide | 0.5 | yellow-orange | orange | |
| | | 0.05 | yellow-brown | yellow brown | |
| | | 0.005 | brown green | brown green | |
| Chromotrope 2R* ICB CX 1620 | OBNB/OCNB 3:1 | 0.5 | brown black | brown black | brown black |
| | | 0.05 | dirty yellow | dirty yellow | dirty yellow |
| | | 0.005 | yellow | yellow | yellow |
| Erioglaucine* MCB EX 120 | OBNB/OCNB 3:1 | 0.5 | heather green | heather green | heather green |
| | | 0.05 | green | light green | light green |
| | | 0.005 | lime green | lime green | lime green |
| New Fuchsia MCB NX 280 | OBNB/OCNB 3:1 | 0.5 | purple | purple | purple |
| | | 0.05 | violet | violet | violet |
| | | 0.05 | red | red | red |
| Sudan II, MCB 2X1105 | OBNB/OCNB 3:1 | 0.5 | deep red orange | deep red orange | dp. red orange |
| | | 0.05 | red orange | red orange | red orange |
| | | 0.05 | orange | orange | orange |
| Oil Red EGN MCN OX160 | OBNB/OCNB 3:1 | 0.5 | dark red | dark red | dark red |
| | | 0.05 | deep red | deep red | deep red |
| | | 0.05 | red | red | red |
| Eriochrome Cyanine R* MCB EX105 | OBNB/OCNB 3:1 | 0.5 | red-brown | red brown | red brown |
| | | 0.05 | brown yellow | brown yellow | brown yellow |
| | | 0.005 | yellow | yellow | yellow |
| Acridine Red* PB A11000 | OBNB/OCNB 3:1 | | Translucent- | | |
| | | 0.5 | hot pink | purple | purple |
| | | 0.05 | pink | red | red |
| | | 0.005 | peach | peach | peach |
| Alizania Cyanine* Green P & B A13170 | OBNB/OCNB 3:1 | 0.5 | hunter green | hunter green | hunter green |
| | | 0.05 | lt. hunter green | lt. hunter green | lt. hunter green |
| | | 0.005 | lime green | lime green | lime green |
| Alizarin Yellow R* MCB AX505 | OBNB/OCNB 3:1 | 0.5 | muddy orange | burnt orange | burnt orange |
| | | 0.05 | deep yellow | deep yellow | deep yellow |
| | | 0.005 | yellow | yellow | yellow |
| Orange IV* MCB CK220. | OBNB/OCNB 3:1 | 0.5 | muddy yl. brown | muddy yl. brown | muddy yl brn. |
| | | 0.05 | muddy yellow | bright yellow | bright yellow |
| | | 0.005 | light yellow | light yellow | light yellow |
| Janus Green MCB JX10 | OBNB/OCNB 3:1 | 0.5 | dark green-blue | dark green-blue | dk green-blue |
| | | 0.05 | green blue | green blue | green blue |
| | | 0.005 | hunter green | green | green |
| Rhodamine B,O MCB RX75 | OBNB/OCNB 3:1 | 0.5 | fluorescent red | violet | |
| | | 0.05 | fluores. pink | deep lilac | |
| | | 0.005 | fluores. pink | pale lilac | |
| Alizarin Blue* Black B (MCB AX475) | OBNB/OCNB 3:1 | 0.5 | dark green | grayish green | grayish green |
| | | 0.05 | dirty green | dirty green | dirty green |
| | | 0.005 | dirty yellow | dirty yellow | dirty yellow |
| Indigo Synthetic* MCB IX55 | OBNB/OCNB 3:1 | 0.5 | black blue | black blue | black blue |
| | | 0.05 | blue green | hunter green | blue green |
| | | 0.005 | aqua green | green | green |
| Alizarin Yellow G, GG* MCB AX500 | OBNB/OCNB 3:1 | 0.5 | yellow-orange | yellow-orange | yellow orange |
| | | 0.05 | yellow | yellow | yellow |
| | | 0.005 | light yellow | light yellow | light yellow |
| Jenner Stain MCB JX15 | OBNB/OCNB 3:1 | 0.5 | deep purple | deep purple | deep purple |
| | | 0.05 | purple | purple | purple |
| | | 0.005 | bluish purple | grayish purple | grayish purp. |
| Coomassie Brilliant Blue R | OBNB/OCNB 3:1 | 0.5 | blue | green blue | green blue |
| | | 0.05 | green | green | green |
| | | 0.005 | lime green | lime green | lime green |
| Chrysoidine Y,G* MCB CX 1650 | OBNB/OCNB 3:1 | 0.5 | reddish-brown | reddish brown | reddish brown |
| | | 0.05 | burnt orange | deep yellow | deep yellow |
| | | 0.005 | yellow | yellow | yellow |
| Calmagite* MCB CX323 | OBNB/OCNB 3:1 | 0.5 | brown | brown | brown |
| | | 0.05 | light brown | light brown | light brown |
| | | 0.005 | yellow | yellow | yellow |

TABLE 5-continued

| Compound | Solvent | % Concentration | Liquid | Color Quick Cooling | Slow Cooling |
|---|---|---|---|---|---|
| 4,4'-Bis(dimethylamino) benzyhdrol (Eastman 1896) | OBNB/OCNB 75/25 | 0.5 | orange | yellow-orange | orange-yellow |
| | | 0.05 | yellow | bright dp. yl. | deep yellow |
| | | 0.005 | yellow | bright lt. yl | light yellow |
| N-(p-Dimethylamine-phenyl)-1,4 napthoquinoneimine (E. 478) | OBNB/OCNB 75/25 | 0.5 | dark blue | deep blue | dark blue |
| | | 0.05 | deep blue | deep blue | deep blue |
| | | 0.005 | blue | light blue | light blue |
| Zinc Phtalocyanine (E. 10030) | OBNB/OCNB 75/25 | 0.5 | green brown | dark green | dark green |
| | | 0.05 | green | light green | light green |
| | | 0.005 | light yellow | lt. greenish yl. | lt. gr. yl. |
| N,N-Bis(p-butoxybenzylindene)-,α'-bi-p-toluidine (E. 10576) | OBNB/OCNB 75/25 | 0.5 | yellow | yellow | yellow |
| | | 0.05 | yellow | yellow | yellow |
| | | 0.005 | yellow | yellow | yellow |
| Sudan Black B (E. C8690) | OBNB/OCNB 75/25 | 0.5 | deep blue | very dark blue | very dk blue |
| | | 0.05 | dark blue | very dark blue | very dk blue |
| | | 0.005 | dark blue | very dark blue | very dk blue |
| Sudan III (E. C1754) | OBNB/OCNB 75/25 | 0.5 | deep red | maroon | maroon |
| | | 0.05 | red | red-brown | reddish-brown |
| | | 0.005 | red | red-brown | reddish-brown |
| Propyl Red (E. 944) | OBNB/OCNB 75/25 | 0.5 | deep fushia | old rose | |
| | | 0.05 | fushia | old rose | |
| | | 0.005 | cherry red fushia | rose | |
| 2,4,6-Triphenyl-s-triazine *(E. 10252) | OBNB/OCNB 75/25 | 0.5 | bright yellow | bright yellow | bright yellow |
| | | 0.05 | bright yellow | bright yellow | bright yellow |
| | | 0.005 | bright yellow | bright yellow | bright yellow |
| Pyronin Y* (E. C8707) | OBNB/OCNB 75/25 | 0.5 | pinkish purple | deep purple | deep purple |
| | | 0.05 | reddish purple | maroon | maroon |
| | | 0.005 | reddish purple | maroon | maroon |
| Xylene Cyanole, FF *Technical (East. T1579) | OBNB/OCNB 3:1 | 0.5 | blue-green | blue | blue |
| | | 0.05 | green (light) | light green | green |
| | | 0.005 | green-yellow | green-yellow | green-yellow |
| Coumarin 343 (East. 14943) | OBNB/OCNB 3:1 | 0.5 | orange | orange | orange |
| | | 0.05 | deep yellow | deep yellow | deep yellow |
| | | 0.005 | bright yellow | bright yellow | bright yellow |
| 2,3,5-Triphenyl-2H-tetrazolium chloride (East. 6533) | OBNB/OCNB 3:1 | 0.5 | yellow | yellow | yellow |
| | | 0.05 | yellow | yellow | yellow |
| | | 0.005 | yellow | yellow | yellow |
| Toluylene Blue* (ICN 18675) | OBNB/OCNB 3:1 | 0.5 | dark gray blue | gray purple | |
| | | 0.05 | dark green-blue | gray-purple | |
| | | 0.005 | green | gray | |
| Coumarin 152 (East. 14369) | OBNB/OCNB 3:1 | 0.5 | yellow, deep | yellow, deep | yellow, deep |
| | | 0.05 | yellow | yellow | yellow |
| | | 0.005 | light yellow | light yellow | light yellow |
| Wright's Stain (East. C8682) | OBNB/OCNB 3:1 | 0.5 | dark purple | dark purple | dark purple |
| | | 0.05 | purple | purple | purple |
| | | 0.005 | gray | gray | gray |
| Cresyl Violet Perchloate (East. 11884) | OBNB/OCNB 3:1 | 0.5 | fluorescent bl & red | dark purple | dark purple |
| | | 0.05 | bl & red | grayish purple | purple |
| | | 0.005 | green & red mixture | tan | green & red |
| 1,1'-Diethyl-2.2'-dicarbocyanine Iodide (East. 9618) | OBNB/OCNB 3:1 | 0.5 | dark green | blue purple | dark green |
| | | 0.05 | green | blue purple | green |
| | | 0.005 | light green | lt. blue purple | light green |
| 4,-Phenylaeodiphenyl-amine (East. 1714) | OBNB/OCNB 3:1 | 0.5 | orange | orange | orange |
| | | 0.05 | deep yellow | deep yellow | deep yellow |
| | | 0.005 | light yellow | yellow | yellow |
| 3,3'-Diethyloxadicarbocyanine Iodide (East. 11219) | OBNB/OCNB 3:1 | 0.5 | blue | purplish-blue | purplish-blue |
| | | 0.05 | royal blue | blue | blue |
| | | 0.005 | blue | lt. pur. blue | light blue |
| 1,1',3,3,3',3'-Hexamethyl modtricarbocyanine Iodide (East. 14086) | OBNB/OCNB 3:1 | 0.5 | dark green | metallic bl-gr | dark green |
| | | 0.05 | green | blue green | green |
| | | 0.005 | light green | lt. blue-green | light green |
| Mendola's Blue *(Pfaltz & Bauer No 4470) | OBNB/OCNB 3:1 | 0.5 | navy blue | purple | purple |
| | | 0.05 | blue | grayish purple | gray |
| | | 0.005 | light green | blue gray | blue gray |
| 3,3'-Diethylthiadicarbocyanine Iodide (East. 7663) | OBNB/OCNB 3:1 | 0.5 | green blue | purple blue | navy blue |
| | | 0.05 | green blue | royal blue | blue |
| | | 0.005 | green | light blue | light green |
| Phosphine Dye *(Pfaltz & Bauer P16810) | OBNB/OCNB 3:1 | 0.5 | cherry red | rose | rose |
| | | 0.05 | orange-red | pink | peach |
| | | 0.005 | light red | pink | peach |
| Nitron (East. 1077) | OBNB/OCNB 3:1 | 0.5 | reddish-brown | brown | brown |
| | | 0.05 | lt. yellow brn | golden tan | light brown |
| | | 0.005 | yellow | yellow | yellow |
| Alizarin Cyanone *(MCB AX480) | OBNB/OCNB 3:1 | 0.5 | dark green | dark green | dark green |
| | | 0.05 | light green | light green | light green |
| | | 0.005 | yellow green | yellow green | yellow green |
| Solvent Blue (East. P9637) | OBNB/OCNB 3:1 | 0.5 | blue | blue | blue |
| | | 0.05 | green blue | green blue | green blue |
| | | 0.005 | light green | light green | light green |
| Chlorophenol Red | OBNB/OCNB | 0.5 | lt burnt orange | pink red | pinkish red |

TABLE 5-continued

| Compound | Solvent | % Concentration | Liquid | Color Quick Cooling | Slow Cooling |
|---|---|---|---|---|---|
| (East. 2116) | | 0.05 | yellow | red | deep orange |
| | | 0.005 | light yellow | pink | yellow |
| Cresyl Violet Acetate | OBNB/OCNB | 0.5 | brown | purple | purple |
| (East. C8687) | 3:1 | 0.05 | light brown | light purple | brown |
| | | 0.005 | orange yellow | silver tan | silver tan |
| Acid Cyanin | OBNB/OCNB | 0.5 | olive green | hunter green | hunter green |
| *(Pfalz & Bauer A10770) | 3:1 | 0.05 | lt. olive green | light olive | light olive |
| | | 0.005 | yellow | yellow | yellow |
| 0-(2-a-(2-Hydroxy-5-sulfo- | OBNB/OCNB | 0.5 | purple | purple | purple |
| phenylazo)benzylidene | 3:1 | 0.05 | light purple | light purple | grayish purp. |
| hydrazine Benzoic Acid | | 0.005 | dirty yellow | dirty yellow | dirty yellow |
| Sodium Salt (East. 7199) | | | | | |
| Brilliant Cresyl Blue | OBNB/OCNB | 0.5 | dark blue | dark purple blue | royal blue |
| (East. C1743) | 3:1 | 0.05 | blue | blue purple | blue |
| | | 0.005 | aqua-blue | pale purple | green |
| P-Chloro-)-Toluidine | OBNB/OCNB | 0.5 | dark brown | dark brown | dark brown |
| Diazonium Chloride | 3:1 | 0.05 | hazel | gold | gold |
| (Pfaltz & Bauer C19730) | | 0.005 | yellow | yellow | yellow |
| P-Naphtholbenzein | OBNB/OCNB | 0.5 | yellow | orange | |
| (East. 924) | 3:1 | 0.05 | orange | orange | or. |
| | | 0.005 | yellow | orange | |
| Fast Blue RR Salt | OBNB/OCNB | 0.5 | yellow-brown | yellow-brown | yellow-brown |
| (Pfaltz & Bauer F00150) | 3:1 | 0.05 | yellow | yellow | yellow |
| | | 0.005 | light yellow | light yellow | light yellow |
| Toluylene Orange* | OBNB/OCNB | 0.5 | orange yellow | orange-yellow | orange-yellow |
| | 3:1 | 0.05 | yellow | yellow | yellow |
| | | 0.005 | light yellow | light yellow | light yellow |
| Rose Bengal | Formamide | 0.5 | deep pink | dark red | |
| (East. C. 2245) | | 0.05 | hot pink | hot pink | |
| | | 0.005 | pink | pink | |
| Hematein (stain) | Formamide | 0.5 | brown | brown | |
| (East. 2594) | | 0.05 | deep brown | dark brown | |
| | | 0.005 | light brown | light brown | |
| Acid Alizarin Red B | Formamide | 0.5 | deep orange | deep red | |
| (ICN 10498) | | 0.05 | orange | orange | |
| | | 0.005 | peach | peach | |
| 5-Aminofluorescein | Formamide | 0.5 | deep yellow | orange-yellow | |
| (East. 10866) | | 0.05 | yellow | yellow | |
| | | 0.005 | light yellow | yellow | |
| 8-Hydroxy-7-(6-Sulfo-2- | Formamide | 0.5 | deep orange-red | deep red | |
| naphthylazo) 5-Quinoline- | | 0.05 | orange-red | orange-red | |
| sulfonic Acid Disodium | | 0.005 | orange | orange | |
| Salt (East. 8643) | | | | | |
| Martius Yellow | Formamide | 0.5 | deep yellow | deep yellow | |
| (Pfaltz & Bauer M02390) | | 0.05 | yellow | yellow | |
| | | 0.005 | light yellow | yellow | |
| 8-Hydroxy-1,3,6-Pyrenetri- | Formamide | 0.5 | milky-yellow | yellow | |
| sulfonic Acid Trisodium | | 0.05 | yellowish milky-clear | milky white | milky white |
| | | 0.005 | milky clear | white | |
| Alcian Blue 8GX Ingrain | Formamide | 0.5 | blue | royal blue | |
| Blue 1 MCB AX440 | | 0.05 | blue | blue | blue |
| (East. 5180) | | 0.05 | sky blue | sky blue | |
| Thianine Hydrochloride | Formamide | 0.5 | clear | white | |
| | | 0.05 | clear | white | clear white |
| | | 0.005 | clear | white | |
| Chlorantine Fast Red 5B | Formamide | 0.5 | cherry red | cherry red | cherry red |
| (Pfaltz & Bauer C07870) | | 0.05 | deep red | deep red | |
| | | 0.005 | red-pink | pink | |
| Methylthymol Blue | Formamide | 0.5 | dk br yellow | brown yellow | |
| (East. 8068) | | 0.05 | brownish yellow | brownish yellow | brownish yl. |
| | | 0.005 | yellow | light yellow | |

*denotes partly insoluble

EXAMPLE 14

The following dyes in Table 6 were randomly mixed in the two solvents lauric acid and 1-hexadecanol and observed for color changes:

TABLE 6

| | Lauric Acid | | | 1-Hexadecanol | | |
|---|---|---|---|---|---|---|
| Compound | Liquid | Fast | Slow | Liquid | Fast | Slow |
| Aurintricarboxylic Acid (East. P1946) | red-brown | light purple | light purple | red brown | peach | peach |
| Acid Alizarin Red B (ICN IC490) | red | light red | light red | dark red | light pink | light pink |

TABLE 6-continued

| Compound | Lauric Acid | | | 1-Hexadecanol | | |
|---|---|---|---|---|---|---|
| | Liquid | Fast | Slow | Liquid | Fast | Slow |
| 8-Hydroxy-1,3,6 syrene & Sulfonic Acid Trisodium Salt (East. 7281) | dp. yellow | lt. yellow | light yellow | totally insoluble | | |
| 5-Aminofluorescein (East. 10866) | lt. yellow | light tan | light tan | yellow | lt. orange | light orange |
| Rose Bengal (Cert.) (East. 2 C2245) | burnt orange | rose | burnt orange | deep violet | deep violet | deep violet |
| | | | | totally insoluble | | |
| Martius Yellow (P & B M02390) | orange yl. | deep yellow | deep yellow | yl. orange | light yellow | light yellow |
| Chlorantine Fast Red 5B (P & B C07870) | purple | purple | purple | deep purple | light purple | light purple |
| Methylthymol Blue (East. 8068) | peach | peach | peach | brown | tan | tan |
| 8-Hydroxy 7(6-sulfo-2-naphthylazo)-5-quinoline sulfonic Acid Disodium Salt | TOTALLY INSOLUBLE | | | | | |
| Chicago Blue 6B (MCB CX 685) | gray black | gray | gray | gray black | gray | gray |
| Alcian Blue 8GX (MCB AX410) | blue green | light blue | light blue | blue-green | light blue | light blue |
| Thiamine Hydorchloride (East. 5180) | milky clear | white | white | milky clear | off white | off white |
| | | | Totally soluble | | | |

These dyes with the exception of those marked totally soluble were found to be partially soluble in both solvents. Therefore any colors recorded were not necessarily the true color of the dye in the solvent in proportional amounts.

Those dyes that were completely insoluble in both solvents were:
1. 2,2'-(4,4'-Biphenylene)-bis/2-hydroxy-4,4'-dimethyl-morpholinuim Bromide) (East. 9762)
2. Henatein (stain) (East. 8594)
3. 8-Hydroxy-7-(6-sulfo-2-maphthi(azB)-5-quinolinesulfonic Acid Disodium Salt (East. 8644)

The only dye that showed a significant color change was Rose Bengal (East. C2245) in Lauric Acid. Dilutions of this solution were made and the following results were observed:

| Compound | Solvent | % Conc. | Color | | |
|---|---|---|---|---|---|
| | | | Liquid | Fast | Slow |
| Rose Bengal (East.C2245) | Lauric Acid | 0.5 | red-brown | rose | rose |
| | | 0.05 | lt. peach | pink | pink |
| | | 0.005 | clear | white | white |

TABLE 7

| Nucleating agent | Particle size (m) | Concentration % (m/m) | % Recrystallized after cooling to | |
|---|---|---|---|---|
| | | | room temperature for 15 min. (after heating to 38° C.) | −6° C. (cooling time) after heating to 55° C.) |
| Aerosil 380 | 10 | 0.1 | 6 | 86 (10 min) |
| Lichrosorb RP8 (Merck, Germany) chemically modified silica | 5 | 0.1 | 1 | 95 (10 min) |
| 399 magnesium silicate (Talc IT extra 5 micron) (Elvers Netherlands) | 5 | 0.1 | 0 | 100 (10 min) |
| (Whittaker, Elmer & Danials S. Plainfield, N.J.) | | 1 | 9 | 100 (10 min) |
| Talc Mistron Super Frost (Cyprus Ind. Minerals Corp.) | 2 | 0.1 | 1 | 100 (10 min) |
| | | 1 | 1 | 100 (10 min) |
| | | 2.5 | 0 | 100 (10 min) |
| | | 5 | 3 | 100 (10 min) |
| Boron, amorphoos (Starck, Germany) | 0.05 | 0.1 | 3 | 93 (40 min) |
| Titanium carbide (Starck, Germany) | 0.05 | 0.1 | 2 | 100 (20 min) |
| Diamond (Spring A.G., Switzerland) | 2-4 | 0.1 | 1 | 95 (20 min) |
| Boron, crystalline (Starck, Germany) | 0.05 | 0.1 | 1 | 98 (20 min) |
| Molybdenium disulphide (Fluka A.G., Switzerland) | abt. 10 | 0.1 | 1 | 95 (10 min) |
| Alumina (Tonerde) (Dujardin, Germany) | 0.25 | 0.1 | 0 | 100 (10 min) |
| Porous alumina (Lichrosorb Alox T) | 5 | 0.1 | 0 | 100 (20 min) |
| none | — | — | 2 | 30 (10 min) |
| | | | | 46 (60 min) |

EXAMPLE 15

This example demonstrates the use of insoluble nucleating agents in a temperature-indicating device in order to render the composition of matter recrystallizable at a predetermined temperature.

A number of cavities formed in an aluminium carrier layer were filled with a mixture of ortho-bromonitrobenzene and ortho-chloronitrobenzene (mass ratio 3:1), containing 0.025 mass % of pinacyanol iodide to which different amounts of nucleating agents had been added. The cavities thus filled were provided with a heat-sensitive transparent Surlyn 1652 film (E. I. DuPont de Nemours & Company) laminated to a polyester film (Melinex ICI).

After recrystallization of the chemicals at $-40°$ C., the indicating device was heated for one hour at about 55° C. (imitation of storage at high temperatures).

The indicating device was cooled at $-6°$ C. and the percentage of cavities in which the mixture has recrystallized was determined.

In a second series the indicating device containing recrystallized mixtures, was heated in a water bath for 45 seconds just above the melting point of the chemicals (abt. 38° C.) in order to imitate a measurement of the temperature of the human body.

Then the indicating device was cooled to room temperature and the percentage of cavities in which the chemicals has crystallized was determined.

For comparison, cavities were filled with the same OBNB/OCNB mixture containing 0.025 mass % pinacyanol iodide but without nucleating agents.

The results are presented in Table 7.

It appears that whereas the addition of a nucleating agent favorably influences the recrystallization at $-6°$ C., it does not affect the undercooling at room temperature.

EXAMPLE 16

This Example demonstrates the use of a pretreated aluminium carrier layer for rendering the composition of matter recrystalizable at a predetermined temperature. An aluminium carrier layer provided with cavities was passivated by cleaning the aluminium with acetone, pickling in a 2% solution of sodium hydroxide, subsequent pickling in 10% nitric acid and immersion in boiling water for 5 minutes. The cavities were filled with a mixture of ortho-chloronitrobenzene and ortho-bromonitrobenzen (mass ratio 1:3) containing 0.025 mass % of pinacyanol iodide. The filled cavities were further treated as described in Example IX. For comparison, cavities formed in untreated aluminium were filled with the above-mentioned mixture and treated in a similar way.

The results are given in Table 8.

TABLE 8

| | % Recrystallized after cooling to | |
|---|---|---|
| Treatment | room temperature for 15 min. (after heating to 38° C.) | $-6°$ C. (cooling time) after heating to 55° C. |
| none | 2 | 30 (10 min) |
| | | 46 (60 min) |
| passivation | about 5 | 100 (30 min) |

EXAMPLE 17

A transparent polyester film (Melinex, supplied by (ICI) provided with an adhesive layer of polyisobutylene is pressed together with an aluminium layer foil. As a measure of the adhesive strength is taken, the force in g/cm which is required to peel the polyester film off the aluminium foil at a rate of 30 cm/minute. This force should be at least about 150 g/cm.

The influence on the magnitude of the peeling force has been investigated of the nature of the aluminium surface (rough, smooth, etched), the type of polyisobutylene (molecular weight, mixture) and bonding pressure (5 and 50 kg/cm$^2$).

The polyisobutylene types used have been obtained from BASF, Ludwigshafen, W. Germany and are marketed under the trade name Oppanol. The results are listed in Table 9.

TABLE 9

| | Peeling force in g/cm | | | | | | | | | |
|---|---|---|---|---|---|---|---|---|---|---|
| Pretreatment of | PIB1 | | PIB2 | | PIB3 | | PIB4 | | PIB5 | |
| aluminium foil | A | B | A | B | A | B | A | B | A | B |
| Rough surface 1 | 550 | 600 | 400 | 600 | 100 | 150 | 20 | 20 | 400 | 450 |
| Smooth surface etched: | 600 | 600 | 600 | 600 | 150 | 200 | 100 | 130 | 400 | 450 |
| Rough surface 2 | 600 | 600 | 600 | 600 | 100 | 240 | 40 | 120 | — | — |
| Smooth surface coated: | 600 | 600 | 600 | 600 | 250 | 330 | 200 | 300 | — | — |
| Rough surface 3 | 400 | 400 | 400 | 400 | 400 | 400 | 400 | 400 | — | — |
| Smooth surface | 300 | 300 | 300 | 300 | 300 | 300 | 300 | 300 | — | — |

A = used bonding force 5 kg/cm$^2$
B = used bonding force 50 kg/cm$^2$
1 rough surface: mechanically roughened;
2 etched: pretreatment with a solution of sodium metasilicate in water;
3 coated: surface layer Oppanol B 150, thickness 5$\mu$
PIB1: Oppanol B15, average mol. wt. 77–92.10$^3$;
PIB2: Oppanol D3061, average mol. wt. about 140.10$^3$;
PIB3: Oppanol B50, average mol. wt. 340–480.10$^3$;
PIB4: Oppanol B150, average mol. wt. 2.3–3.3.10$^6$;
PIB5: mixture of Oppanol B15/B150 (1:1).

EXAMPLE 18

Of polyisobutylene the permeability is investigated for the chemicals used in the temperature-indicating device. Polyisobutylene films are formed from a solution disposed on paper. The films thus obtained are made into bags of about 60 cm which are filled with 2.5 grams of a mixture of ortho-chloronitrobenzene and ortho-bromonitrobenzene (weight ratio 62:38) and sealed. After being weighed, the bags are stored at 32° C. in a room with air circulation and after different periods the loss of weight is determined.

The results are summarized in Table 10.

TABLE 10

| Sample | Loss of weight in mg/h/μ/cm$^2$ |
|---|---|
| PIB1 | 0.12 |
| PIB2 | 0.14 |
| PIB3 | 0.17 |
| Surlyn 1652 (control) | 1.05 |

The designations PIB1, PIB2 and PIB3 have the same meaning as in Example XV. For comparison, mention is made of the result obtained with a film (thickness about 45μ) of an ionomeric adhesive Surlyn 1652. It appears that the polyisobutylene samples are far less permeable than the ionomeric adhesive.

EXAMPLE 19

Cavities formed in an aluminium carrier layer are filled with mixtures of ortho-chloronitrobenzene and orthobromonitrobenzene and sealed with a cover layer of polyester film provided with a polyisobutylene adhesive layer. The test objects thus obtained are stored at 20° C. and 32° C. and examined under a stereo microscope to establish whether the chemicals dissolve in the adhesive layer disappear from their cavities or become liquid.

Observations were taken for 40 days. The results are given in Table 11.

TABLE 11

| Sample | Observations |
|---|---|
| PIB1 | After a few days viscous deformation of the glue layer occurs at 20° C. No leaking away or dissolving of the chemicals after 40 days at 32° C. |
| PIB2 | No leaking away or dissolving of the chemicals after 40 days at 32° C. |
| PIB3 | After a few days slight viscous deformation of the polyisobutylene occurs at 20° C. At the end of the observation period some leaking away of chemicals as a result of the polyisobutylene becoming detached from the aluminium. |
| PIB4 | After 40 days at 32° C. no viscous deformation occurs. No leaking away or dissolving of chemicals in those places where the adhesion between aluminium and polyisobutylene has been maintained. In a few places the polyisobutylene layer has become detached from the aluminium and chemicals have leaked away there. |

From this table it appears that the chemicals neither leak away or dissolve, provided that the adhesion to the aluminium foil is kept up.

High molecular weight polyisobutylene (PIB4) is the least liable to viscous deformation.

EXAMPLE 20

In this example the reproducibility of the temperature indication is demonstrated. A number of cavities formed in an aluminium carrier layer are filled with a series of mixtures of ortho-chloronitrobenzene, ortho-bromoitrobenzene and 0.1% by weight of orasol blue BLN (solvent blue 49), whose melting temperatures progressively increase by 0.1° C. The cavities thus filled are covered with Whatman chromatography paper No. 1 and subsequently sealed with a polyester film (Melinex) provided with a pressure-sensitive adhesive layer of polyisobutylene. The polyisobutylene used is a mixture of equal parts of Oppanol B15 (average molecular weight 77,000–92,000) and Oppanol B100 (average molecular weight 1.08–1.46×10$^6$). The test objects are stored at 28° C. and after 3, 7 and 10 weeks, respectively, placed in a water bath of a particular temperature to measure the temperature at which discoloration of the indicator layer takes place.

The results obtained as average values of the 4 temperature indicating devices are listed in Table 12.

TABLE 12

| | | Temperature at which discoloration occurs (°C.) |
|---|---|---|
| After | 0 weeks | 36.40 |
| | 3 weeks | 36.45 |
| | 7 weeks | 36.48 |
| | 10 weeks | 36.50 |

It appears that the temperature indication as a function of time does not or hardly undergo any change.

EXAMPLE 21 (comparative)

A number of known adhesives with which an adhesive layer can be formed at room temperature are examined in the way described in Example XIX. The aluminium foil used has previously been etched. From the results summarized in Table 13 it appears that of the adhesives examined, which all fall beyond the scope of the present invention, none are suitable to be used for the present purpose envisaged.

TABLE 13

| Adhesive | Solvent | Cover layer | Curing or drying time (min) | Observations |
|---|---|---|---|---|
| Epoxide, coating thickness 10 Ceta Bever | none | polyester | 3–14 | Influence of curing time: 3–6 min: chemicals turn liquid; 13–14 min: poor adhesion to aluminum; 3–13 min: after 2 days at 32° C. chemicals have dissappeared (dissolved in adhesive layer). |
| Epoxide, coating thickness 10 Araldite Ciba-Geigy | none | polyester | 5–45 | Influence of curing time: 5–25 min: chemicals turn liquid; 25–35 min: after 4 days at 20° C. yellowing and disappearing of chemicals. |
| Bi-component polyurethane Adcote 301A/350 Morton-Williams PUR 2837, Ciba-Geigy | methyl-ethyl ketone | polyester | solvent evaporated at 50° C. | Influence of drying time: 2.5–4.5 hours: after 4 days at 32° C. chemicals disappear; 4.5 hours: poor adhesion to aluminium. |
| Silicone RTV 108 General Electric is affected by | none | cellophane | 0–45 | 0–30 min: chemicals turn liquid; 45 min: poor adhesion to aluminium; 30–45 min: after 7 days at 20° C. |

TABLE 13-continued

| Adhesive | Solvent | Cover layer | Curing or drying time (min) | Observations |
|---|---|---|---|---|
| | | | | moisture chemicals disappear |
| Silgrip 574 General Electric pressure-sensitive glue (silicones) | none | polyester | none | After 3 days at 20° C.: chemicals turn liquid and dissolve in the glue layer |
| Polyvinyl alcohol Elvanol 71-30 DuPont | water | cellophane | solvent evaporated at 20° C. | After the water had been entirely removed, adhesion between polyvinyl alcohol and aluminium was insufficient with all samples. |

Suppliers of dyes used in our invention:

Eastman Kodak (E.K.) Rochester, New York acridine yellow, Azure A TM, B TM and C TM, 4,4'bis(2-amino-1-naphthyl-azo) -2,2'-stilbene disulfonic acid, 4,4'-bis(4-amino-1-naphthyl-azo) -2,2'-stilbene disulfonic acid, quinaldine red, Chlorasol Black E TM, 4,5'-dibromofluorescein, 1,1-diethyl-2,2'-cyanine iodide, 5-(p-dimethylaminobenzylidine) rhodamine, p-(p-dimethylaminophenylazo)-benznoic acid sodium salt, 4-(4-dimethylamino-1-naphthylazo)-3-methoxybenzene-sulfonic acid, 2-(p-dimethylaminostyryl)-1-ethyl-pyriolinium iodide, 4-(p-ethoxyphenylazo)-bis- phenylenediamine monohydrochloride, Ethyl Eosin TM, Gallein TM, Methylene Violet TM, Naphthol Yellow S TM, Nile Blue A TM Merck 6100 Darnstadt, W. Germany acridine orange, Alizarine Yellow GG TM, Alizarine Yellow R TM, alizarine sulfonic acid sodium salt, alkali blue, amaranth, auramine, aurintricarboxylic acid ammonium salt, Azarcarmine B TM, benzyl orange, Brilliant Cresyl Blue TM, Calcon TM, chlorophenol red, Diamine Green B TM, fast yellow, Eriochrome Cyanine R TM, Evans Blue TM, phloxine, fuchsin, fuchsin NB TM, yellow orange S TM, cresol red, curcumin, methyl green, methyl red sodium salt, murexide, Orange GGN TM, Patent Blue V TM, Ponceau 6R, Rhodamine B TM, Rhodamine 6G TM, safranin, Salicyl Yellow TM, Thioflavine TCN TM, thionin, Trypan Blue TM Matheson, Coleman & Bell (M.C. & B.) Box 85, E. Rutherford, N. J.

acridine red, Alizarine Blue Black B TM, Aniline Yellow TM, Anthraquinone Violet R TM, Benzo Fast Pink 2 Bl TM, Benzopurpurin 4B TM, quinoline yellow (spirit soluble), Chromolan Yellow TM, Crocein Scarlet MOO, 3B TM, fast yellow, Fast Green G TM, Fast Green FCF TM, Erichrome Black A TM, Erythrosin Yellowish Blend TM, ethyl-violet, methyl violet base, Naphthalene Green V TM, Oil Red EGN TM, Patent Blue TM, Ponceau G, R, 2R TM, Ponceau 3R TM, prussian blue, resorsin brown, Victoria Blue R TM ICN - K&K 121 Express St., Plainview, New York acridlavine, Alizarine Brilliant Blue BS TM, alizarine viridin, amethyst violet, Bindschedler's Green TM, Capri Blue TM, celestine blue, china yellow, ciba blue, Coriphosphine O TM, Cyanosin B TM, diamond black, Eriochrome Blue SE TM, 4-phenylazo-1-naphthylamine, phenylene blue, gallamine blue, Gallocyanine TM, induline, (alcohol or water soluble), Iris Blue, magdala red, neutral red (iodide), neutral violet, new green, Oil Blue N TM, proflavine, resazurin, rhoduline violet, rivanol, solway purple, Thioindigo Red TM, Violamine 3B TM, Acid Alizarine Blue BB TM Fluka, CH-9470 Buchs, Switzerland alizarine, aurankia, azophloxine, Azocarmine g TM, Bismarck brown G TM, Bismarck Brown R TM, brilliant green, quinalizarin, quinoline yellow, Chromazurol S TM, Chromotrope 2B TM, Chrysoidine G TM, Chrysoidine R TM, dichlorofluorescein, Fast Violet Salt, Eosin Yellowish, Eosin Scarlet, Eriochrome Blue Black B TM, Eriochrome Red B TM, Erythrosin Extra Bluish TM, Indigo Synthetic TM, induline (water soluble), Light Green SF yellowish TM, methylene green, Naphthol Blue Black B TM, 2-nitroso-1-naphthol, 1-nitroso-2-naphthol, Orange I TM, Orange II TM, Orange G TM, parafuchsine, Ponceau BS TM, Ponceau S TM, Pyronin G TM, guercetin dihydrate, Scarlet R TM, SNADNS, Sudan III TM, Thiazine Red R TM, Fat Black, Victoria Blue B TM, Water blue, acid fuchsin, Fast Red Salt RC and B and 3GL TM, Fast Blue Salt BB and B TM, Fast Garnet Salt GBC TM Hopkins & Williams (H&W) St. Cross Street, London, England Alizarine Blue S TM, Alizarine Cyanine 2R TM, alkanin, Anthracene Blue 2R TM, anthrapurpurin, brazilin, Chromotrope 2R TM, purpurin, rosolic acid Carl Roth, Postfach 210980, D-7500 Karlsrube, W. Germany quercitrin dihydrate Baker, Postbus 1, Deventer, Netherlands Alizarin Red S TM, Alkali Blue 6B TM, bromophenol blue, bromocresol green, bromocresol purple, Eriochrome Black T TM, phenosafranin, hematoxyline, indigo carmine, metanil yellow, methylene blue, methyl orange, Naphthol Green B TM, neutral red (chloride), Oil Red O TM, Orange IV TM, Rhodamine B base TM, Sudan III TM, Tropaeolin O TM, Xylene Cyanol FF TM, congo red Y. D. Towers & Co. Liverpool, England malachite green Serva, Heidelberg, W. Germany Toluidine Blue O TM Sandoz, Basel, Switzerland Artisil Yellow F-L TM, Carta Yellow G 180 o/o TM, Sandorin Bordeaux 2RL TM, Sandorin Green GLS TM, Sandorin Violet BL TM, Savinyl Blue B TM, Savinyl Blue GLS TM, Savinyl Blue RS TM, Savinyl Green B TM, Savinyl Red BLSN, Savinyl Fire Red 3 GLS TM, Solar Turquoise Blue GGL 160 o/o TM I. G. Farben Frankfurt A.M., Germany Rose Bengal TM, tartrazin Holliday Frankfurt A.M., Germany brilliant ponceau 5R BASF Ludwigshafen, W. Germany Celliton Blue Extra TM, Celliton Fast Blue FFG TM, Sudan red G TM Bayer Leverkusen, W. Germany Ceres Blue R TM, Ceres Yellow 3R TM, Ceres Orange R TM, Ceres Red B TM Koninklyke pharmaceutische Fabriek, Stationswig 39/41, Meppel, Netherlands
  cochenille Ciba-Geigy, Basle, Switzerland Cromophthal Blue A3R TM, Cromophthal Boroleaux RS TM, Cromophthol Red A3B TM, Irgalith Blue GLSM TM, Irgalith Blue TNC TM, Irgalith Green BLN TM, Irgalith Green DBN TM, Irgalith Magenta TCB TM, Irgalith Red P4R TM, Irgalith Pink TYNC TM, Irgalith Violet MNC TM, Orasol Blue BLN TM, Orasol Blue 2GLN TM, Orasol Brilliant Blue GN TM, Orasol Navy Blue 2RB TM, Orasol Orange RLN TM, Orasol Red G TM, Solophenyl Brilliant Blue BL TM, Solophenyl Red 3BL TM, Solophenyl Turquois Blue GRL TM, Terasil Yellow 2GW TM American Cyanamid Bound Brook, New Jersey
  D & C Green 6 TM Ciba T Basle, Switzerland
  Deorlene blue 5G TM Amsterdamsche Clininefabrick (A.C.F.) Amsterdam, Netherlands
  Dimethyl yellow, crystal violet, methyl violet, Tropaeolin OO TM Geigy Basle, Switzerland
  Eriochrome Azurol B TM British Drug Houses (B.D.H.) Poole, Dorset, England
  Erioglaucine, Janus Green, morin, Titanium Yellow Edward Gurr, 42 Upper Richmond Rd., London England
  nigrosine, Sudan Red 7B TM Sandoz, Basle, Switzerland
  Nitro Fast Blue 3GDB TM, Nitro Fast Green GSB TM, Fat Red BS TM Ugine Kuhlmann, Paris, France
  Organol Blue VIFYN TM, Organol Yellow GR TM, Organol Orange 2R TM Miscellaneous
  brilliant yellow
  cryptocyanine*
  phloxine B*
  fluourescein sodium salt (prepared from Merck fluorescein)
  phthalocyanine*

These dyes may be obtained through local suppliers, including Eastman Kodak.

EXAMPLE 22

In a further preferred embodiment for the clinical thermometers of the invention, one of the novel compositions of matter is solidified, ground to a very fine powder, and dispersed in a solution of polymer resin. A preferable polymer resin is polyvinyl alcohol.

The polymer resin is selected based upon (1) compatability with the novel temperature-indicating composition of matter, and (2) by the non-solubility of the temperature-sensing composition of matter in either the resin or the solvent for the resin. All components of the novel temperature-indicating composition of matter must be insoluble in the resin and in the resin and solvent. A preferred example is a system which uses polyvinyl alcohol for the polymer resins, water as a solvent, and a novel composition of matter consisting of ortho-bromonitrobenzene/ortho-chloronitrobenzene solid solution with pinacyanol iodide added to the ortho-bromonitrobenzene and ortho-chloronitrobenzene as hereinbefore described.

For some applications it is desirable to have a temperature-indicating composition which is easily reversible. Such a reversible composition nature can be obtained by mixing a suitable nucleating agent, preferably talc, with the novel composition of matter before solidifying and grinding, or by dispersing the nucleating agent in the resin solution separately from the novel composition of matter particles.

For some applications such as human clinical temperature taking, it is desirable to prevent the patent's saliva from dissolving the polyvinyl alcohol or other water-soluble polymer resin. This can be accomplished by applying a layer of pressure sensitive composition packages or by applying a separate coating of polymer resin which is not water soluble.

In any event, the dispersed solution is deposited on an aluminum or plastic backing sheet, which may or may not have pockets, after which the water of the solution is evaporated, leaving a water-soluble mass of polymer with dispersed novel composition of matter particles therewithin.

The advantages of using such a novel composition temperature sensing package are as follows: first, the display in a cavity such as FIG. 7 is, from above, a full circle of color, but also the dispersed solution can be applied in other geometrys to form messages, words, numbers and the like. Another advantage is that the system is very insusceptible to nucleation occurring in the supercooled liquid. This is because within each dot of a matrix thermometer there are thousands of small pools of super-cooled liquid, each one separate from the other. A nucleation event occurring in one pool of chemical does not affect the other pools of chemical. Thus the indication of temperature is much more stable and controllable than in those systems which utilize one large pool of novel composition of matter for each point on the matrix of the thermometer.

In order to utilize these novel composition of matter packages to construct the thermometer, it is necessary to provide a means for depositing very small quantities of this material onto the backing. Such a system as is currently used in thermometer machines known to those in the art. Such a system for applying the dispersed solution to a template having cavities such as backing 44 of FIG. 12 consists of a syringe pump such as a Sage model 371 syringe (Sage Instruments Inc. Div. of Orion Research Corp., Cambridge, Mass.) pump. The output of the syringe pump is directed through tubing to a fill head as previously described. The Sage syringe pump output rate is adjusted by changing gears, motor speed, etc., until the output of the pump equals the uptake of the backing material. In operation, the flow of the material would be continuous, and at the fill tip a small droplet of material would begin to form at the start of each cycle. The droplet would grow in size, but would be smaller in size than would be required for gravity acting upon the droplet to cause the drops to fall off. As the filling cycle continues, the filling head is brought very close to the backing material and the growing droplet touches the backing material, wets the backing material, and the fluid flows off the pin. The fill cycle continues as the head is raised away from the backing material and the growth of a new droplet begins to take place on each fill pin.

EXAMPLE 23

In yet another preferred embodiment, a polymeric resin, generally a water-soluble polymeric resin, is applied as a coating film to the top of pockets (58 of FIG. 13) which have already been partially filled with the novel compositions of matter. The thermometer is then allowed to stand until all the solvent has evaporated away. As a further preferred embodiment, a covering pressure sensitive adhesive tape can be applied on top of the coating.

The preferred polymer material for casting upon the thermomerter is a water soluble polymer such as polyvinyl alcohol (99 to 100% hydrolized). The solvent for polyvinyl alcohol is water. A second preferred polymer resin is polyisobutylene cast from a solution of aliphatic hydrocarbon solvent.

The covering pressure sensitive adhesive tape can be a polyisobutylene coated polyester or the like or Permacel's J-Lar 910 TM (The Permacel Co., New Brunswick, N. J., a division of Johnson & Johnson). The pressure sensitive adhesive tape covering provides additional strength and durability protecting the coating covering the film from disruption and abrasion. Also in applications for human clinical thermometry, the covering layer of pressure sensitive adhesive tape prevents the water soluble resins such as polyvinyl alcohol, from dissolving in the patient's saliva or in the water used in test bath apparatus.

It has also been found that such a thermometer has vastly improved regenerative properties when a nucleating agent for the novel composition of matter is added to the solution of coating resin. Thus, then the novel composition of matter is pinacyanol iodide dissolved in ortho-bromonitrobenzene:ortho-chloronitrobenzene solid solutions, the nucleating agent talc (Whittaker, Clark & Daniels, South Plainfield, N. J. #399 magnesium silicate) is added to the solution of the coating resin before application to the thermometer. The thermometers made in this fashion will show complete recrystallization within 18 hours at 0° C. Thermometers constructed as above but without addition of talc will have only about 25% of the pockets recrystallized within 18 hours at 0° C.

EXAMPLE 24

The following Table gives further results of possible Group III compounds:

TABLE 14

| Compound | Solvent | Concentration | Liquid | Color Quick Cooling | Slow Cooling |
|---|---|---|---|---|---|
| Jenner Stain MCB JX15 | OBNB/OCNB 3:1 | 0.5 | deep purple | deep purple | deep purple |
|  |  | 0.05 | purple | purple | purple |
|  |  | 0.005 | bluish purple | grayish purple | graish pur. |
| Coomassie Brilliant Blue R | OBNB/OCNB 3:1 | 0.5 | blue | green blue | green blue |
|  |  | 0.05 | green | green | green |
|  |  | 0.005 | lime green | lime green | lime green |
| Chrysoidine Y,G* MCB CX 1650 | OBNB/OCNB 3:1 | 0.5 | reddish-brown | reddish-brown | reddish-brown |
|  |  | 0.05 | burnt orange | deep yellow | deep yellow |
|  |  | 0.005 | yellow | yellow | yellow |
| Calmagite* MCB CX323 | OBNB/OCNB 3:1 | 0.5 | brown | brown | brown |
|  |  | 0.05 | light brown | light brown | light brown |
|  |  | 0.005 | yellow | yellow | yellow |
| Azure A Bosinate* MCB AX 1880 | OBNB/OCNB 3:1 | 0.5 | blue | purple blue | dark purple |
|  |  | 0.05 | blue | purple blue | purple |
|  |  | 0.005 | blue | grayish purple | grayish pur. |
| Celestine Blue* MCB CX573 | OBNB/OCNB 3:1 | 0.5 | dk. blue-green | drab blue | olive green |
|  |  | 0.05 | blue | blue | dk. gr-blue |
|  |  | 0.005 | lt. blue-green | lime green | blue-green |
| Methyl Violet 2B MCB MX 1545 | OBNB/OCNB 3:1 | 0.5 | royal blue | purple | purple |
|  |  | 0.05 | navy blue | purple | royal blue |
|  |  | 0.005 | blue | blue purple | blue |
| Rhodamine 6G | OBNB/OCNB 3:1 | 0.5 | dk. fluorscent | deep raspberry | deep rose |
|  |  | 0.05 | pink | raspberry | rose |
|  |  | 0.005 | orange | orange | orange |
| Methylene Green MCB MX1020 | OBNB/OCNB 3:1 | 0.5 | dk. green-blue | dk. navy blue |  |
|  |  | 0.05 | green blue | green blue |  |
|  |  | 0.005 | bluish green | green |  |
| Crystal Violet MCB CX2095 | OBNB/OCNB 3:1 | 0.5 | royal blue | purple | purple |
|  |  | 0.05 | navy blue | purple | purple |
|  |  | 0.005 | blue | purple | purple |
| Gentian Violet MCB Gx55 | OBNB/OCNB 3:1 | 0.5 | royal blue | purple | purple |
|  |  | 0.05 | navy blue | purple | purple |
|  |  | 0.005 | blue | pink purple | pink purple |
| Azure B MCB AX1885 | OBNB/OCNB 3:1 | 0.5 | dk. green blue | purple | purple |
|  |  | 0.05 | green blue | purplish blue | purple blue |
|  |  | 0.005 | green | pale greyish pur. | green |
| Methylene Blue | OBNB/OCNB 3:1 | 0.5 | deep blue | indigo |  |
|  |  | 0.05 | greenish blue | purple blue |  |
|  |  | 0.005 | green | lt. purplish blue |  |
|  | OBNB/OCNB 3:1 | 0.5 |  |  |  |
|  |  | 0.05 |  |  |  |
|  |  | 0.005 |  |  |  |
|  | OBNB/OCNB 3:1 | 0.5 |  |  |  |
|  |  | 0.05 |  |  |  |
|  |  | 0.005 |  |  |  |
| Methylene Blue | OBNB/OCNB 3:1 | 0.5 |  |  |  |
|  |  | 0.05 |  |  |  |
|  |  | 0.005 |  |  |  |
|  | OBNB/OCNB 3:1 | 0.5 |  |  |  |
|  |  | 0.05 |  |  |  |

TABLE 14-continued

| Compound | Solvent | Concentration | Liquid | Color Quick Cooling | Slow Cooling |
|---|---|---|---|---|---|
| | | 0.005 | | | |
| | OBNB/OCNB 3:1 | 0.5 0.05 0.005 | | | |
| | OBNB/OCNB 3:1 | 0.5 0.05 0.005 | | | |
| | OBNB/OCNB 3:1 | 0.5 0.05 0.005 | | | |

We claim:

1. A composition of matter exhibiting a sharp color change upon transition from a liquid state to a solid state of from a solid state to a liquid state capable of being supercooled for at least several minutes, and substantially free of impurities, consisting essentially of:
   (a) a solvent adapted to change from a solid state at substantially a predetermined temperature to a liquid state; and
   (b) an effective amount of one or more suitable organic moieties dissolved in and inert towards said solvent to form a solid solution when the composition is in the solid state, and adapted to change the color of the composition visible to the naked eye upon the change in state at substantially the predetermined temperature when so dissolved, and selected from one of the groups consisting of:
   (1) one or more of a Group III body of compounds consisting of pinacyanol iodide, 1,1'-diethyl-2,2'-cyanine iodide, quinaldine red, pinacyanol chloride, thionin, methylene blue, cresol red, chlorophenol red, neutral red iodide, neutral red chloride, crystal violet, acridin orange, Orasol Orange RLN TM, Orasol Navy Blue TM, Irgalith Red PR TM, Fat Red BS TM, Xylene Cyanol FF TM, Rhodamine B TM, Rhodamine 6G TM, Irgalith Magneta TCB TM, Irgalith Pink TYNC TM, Toluidine Blue O TM, Savinyl Green B TM, Savinyl Blue RS TM, purpurin, 3,3'-diethylthiadicarbocyanine iodide, cryptocyanine, Dicyanine A TM, Merocyanine 540 TM, 4-(p-ethoxyphenylazo)-m-phenylene diamine monohydrochloride, Yellow Orange S TM, Chrysoidan G TM, fuchsin, aurintricarboxylic acid (ammonium salt), Victoria Blue R TM, Pyronin G TM, gallein, Erythrosin Yellow Blend TM, chlorophenol blue, bromophenol blue, bromocresol purple, Coriphosphine O TM, acriflavine, acridine orange, rhoduline violet, Alizarin cyanin 2R TM, Alizarin Red S TM, alcannin, Aurantia, Direct Green G TM, Fast Red Salt 3GL TM, Fast Blue Salt BB TM, Fast Garnet Salt GBC TM, Carta Yellow G 180 o/o TM, Murexide, Savinyl Blue GLS TM, Irgalith Blue GLSM TM, phthalocyanine, Di Amingreen B TM, Alizarin Blue S, Celliton Blue Extra TM, neocyanine, Janus Green TM, dimethyl yellow, Fast Yellow TM, methyl red sodium salt, Alizarin Yellow R TM, Eriochrome Black T TM, Chromotrope 2R TM, Ponceau 6R TM, Brilliant Ponceau G/R/2R TM, chromolan yellow, Sudan Red B TM, Bismarck brown G TM, Fat Black TM, Resorcin Brown TM, Benzofast Pink 2BL TM, Oil Red EGN TM, Euroglaucine, Fuchsin NB TM, parafuchsin, Patent Blue TM, Irgalith Blue TNC TM, Phloxin B TM, fluorescein sodium salt, Rhodamine B base TM, Eosin Scarlet, Eosin Yellowish TM, Erythrosin extra bluish, 4,5-dibromofluorescein, ethyleosin, Phloxine TM, Cyanovin B TM, chlorocresol green, pinacyanol bromide, 2-(p-dimethylaminostyryl)-l-ethyl pyridinium iodide, ethyl red, nigrosine, Savinyl Blue B TM, Orasol Blue BLN TM, Safranin O TM, Azocarnum G TM, Phenosafranine TM, Azocarmine BX TM, Solophenyl Brilliant Blue BL TM, Nile Blue A TM, gallocyanine, gallamine blue, celestine blue, methylene green, Azure A/B/C TM, Blue VIF Organol TM, Alizarin, Nitrofast Green GSB TM, quinalizarine, Oil Blue N TM, Solvay purple, Ciba Blue TM, Indigo synthetic TM, Chromophtal Bordeaux RS TM, Acid Alizarin Red B TM, 5-aminoflourescein, Rose Bengal TM, Martius Yellow TM, Chicago Blue 6B TM, Alcian Blue 8GX TM, cresyl violet, 4,4'Bis(dimethylamino)benzylhdrol, zinc Pthalocyanine, Sudan III TM, Pyronin Y TM, Toluylene Blue TM, cresyl violet perchlorate, Mendola's Blue TM, Phosphine Dye, Nitron TM, cresyl violet acetate, Ceres Orange R TM, 4-phenylazo-1-naphtyl-amine, 4-(4-Dimethylamino-1-napthylazo)-3-methoxybenzene sulfonic acid, Bindschedler's Green TM, and p-(p-dimethylaminophenylazo)benzoic acid;
   (2) a binary mixture of:
   (A) one or more of a Group I body of compounds soluble in said solvent consisting of the halogenated sulfonphthaleins and the organic acids having a $pK_1$ less than about four; and
   (B) one or more of a Group II body of compounds consisting of the aminotriphenylmethanes and their soluble salts, 8-hydroxyquinoline, and the cyanines;
   wherein the weight ratio of the Group I body of compounds to the Group II body of compounds is more than or about 3 to 1 and with the proviso that if the Group II compounds consist solely of one or more aminotriphenylmethanes or their soluble salts, then the Group I compound must be selected from one or more of the group consisting of oxalic acid, suitable soluble sulfonic acids, and the tetrahalogenated sulfonphthaleins, and the other organic acids having a $pK_1$ of less than or about 2; and
   (3) one or more of the aforesaid Group III body of compounds with one or more of the Group I or Group II bodies of compounds.

2. The composition of matter recited in claim 1 wherein the change in state is induced by temperature forces for use in a temperature-indicating device.

3. The composition of matter recited in claim 2 wherein (a) the Group I body of compounds are one or more of the group consisting of oxalic acid, bromophenol blue, bromothymol blue, chlorophenol red, bromochlorophenol blue, bromocresol green, 3,4,5,6-tetrabromophenolsulfonphthalein, 2-naphthalenesulfonic acid, trichloroacetic acid, chloroanilic acid, bromophenol red, and chlorocresol green and (b) the Group II body of compounds are one or more of the group consisting of 5(p-dimethylamino benzilidine) rhodoine, ethyl red, crystal violet, pararosaniline, pararosaniline acetate, 3-ethyl-2-[5-(3-ethyl-2-benzothiazolinylidene)-1,3-pentadienyl]-benzothiazolium iodide, basic fuchsin, 8-hydroxyquinoline, ethyl violet, brilliant green, dicyanine, A pinacyanol chloride, 2-(p-dimethytaminostyryl) 1-ethyl-pyridinium iodide, 3,3'-diethylthiodicarbocyanine iodide, and cryptocyanine.

4. The composition of matter recited in claim 3 wherein the weight percentage of organic moieties soluble in the solvent is from about 0.025 to about 0.05% of the weight of the solvent and said soluble organic moieties.

5. The composition of matter recited in claim 3 wherein the predetermined temperature is from about 96° F. to about 105° F.

6. The composition of matter recited in claim 3 wherein the solvent is selected from one or more of the group consisting of ortho-chloronitrobenzene, ortho-bromonitrobenzene, 1-thymol, 2-naphthol, 2-ethoxybenzamide, and naphthalene.

7. The composition of matter recited in claim 3 wherein the solvent is a binary mixture of ortho-chloronitrobenzene and ortho-bromonitrobenzene having a proportion of ortho-chloronitrobenzene to ortho-bromonitrobenzene of about 43.8:56.2 to about 4.0:96.0.

8. The composition of matter recited in claim 3 wherein the Group I compounds consist of the halogenated sulfonphthaleins having a $pK_1$ of about 2 and a $pK_1$ of about 7 to about 9.

9. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of chlorophenol blue and ethyl red dissolved in and inert towards said solvent and adapted to change color of the composition visible to the naked eye upon the change in state at substantially the predetermined temperature when so dissolved.

10. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of bromochlorophenol blue and ethyl violet dissolved in and inert towards said solvent and adapted to change color of the composition visible to the naked eye upon the change in state at substantially the predetermined temperature when so dissolved.

11. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of bromophenol blue and basic fuchsin dissolved in and inert towards said solvent and adapted to change color of the composition visible to the naked eye upon the change in state at substantially the predetermined temperature when so dissolved.

12. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of bromophenol red and brilliant green dissolved in and inert towards said solvent and adapted to change color of the composition visible to the naked eye upon the change in state at substantially the predetermined temperature when so dissolved.

13. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of bromochlorophenol blue and pinacyanol chloride dissolved in and inert towards said solvent and adapted to change color of the composition visible to the naked eye upon the change in state at substantially the predetermined temperature when so dissolved.

14. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of 3,3'-diethylthiadicarbocyanine iodide and bromocresol purple dissolved in and inert towards said solvent and adapted to change color of the composition visible to the naked eye upon the change in state at substantially the predetermined temperature when so dissolved.

15. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of 3,3'-diethylthiadicarbocyanine iodide and bromophenol blue dissolved in and inert towards said solvent and adapted to change color of the composition visible to the naked eye upon the change in state at substantially the predetermined temperature when so dissolved.

16. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of pinacyanol chloride and 3,4,5,6-tetrabromophenolsulfonphthalein dissolved in and inert towards said solvent and adapted to change color of the composition visible to the naked eye upon the change in state at substantially the predetermined temperature when so dissolved.

17. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of pinacyanol chloride and bromocresol purple dissolved in and inert towards said solvent and adapted to change color of the composition visible to the naked eye upon the change in state at substantially the predetermined temperature when so dissolved.

18. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of ethyl red and bromochlorophenol blue dissolved in and inert towards said solvent and adapted to change color of the composition visible to the naked eye upon the change in state at substantially the predetermined temperature when so dissolved.

19. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of pinacyanol chloride and chlorocresol green dissolved in and inert towards said solvent and adapted to change color of the composition visible to the naked eye upon the change in state at substantially the predetermined temperature when so dissolved.

20. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of pinacyanol iodide dissolved in and inert towards said solvent and adapted to change color of the composition visible to the naked eye upon the change in state at substantially the predetermined temperature when so dissolved.

21. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of quinaldine red dissolved in and inert towards said solvent and adapted to change color of the composition visible to the naked eye upon the change in state at substantially the predetermined temperature when so dissolved.

22. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of 1,1'-diethyl-2,2'-cyanine iodide dissolved in and inert towards said solvent and adapted to change color of the composition visible to the naked eye upon the change in state at substantially the predetermined temperature when so dissolved.

23. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:

(a) a solvent adapted to change from a solid state at substantially a predetermined temperature to a liquid state; and (b) an effective amount of a mixture of bromophenol blue and ethyl red dissolved in and inert towards said solvent and adapted to change color of the composition visible to the naked eye upon the change in state at substantially the predetermined temperature when so dissolved.

24. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:

(a) a solvent adapted to change from a solid state at substantially a predetermined temperature to a liquid state; and (b) an effective amount of chlorophenol red dissolved in and inert towards said solvent and adapted to change color of the composition visible to the naked eye upon the change in state at substantially the predetermined temperature when so dissolved.

25. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:

(a) a solvent adapted to change from a solid state at substantially a predetermined temperature to a liquid state; and (b) an effective amount of a mixture of ethyl red and 3,4,5,6-tetrabromophenolsulfonphthalein dissolved in and inert towards said solvent and adapted to change color of the composition visible to the naked eye upon the change in state at substantially the predetermined temperature when so dissolved.

26. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:

(a) a solvent adapted to change from a solid state at substantially a predetermined temperature to a liquid state; and (b) an effective amount of a mixture of ethyl red and bromophenol red dissolved in and inert towards said solvent and adapted to change color of the composition visible to the naked eye upon the change in state at substantially the predetermined temperature when so dissolved.

27. The composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:

(a) a solvent adapted to change from a solid state at substantially a predetermined temperature to a liquid state; and (b) an effective amount of a mixture of ethyl red and bromocresol purple dissolved in and inert towards said solvent and adapted to change color of the composition visible to the naked eye upon the change in state at substantially the predetermined temperature when so dissolved.

28. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:

(a) a solvent adapted to change from a solid state at substantially a predetermined temperature to a liquid state; and (b) an effective amount of a mixture of crystal violet and bromophenol blue dissolved in and inert towards said solvent and adapted to change color of the composition visible to the naked eye upon the change in state at substantially the predetermined temperature when so dissolved.

29. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:

(a) a solvent adapted to change from a solid state at substantially a predetermined temperature to a liquid state; and (b) an effective amount of a mixture of bromochlorophenol blue and brilliant green dissolved in and inert towards said solvent and adapted to change color of the composition visible to the naked eye upon the change in state at substantially the predetermined temperature when so dissolved.

30. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:

(a) a solvent adapted to change from a solid state at substantially a predetermined temperature to a liquid state; and (b) an effective amount of a mixture of naphthalene sulfonic acid and ethyl violet dissolved in and inert towards said solvent and adapted to change color of the composition visible to the naked eye upon the change in state at substantially the predetermined temperature when so dissolved.

31. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:

(a) a solvent adapted to change from a solid state at substantially a predetermined temperature to a liquid state; and (b) an effective amount of a mixture of naphthalene sulfonic acid and crystal violet dissolved in and inert towards said solvent and adapted to change color of the composition visible to the naked eye upon the change in state at substantially the predetermined temperature when so dissolved.

32. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of naphthalene sulfonic acid and ethyl red dissolved in and inert towards said solvent and adapted to change color of the composition visible to the naked eye upon the change in state at substantially the predetermined temperature when so dissolved.

33. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of trichloroacetic acid and cryptocyanine dissolved in and inert towards said solvent and adapted to change color of the composition visible to the naked eye upon the change in state at substantially the predetermined temperature when so dissolved.

34. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of trichloroacetic acid and ethyl violet dissolved in and inert towards said solvent and adapted to change color of the composition visible to the naked eye upon the change in state at substantially the predetermined temperature when so dissolved.

35. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of 3-ethyl-2-[5-(3-ethyl-2-benzothiazolinylidene)-1,3-pentadienyl]-benzothiazolium iodide and trichloroacetic acid dissolved in and inert towards said solvent and adapted to change color of the composition visible to the naked eye upon the change in state at substantially the predetermined temperature when so dissolved.

36. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of chloroanilic acid and basic fuschin dissolved in and inert towards said solvent and adapted to change color of the composition visible to the naked eye upon the change in state at substantially the predetermined temperature when so dissolved.

37. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of chlorophenol red and dicyanine A dissolved in and inert towards said solvent and adapted to change color of the composition visible to the naked eye upon the change in state at substantially the predetermined temperature when so dissolved.

38. A composition of matter exhibiting a sharp color change upon transition from a liquid state to a solid state or from a solid state to a liquid state capable of being supercooled for at least several minutes and substantially free of impurities, to form a solid solution when the composition is in the solid state, consisting essentially of:
(a) a solvent adapted to change from a solid state at substantially a predetermined temperature to a liquid state; and
(b) an effective amount of a mixture of chlorophenol red and cryptocyanine dissolved in and inert towards said solvent and adapted to change color of the composition visible to the naked eye upon the change in state at substantially the predetermined temperature when so dissolved.

39. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of bromochlorophenol blue and dicyanine A dissolved in and inert towards said solvent and adapted to change color of the composition visible to the naked eye upon the change in state at substantially the predetermined temperature when so dissolved.

40. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of 5-p-dimethylaminobenzylidine rhodanine and dicyanine A dissolved in and inert towards said solvent and adapted to change color of the composition visible to the naked eye upon the change in state at substantially the predetermined temperature when so dissolved.

41. A composition of matter exhibiting a sharp color change upon transition from a liquid state to a solid state or from a solid state to a liquid state capable of being supercooled for at least several minutes, and substantially free of impurities, to form a solid solution when the composition is in the solid state, consisting essentially of:
(a) a solvent adapted to change from a solid state at substantially a predetermined temperature to a liquid state; and
(b) an effective amount of a mixture of 5-p-dimethylaminobenzylidine rhodanine and cryptocyanine dissolved in and inert towards said solvent and adapted to change color of the composition visible to the naked eye upon the change in state at substantially the predetermined temperature when so dissolved.

42. A temperature-indicating device comprising a heat conducting carrier having one or more spaced regions defined therein to determine a like number of predetermined temperatures in a predetermined temperature range, said spaced regions containing a like number of different compositions of matter therein, each a solid solution, said carrier having a transparent cover sheet means in sealing engagement therewith, and with a single solid solution being deposited in each of said regions and being associated with a single one of said predetermined temperatures, each composition of matter exhibiting a sharp color change upon transition from a solid state to a liquid state, capable of being supercooled for at least several minutes, and substantially free of impurities, consisting essentially of:
(a) a solvent adapted to change from a solid at substantially the predetermined temperature to a liquid state; and
(b) an effective amount of one or more suitable moieties dissolved in and inert towards said solvent to form a solid solution when the composition is in the solid state, and adapted to change the color of the composition visible to the naked eye upon the change in state at substantially the predetermined temperature when so dissolved, and selected from one of the groups consisting of:
(1) one or more of a Group III body of compounds consisting of pinacyanol iodide, quinaldine red, 1,1'-diethyl-2,2'-cyanine iodide, pinacyanol chloride, thionin, methylene blue, cresol red, chlorophenol red, neutral red iodide, neutral red chloride, crystal violet, acridin orange, Toluidin Blue O TM, Orasol Orange RLN TM, Orasol Navy Blue TM, Irgalith Red PR TM, Fat Red BS TM, Xylene Cyanol FF TM, Rhodamine 6G TM, Rhodanine B TM, Irgalith Magenta TCB TM, Irgalite pink TYNC TM, Toluidine Blue O, Savinyl Green B TM, Savinyl Blue RS TM, purpurin, 3,3'-diethylthiadicarbocyanine iodide, cryptocyanine, Dicyanine A TM, Merocyanine 540 TM, 4-(p-ethoxyphenylazo)-m-phenylene diamine monohydrochloride, Yellow Orange S TM, Chrysoidin G TM, fuchsin, aurintricarboxylic acid (ammonium salt), Victoria Blue R TM, Pyronin G TM, gallein, Erythrosin Yellow Blend TM, chlorophenol blue, bromophenol blue, bromocresol purple, Coriphosphine O TM, acriflavine, acridine orange, rhoduline violet, Alizarin Cyanin 2R TM, Alizarin Red S TM, alcannin, Aurantia, Direct Green G TM, Fast Red Salt 3GL TM, Fast Blue Salt BB TM, Fast Garnet Salt GBC TM, Carta Yellow G 180 o/o TM, murexide, Savinyl Blue GLS TM, Irgalith Blue GLSM TM, phthalocyanine, Di Amingreen B TM, Alizarin Blue S, Celliton Blue Extra TM, neocyanine, Janus Green, dimethyl yellow, Fast Yellow, Methyl red sodium salt, Alizarin yellow R TM, Eriochrome Black T TM, Chromotrope 2R TM, Ponceau 6R TM, Brilliant Ponceau G/R/2R TM, chromolan yellow, Sudan Red B TM, Bismarck brown G TM, Fat Black TM, Resorcin Brown TM, Benzofast pink 2BL TM, Oil Red EGN TM, Euroglaucine, Fuchsin NB TM, parafuchsin, Patent Blue TM, Irgalith Blue TNC TM, Phloxin B TM, fluorescein sodium salt, Rhodamine B base TM, Eosin Scarlet, Esoin Yellowish TM, Erythrosin extra bluish 4,5-dibromofluorescein, ethyleosin, Phloxine TM, Cyanovin B TM, chlorocresol green, pinacyanol bromide, 2-(p-dimethylaminostyryl)-1-1-ethyl pryidinium iodide, ethyl red, neutral red iodide, nigrosine, savinyl blue B TM, Orasol Blue BLN TM, Safranin O TM, Azocarnun G TM, Phenosafranine, Azocarmine BX TM, Solophenyl Brilliant Blue BL TM, Nile Blue A TM, gallocyanine, gallamine blue, celestine blue, methylene green, Azure A/B/C TM, Blue VIF Organol TM, Alizarin, Nitrofast Green GSB TM, quinalizarine, Oil Blue N TM, Solvay purple, Ciba Blue TM, Indigo synthetic TM, Chromophtal Bordeaux RS TM, Acid Alizarin Red B TM, 5-Aminoflourescein, Rose Bengal TM, Martius Yellow TM, Chicago Blue 6B TM, Alcian Blue 8GX TM, Cresyl violet, 4,4'Bis(dimethylamino)-benzylhdrol, Zinc Pthalocyanine, Sudan III TM, Pyronin Y TM, Toluylene Blue TM, cresyl violet perchlorate, Mendola's Blue TM, Phosphine Dye, Nitron TM, cresyl violet acetate, Ceres Orange R TM, 4-phenylazo-1-naphtyl-amine, 4-(4-Dimethylamino-1-napthylazo)-3-methoxybenzene sulfonic acid, Bindschedler's Green TM, p-(p-dimethylaminophenylazo) benzoic acid;
(2) a binary mixture of:
(A) one or more of a Group I body of compounds soluble in said solvent consisting of the halogenated sulfonphthaleins and the organic acids having a $pK_1$ of less than or about four; and
(B) one or more of a Group II body of compounds consisting of the aminotriphenylmethane and their soluble salts, 8-hydroxyquinoline, and the cyanines;
with the proviso that if the Group II compounds consist solely of one or more aminotriphenylmethanes or their soluble salts, then the Group I compound must be selected from one or more of the group consisting of oxalic acid, suitable soluble sulfonic acids and the tetrahalogenated sulfonphthaleins, and the other soluble organic acids having a $pK_1$ of less than or about 2, and wherein the weight ratio of the Group I body of compounds to the Group II body of compounds is more than or about 3 to 1; and (3) one or more of the aforesaid Group III body of compounds with one or more of the Group I or Group II bodies of compounds.

43. The device according to claim 42 wherein the regions are cavities in the heat-conducting carrier.

44. The device according to claim 42 wherein the solid solutions are in an essentially linear melting point-to-composition relationship over the temperature range represented by said plurality of compositions of matter.

45. The device according to claim 42 wherein the solvent is selected from one or more of the group consisting of ortho-chloronitrobenzene, ortho-bromonitrobenzene, 1-thymol, 2-naphthol, 2-ethoxybenzamide, naphthalene, ortho-iodonitrobenzene, meta-iodonitrobenzene, para-iodonitrobenzene, para-dichloronitrobenzene, meta-bromonitrobenzene, para-dibromonitrobenzene, and paratoluic acid.

46. The device according to claim 42 wherein the solvent is a binary mixture of ortho-chloronitrobenzene and ortho-bromonitrobenzene.

47. The device according to claim 42 wherein the binary mixture of ortho-chloronitrobenzene and ortho-bromonitrobenzene have weight percentage ratios of from about 43.8:56.2 to about 4.0:96.0.

48. The device according to claim 43 wherein each cavity is substantially filled with a suitable absorbent bibulous material.

49. The device according to claim 42 wherein the compositions of matter have impurities of less than 0.3% rendering the compositions of matter capable of excellent undercooling after the composition falls below the melting point.

50. The device according to claim 42 wherein the solid solutions are mixtures of the same compounds and the solvent is a binary mixture.

51. The device according to claim 49 wherein the compositions of matter have insoluble nucleating agents present in an amount of from about 0.1 to about 1.5 percent of the entire composition.

52. The device according to claim 50 wherein the solvent mixtures consist of varied amounts of para-dichlorobenzene and para-bromochlorobenzene.

53. The device according to claim 46 with the novel compositions of matter, each containing an effective amount of a suitable nucleating agent.

54. The temperature indicator device recited in claim 50 wherein the indicator means is a layer of paint and the thermally-responsive compositions of matter each contain from about 0.01% to about 1.0% by weight talc.

55. A method of determining a temperature to be measured comprising the steps of:
(a) providing a temperature-indicating device comprising a heat-conducting carrier having one or more spaced regions defined therein to determine a like number of predetermined temperatures in a predetermined temperature range, said spaced regions containing like number of different compositions of matter therein, each a solid solution, said carrier having a transparent cover sheet means in sealing engagement therewith, each of the compositions of matter changing color visible to the naked eye upon transition of the compositions of matter from a liquid state to a solid state, which transition occurs at a known temperature different from the compositions of matter in the remaining regions, each composition of matter exhibiting a sharp color change upon transition from a solid state to a liquid state capable of being supercooled for at least several minutes, and substantially free of impurities, consisting essentially of:

(1) a solvent adapted to change from a solid to a liquid state at substantially the predetermined temperature; and (2) an effective amount of one or more suitable moieties dissolved in and inert toward said solvent to form a solid solution when the composition is in the solid state, and adapted to change the color of the composition visible to the naked eye upon the change in state at substantially the predetermined temperature when so dissolved, and selected from one of the groups consisting of:

(A) one or more of a Group III body of compounds consisting of pinacyanol iodide, quinaldine red, 1,1'-diethyl-2,2'-cyanine iodide, pinacyanol chloride, thionin, methylene blue, cresol red, chlorophenol red, crystal violet, acridin orange, Orasol Orange RLN TM, Orasol Navy Blue TM, Irgalith Red PR TM, Fat Red BS TM, Xylene Cyanol FF TM, Rhodamine B TM, Rhodamine 6G TM, Irgalith Magenta TCB TM, Irgalith pink TYNC TM, Toluidine Blue O, Savinyl Green B TM, Savinyl Blue RS TM, purpurin, 3,3'-diethylthiadicarbocyanine iodide, cryptocyanine, Dicyanine A TM, Merocyanine 540 TM, 4-(p-ethoxyphenylazo)-m-phenylene diamine monohydrochloride, Yellow Orange S TM, Chrysoidin G TM, fuchsin, aurintricarboxylic acid (ammonium salt), Victoria Blue R TM, Pyronin G TM, gallein, Erythrosin Yellow Blend TM, chlorophenol blue, bromophenol blue, bromocresol purple, Coriphosphine O TM, acriflavine, acridine orange, rhoduline violet, Alizarin Cyanin 2R TM, Alizarin Red S TM, alcannin, Aurantia, Direct Green G TM, Fast Red Salt 3Gl TM, Fast Blue Salt BB TM, Fast Garnet Salt GBC TM, Carta Yellow G 180 o/o TM, Savinyl Blue GLS TM, Irgalith Blue GLSM TM, phthalocyanine, Di Amingreen B TM, Alizarin Blue S, Celliton Blue Extra TM, neocyanine, Janus Green, dimethyl yellow, Fast Yellow, methyl red sodium salt, Alizarin yellow R TM, Eriochrome Black T TM, Chromotrope 2R TM, Ponceau 6R TM, Brilliant Ponceau G/R2R TM, chromolan yellow, Sudan Red B TM, Bismarck brown G TM, Fat Black TM, Resorcin Brown TM, Benzofast pink 2Bl TM, Oil Red EGN TM, Euroglaucine, Fuchsin NB TM, parafuchsin, Patent Blue TM, Irgalith Blue TNC TM, Phloxin B TM, fluroescein sodium salt, Rhodamine B base TM, Eosin Scarlet, Eosin Yellowish TM, Erythrosin extra bluish, 4,5-dibromofluorescein, ethyleosin, Phloxine TM, Cyanovin B TM, chlorocresol green, pinacyanol bromide, 2-(p-dimethylaminostyryl)-1-1-ethyl pyridinium iodide, ethyl red, neutral red iodide, nigrosine, Savinyl Blue B TM, Orasol Blue BLN TM, Safranin O TM, Azocarnun G TM, Phenosafranine, Azocarmine BX TM, Solophenyl Brilliant Blue BL TM, Nile Blue A TM, gallocyanine, galamine blue, celestine blue, methylene green, Azure A/B/C TM, Blue VIF Organol TM, Alizarin, Nitrofast Green GSB TM, quinalizarine, Oil Blue N TM, Solvay purple, Ciba Blue TM, Indigo synthetic TM, Chromophtal Bordeaux RS TM, Acid Alizarin Red B TM, 5-aminoflourescein, Rose Bengal TM, Martius Yellow TM, Chicago Blue 6B TM, Alcian Blue 8GX TM, cresyl violet, 4,4'Bis(dimethylamino)benzylhydrol, Zinc Pthalocyanine, Sudan III TM, Pyronin Y TM, Toluylene Blue TM, cresyl violet perchlorate, Mendola's Blue TM, 3,3'-diethylthiadicarbocyanine iodide, Phosphine Dye, Nitron TM, cresyl violet acetate, Ceres Orange R TM, 4-phenylazo-1-naphtylamine, 4-(4-Dimethylamino-1-napthylazo-3-methoxybenzene sulfonic acid, Bindschedler's Green TM, and p-(p-dimethylaminophenylazo)benzoic acid;

(B) a binary mixture of:
(1) one or more of a Group I body of compounds soluble in said solvent consisting of the halogenated sulfonphthaleins and the organic acids having a $pK_1$ of less than or about four; and
(2) one or more of a Group II body of compounds consisting of the aminotriphenylmethanes and their soluble salts, 8-hydroxyquinoline, and the cyanines;

with the proviso that if the Group II compounds consist solely of one or more aminotriphenylmethanes or their soluble salts, then the Group I compound must be selected from one or more of the group consisting of oxalic acid, suitable soluble sulfonic acids, the tetrahalogenated sulfonphthaleins, and the other soluble organic acids, having a $pK_1$ of less than or about 2, and wherein the weight ratio of the Group I body of compounds to the Group II body of compounds is more than or about 3 to 1; and
(C) one or more of the aforesaid Group III body of compounds with one or more of the Group I or Group II bodies of compounds;

(b) subjecting each of the chemical means to the temperature to be determined, which is in the predetermined temperature range to cause one or more of the chemical means to change color corresponding to a change in phase; and
(c) determining the highest of the predetermined temperatures at which one of the chemical means has changed color.

56. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of chlorophenol blue and ethyl red soluble in and inert towards said binary mixture (a) and adapted to change the color of the composition visible to the naked eye upon a change in state from a solid state to a liquid state at a predetermined temperature.

57. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of bromochlorophenol blue and ethyl violet soluble in and inert towards said binary mixture (a) and adapted to change the color of the composition visiblee to the naked eye upon a change in state from a solid state to a liquid state at a predetermined temperature.

58. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of bromophenol blue and basic fuchsin soluble in and inert towards said binary mixture (a) and adapted to change the color of the composition visible to the naked eye upon a change in state from a solid state to a liquid state at a predetermined temperature.

59. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of bromophenol red and brilliant green soluble in and inert towards said binary mixture (a) and adapted to change the color of the composition visible to the naked eye upon a change in state from a solid state to a liquid state at a predetermined temperature.

60. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of bromochlorophenol blue and pinacyanol chloride soluble in and inert towards said binary mixture (a) and adapted to change the color of the composition visible to the naked eye upon a change in state from a solid state to a liquid state at a predetermined temperature.

61. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of 3,3'-diethylthiacarbocyanine iodide and bromocresol purple soluble in and inert towards binary mixture (a) and adapted to change the color of the composition visible to the naked eye upon a change in state from a solid state to a liquid state at a predetermined temperature.

62. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of 3,3'-diethylthiacarbocyanine iodide and bromophenol blue soluble in and inert towards said binary mixture (a) and adapted to change the color of the composition visible to the naked eye upon a change in state from a solid state to a liquid state at a predetermined temperature.

63. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of pinacyanol chloride and 3,4,5,6-tetrabromophenolsulfonphthalein soluble in and inert towards said binary mixture (a) and adapted to change the color of the composition visible to the naked eye upon a change in state from a solid state to a liquid state at a predetermined temperature.

64. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of pinacyanol chloride and bromocresol purple soluble in and inert towards said binary mixture (a) and adapted to change the color of the composition visible to the naked eye upon a change in state from a solid state to a liquid state at a predetermined temperature.

65. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixtue of ethyl red and bromochlorophenol blue soluble in and inert towards said binary mixture (a) and adapted to change the color of the composition visible to the naked eye upon a change in state from a solid state to a liquid state at a predetermined temperature.

66. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of pinacyanol chloride and chlorocresol green soluble in and inert towards said binary mixture (a) and adapted to change the color of the composition visible to the naked eye upon a change in state from a solid state to a liquid state at a predetermined temperature.

67. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of pinacyanol iodide soluble in and inert towards said binary mixture (a) and adapted to change the color of the composition visible to the naked eye upon a change in state from a solid state to a liquid state at a predetermined temperature.

68. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of quinaldine red soluble in and inert towards said binary mixture (a) and adapted to change the color of the composition visible to the naked eye upon a change in state from a solid state to a liquid state at a predetermined temperature.

69. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of 1,1'-diethyl-2,2'-cyanine iodide soluble in and inert towards said binary mixture (a) and adapted to change the color of the composition visible to the naked eye upon a change in state from a solid state to a liquid state at a predetermined temperature.

70. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of bromophenol blue and ethyl red soluble in and inert towards said binary mixture (a) and adapted to change the color of the composition visible to the naked eye upon a change in state from a solid state to a liquid state at a predetermined temperature.

71. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of chlorophenol red soluble in and inert towards said binary mixture (a) and adapted to change the color of the composition visible to the naked eye upon a change in state from a solid state to a liquid state at a predetermined temperature.

72. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of ethyl red and 3,4,5,6-tetrabromosulfonphthalein soluble in and inert towards said binary mixture (a) and adapted to change the color of the composition visible to the naked eye upon a change in state from a solid state to a liquid state at a predetermined temperature.

73. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and (b) an effective amount of a mixture of ethyl red and bromophenol red soluble in and inert towards said binary mixture (a) and adapted to change the color of the composition visible to the naked eye upon a change in state from a solid state to a liquid state at a predetermined temperature.

74. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of ethyl red and bromocresol purple soluble in and inert towards said binary mixture (a) and adapted to change the color of the composition visible to the naked eye upon a change in state from a solid state to a liquid state at a predetermined temperature.

75. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of crystal violet and bromophenol blue soluble in and inert towards said binary mixture (a) and adapted to change the color of the composition visible to the naked eye upon a change in state from a solid state to a liquid state at a predetermined temperature.

76. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of bromochlorophenol blue and brilliant green soluble in and inert towards said binary mixture (a) and adapted to change the color of the composition visible to the naked eye upon a change in state from a solid state to a liquid state at a predetermined temperature.

77. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of naphthalene sulfonic acid and ethyl violet soluble in and inert towards said binary mixture (a) and adapted to change the color of the composition visible to the naked eye upon a change in state from a solid to a liquid state at a predetermined temperature.

78. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of naphthalene sulfonic acid and crystal violet soluble in and inert towards said binary mixture (a) and adapted to change the color of the composition visible to the naked eye upon a change in state from a solid state to a liquid state at a predetermined temperature.

79. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of naphthalene sulfonic acid and ethyl red soluble in and inert towards said binary mixture (a) and adapted to change the color of the composition visible to the naked eye upon a change in state from a solid state to a liquid state at a predetermined temperature.

80. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of trichloroacetic acid and cryptocyanine soluble in and inert towards said binary mixture (a) and adapted to change the color of the composition visible to the naked eye upon a change in state from a solid state to a liquid state at a predetermined temperature.

81. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of trichloroacetic acid and ethyl violet soluble in and inert towards said binary mixture (a) and adapted to change the color of the composition visible to the naked eye upon a change in state from a solid state to a liquid state at a predetermined temperature.

82. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of 3-ethyl-2-[5-(3-ethyl-2-benzothiazolinylidene)-1,3-pentadienyl]-benzothiazolium iodide and trichloroacetic acid soluble in and inert towards said binary mixture (a) and adapted to change the color of the composition visible to the naked eye upon a change in state from a solid state to a liquid state at a predetermined temperature.

83. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of chloroanilic acid and basic fuchsin soluble in and inert towards said binary mixture (a) and adapted to change the color of the composition visible to the naked eye upon a change in state from a solid state to a liquid state at a predetermined temperature.

84. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of chlorophenol red and dicyanine A soluble in and inert towards said binary mixture (a) and adapted to change the color of the composition visible to the naked eye upon a change in state from a solid state to a liquid state at a predetermined temperature.

85. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of chlorophenol red and cryptocyanine soluble in and inert towards said binary mixture (a) and adapted to change the color of the composition visible to the naked eye upon a change in state from a solid state to a liquid state at a predetermined temperature.

86. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of bromochlorophenol blue and dicyanine A soluble in and inert towards said binary mixture (a) and adapted to change the color of the composition visible to the naked eye upon a change in state from a solid state to a liquid state at a predetermined temperature.

87. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of 5-p-dimethylaminobenzylidine rhodanine and dicyanine A soluble in and inert towards said binary mixture (a) and adapted to change the color of the composition visible to the naked eye upon a change in state from a solid state to a liquid state at a predetermined temperature.

88. A composition of matter substantially free of impurities consisting essentially of a solid solution of:
(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0 and
(b) an effective amount of a mixture of 5-p-dimethylaminobenzylidine rhodanine and cryptocyanine soluble in and inert towards said binary mixture (a) and adapted to change the color of the composition visible to the naked eye upon a change in state from a solid state to a liquid state at a predetermined temperature.

89. The composition of claim 66, wherein the amount of pinacyanol iodide employed is about 0.035 weight percent of the entire solid solution.

* * * * *

UNITED STATES PATENT AND TRADEMARK OFFICE
CERTIFICATE OF CORRECTION

PATENT NO. : 4,232,552                               Page 1 of 7

DATED : November 11, 1980

INVENTOR(S) : Craig R. HOF and Roy A. ULIN

It is certified that error appears in the above-identified patent and that said Letters Patent is hereby corrected as shown below:

Title page, item [56] References Cited, "Celdmacher" should read --Geldmacher--.

Cover page, column 2, add --et al.-- after "Weinstein--; "Gradischer" should read --Gradischar--; "Rembaum" should read --Renbaum--; "Cerrabee" should read --Larrabee--; "Uun" should read --Ulin--; "Icaraski" should read --Igarashi--.

Fig. 1, "WEIGH" should read --WEIGHT--.

Column 2, line 2, "inexcessible" should read --inaccessible--;
         line 18, "of" should read --or--.

Column 3, line 9, change "were" to --was-- and change "was" to --were--.

Column 8, line 42, "application" should read --applications--.

Column 9, line 24, "muroxide" should read --murexide,--;
         line 37, "fluorescin" should read --fluorescein--;
         line 52, "benzylhdrol" should read --benzhydrol--;
         line 54, "Mehdola's" should read --Mendola's--;
         line 58, "naphthylazo" should read --naphthylazo)--.

Column 10, line 48, "preferable" should read --preferably--;
          line 64, "predetemined" should read --predetermined--.

Column 14, line 58, "2,R" should read --2R--;
          line 59, "alcannin" should read --alcannin,--;
          line 62, "Murexide" should read --, murexide--.

UNITED STATES PATENT AND TRADEMARK OFFICE
CERTIFICATE OF CORRECTION

PATENT NO. : 4,232,552

DATED : November 11, 1980

INVENTOR(S) : Craig R. HOF and Roy A. ULIN

It is certified that error appears in the above-identified patent and that said Letters Patent is hereby corrected as shown below:

Column 15, line 21, "benzylhdrol" should read --benzhydrol--;
           line 26, "-naphtyl-" should read -- -naphthyl- --;
           line 27, "naphtylazo" should read --naphthylazo--.

Col. 17, line 7, "composition" should read --compositions--
           line 19, change ";" to --,--;
           line 20, "dibiomonitrobenzene" should read --dibromonitrobenzene--;
           line 56, "a" should read --is--.

Column 18, line 22, "GLSMv" should read --GLSM™--.

Column 20, line 22, "changes" should read --change--.
           line 45, "neutral red, iodide" should read --neutral red iodide--.

Column 21, line 30, "-naphtyl-" should read -- -naphthyl- --;
line 31, "naphtylazo" should read ---naphthylazo--
           line 34, "or or" should read --or--.

Column 22, line 22, "are" should read --is--.

Column 23, line 22, "phenomena" should read --phenomenon--;
           line 52, "sovlent" should read --solvent--.

Column 25, line 34, "sovlent" should read --solvent--.

Column 26, line 55, cancel "(1)";
           line 67, "bromphencol" should read --bromphenol--.

Column 30, line 15, "party" should read --partly--;
           line 41, "change" should read --changes--.

Column 33, line 40, "be" should read --we--.

UNITED STATES PATENT AND TRADEMARK OFFICE
CERTIFICATE OF CORRECTION

PATENT NO. : 4,232,552

DATED : November 11, 1980

INVENTOR(S) : Craig R. HOF and Roy A. ULIN

It is certified that error appears in the above-identified patent and that said Letters Patent is hereby corrected as shown below:

Column 34, line 58, "shifts" should read --) shifts--.

Col. 37, line 44, "composition" should read --compositions--

Column 42, line 65, "through" should read --though--.

Column 43, line 26, "DEMPA" should read --TEMPA--.

Col. 44, line 2, "Fahrenheit" should read --( Fahrenheit-- line 14, insert --and-- after "means".

Column 47, line 26, "of" should read --and--;
line 35, "Jersy" should read --Jersey--;
line 38, "adopted" should read --adapted--;
line 44, cancel ")".

Column 48, line 27, "polyoklefin" should read --polyolefin--.

Column 49, line 1, "is" (second occurrence) should read --if--;
line 11, "OBNB-OBNB" should read --OCNB-OBNB--;
line 15, cancel "that";
line 26, "44" should read --44)--;
line 30, "re solidification" should read --resolidification--.

Column 50, line 17, "TEMPAT" should read --TEMPA--.

Column 53, line 63, "polyisobutylne" should read --polyisobutylene--.

Column 54, line 17, "defined" should read --, defined--.

Column 77, for entry of No. 151, "phthalo-" should read --phthalocyanine--.

UNITED STATES PATENT AND TRADEMARK OFFICE
CERTIFICATE OF CORRECTION

PATENT NO. : 4,232,552

DATED : November 11, 1980

INVENTOR(S) : Craig R. HOF and Roy A. ULIN

It is certified that error appears in the above-identified patent and that said Letters Patent is hereby corrected as shown below:

Col. 81, for entry of No. 40, "Napthalenesulphonic" should read --Naphthalenesulphonic--;

for entry of No. 42, "sulphonepthalein" should read --sulphonephthalein--.

Column 83, before Example 12, "poor" should read --poorly--; line 61, "compound" should read --compounds--.

Column 87, for Solvent as to azoic Fast Violet Salt C.I. No. 37165, "OBNB/OCN" should read --OBNB/OCNB--.

Column 93, third class from end, "unkown" should read --unknown--.

Column 97, first entry under Compound, should read --4,4´-Bis(dimethylamino)benzhydrol (Eastman 1876)--.

Column 99, entry for fourth Compound, "P-Chloro-)-" should read --P-(Chloro)- --.

Column 101, Table 6, last entry under Compound should read --Thiamine Hydrochloride--;

line 35, "morpholinuim" should read --morpholinium--;

line 37, "maphthi (azB)" should read --naphthi (azB)--

Column 101, Table 7, under Nucleating Agent, third entry, change "Danials" to --Daniels--; fifth entry, change "amorphoos" to --amorphous--; and eighth entry, change "Molybdenium" to --molybdenum--.

UNITED STATES PATENT AND TRADEMARK OFFICE
CERTIFICATE OF CORRECTION

PATENT NO. : 4,232,552

DATED : November 11, 1980

INVENTOR(S) : Craig R. HOF and Roy A. ULIN

It is certified that error appears in the above-identified patent and that said Letters Patent is hereby corrected as shown below:

Column 102, in Table 7, under -6°C.(cooling time), change "after" to --(after--.

Column 103, line 7, "aluminium" should read --aluminum--;
line 23, "mixtures," should read --mixtures--;
line 29, "has" should read --had--;
lines 60, 62, and 63, "aluminium" should read --aluminum--;
line 68, "bromonitrobenzen" should read --bromonitrobenzene--.

Column 104, lines 3, 20, 23, and 26, aluminium" should read --aluminum--.
line 19, change "(ICI)" to --ICI)--.

Column 105, lines 16, 38, and 44, "aluminium" should read --aluminum--;
line 24, insert --,-- after "layer".

Column 106, lines 3, 10, 42-43, fifth to last line, and next to last line, "aluminium" should read --aluminum-- ;
line 16 from end, "dissappeared" should read --disappeared--.

Column 107, line 23, "benznoic" should read --benzoic--;
line 63, "induline," should read --induline--.

Column 110, line 12, "patent's" should read --patient's--;
line 44, cancel "as".

UNITED STATES PATENT AND TRADEMARK OFFICE
CERTIFICATE OF CORRECTION

PATENT NO. : 4,232,552

DATED : November 11, 1980

INVENTOR(S) : Craig R. HOF and Roy A. ULIN

It is certified that error appears in the above-identified patent and that said Letters Patent is hereby corrected as shown below:

Col. 113, line 17, change "of" (first occurrence) to --or--

Column 114, line 32, "5-aminoflourescein" should read --5-aminofluorescein--;
line 36, "Pthalocyanine" should read --Phthalocyanine--;
line 41, "napthylazo" should read --naphthylazo--

Column 115, line 10, "rhodoine" should read --rhodanine--;
line 15, "2-(p-dimethytaminostyryl)" should read --2-(p-dimethylaminostyryl)--;
line 39, "$pK_1$" should read --$pK_2$--.

Column 122, line 10, "fuschin" should read --fuchsin--.

Column 123, line 65, "Rhodanine" should read --Rhodamine--.

Column 124, line 28, "Esoin" should read --Eosin--;
line 29, "bluish" should read --bluish,--;
line 44, "flourescein" should read --fluorescein--
line 47, "Pthalocyanine" should read --Phthalocyanine--;
line 51, "naphtyl" should read --naphthyl--;
line 52, "napthylazo" should read --naphthylazo--.

Column 125, line 35, "inpurities" should read --impurities--.

Column 126, line 61, "fluroescein" should read --fluorescein--.

UNITED STATES PATENT AND TRADEMARK OFFICE
CERTIFICATE OF CORRECTION

PATENT NO. : 4,232,552
DATED : November 11, 1980
INVENTOR(S) : Craig R. HOF and Roy A. ULIN It is certified that error appears in the above-identified patent and that said Letters Patent is hereby corrected as shown below:

Column 127, line 10, "5-aminoflourescein" should read --5-aminofluorescein--;
line 14, "Pthalocyanine" should read --Phthalocyanine--;
line 19, "naphtyl" should read --naphthyl--.

Column 128, line 8, "visiblee" should read --visible--.

Signed and Sealed this

First Day of March, 1994

Attest:

BRUCE LEHMAN

Attesting Officer

Commissioner of Patents and Trademarks